(12) United States Patent
Miyazaki

(10) Patent No.: US 11,423,903 B2
(45) Date of Patent: Aug. 23, 2022

(54) INFORMATION PROCESSING SYSTEM AND INFORMATION PROCESSING METHOD

(71) Applicant: Ricoh Company, Ltd., Tokyo (JP)

(72) Inventor: Satoshi Miyazaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 162 days.

(21) Appl. No.: 17/061,679

(22) Filed: Oct. 2, 2020

(65) Prior Publication Data

US 2021/0104239 A1 Apr. 8, 2021

(30) Foreign Application Priority Data

Oct. 8, 2019 (JP) .............................. JP2019-185499

(51) Int. Cl.
*G10L 15/22* (2006.01)
*H04N 1/00* (2006.01)
*G10L 15/26* (2006.01)

(52) U.S. Cl.
CPC ............... *G10L 15/22* (2013.01); *G10L 15/26* (2013.01); *H04N 1/00811* (2013.01); *H04N 1/00403* (2013.01)

(58) Field of Classification Search
CPC ...... G10L 15/22; G10L 15/26; H04N 1/00403
See application file for complete search history.

(56) References Cited

U.S. PATENT DOCUMENTS

| 9,978,260 | B2 * | 5/2018 | Lee ........................ G08C 17/02 |
| 2019/0245854 | A1 * | 8/2019 | Saito ....................... G06F 21/44 |
| 2019/0304453 | A1 | 10/2019 | Nakamura |
| 2020/0175982 | A1 | 6/2020 | Nakamura |
| 2020/0175984 | A1 | 6/2020 | Iwasa |
| 2020/0177407 | A1 | 6/2020 | Nakamura |
| 2020/0177746 | A1 | 6/2020 | Katsumata |
| 2020/0177747 | A1 | 6/2020 | Yasuda et al. |
| 2020/0304663 | A1 | 9/2020 | Kubota |

FOREIGN PATENT DOCUMENTS

JP 2003-051887 2/2003

* cited by examiner

*Primary Examiner* — Ibrahim Siddo
(74) *Attorney, Agent, or Firm* — Xsensus LLP

(57) ABSTRACT

An information processing system is connected to a first external device via a network. The information processing system includes circuitry configured to perform: obtaining voice information for operating the first external device; recognizing the voice information obtained at the obtaining; interpreting, from a recognition result obtained at the recognising, processing information indicating processing to be performed in the first external device, first address information identifying the first external device, and second address information identifying a second external device to which the first external device is to send a result of the processing; and sending instruction information including the processing information and the second address information, to the first external device identified by the first address information.

15 Claims, 38 Drawing Sheets

FIG.12

| printColor | |
|---|---|
| ☑ Define synonyms   ⊙ ☐ Allow automated expansion | |
| auto_color | auto_color |
| monochrome | monochrome, black and white |
| color | color, full color |
| two_color | two color |
| single color | single color |
| red_and_black | red and black |

FIG.13

(a)
| |
|---|
| " Add user expression |

| |
|---|
| " Please copy this by setting of two color, double sides and 2 in 1. |
| " Please copy this document by setting of Tray 1, fitting, and double sides. |
| " Make two copies of this document by monochrome and dark. |
| " Make three copies with 4 in 1. |
| " Execute copy by setting of color and auto tray. |
| " Please copy this document with 80% on Tray 1. |
| " Copy dark on one side. |
| " copy by black and white and dark. |

RELATED PARAMETERS

Action (b)
| |
|---|
| copy |

(c)

| Entity | | ENTITY ? | VALUE |
|---|---|---|---|
| ☐ | copies | @copies | Scopies |
| ☐ | paperTray | @paperTray | SpaperTray |
| ☐ | magnification | @magnification | Smagnification |
| ☐ | printColor | @printColor | SprintColor |
| ☐ | printSide | @printSide | SprintSide |
| ☐ | combine | @combine | Scombine |
| ☐ | density | @density | Sdensity |
| | ⋮ | ⋮ | ⋮ |

INFORMATION PROCESSING SYSTEM AND INFORMATION PROCESSING METHOD

CROSS-REFERENCE TO RELATED APPLICATIONS

The present application claims priority under 35 U.S.C. § 119 to Japanese Patent Application No. 2019-185499, filed on Oct. 8, 2019. The contents of which are incorporated herein by reference in their entirety.

BACKGROUND OF THE INVENTION

1. Field of the Invention

The present invention relates to an information processing system and an information processing method.

2. Description of the Related Art

In this present age, an artificial intelligence (AI) voice assistant is known that performs voice-driven device actions. Moreover, smart home appliances are also known that can be operated using voice, and the field of voice-operation is expected to further grow in future.

As a technology for performing voice-driven device actions, a technology is disclosed in which voice data obtained in a mobile terminal is sent to a server, and the server converts the voice data into control commands and sends them to devices (for example, refer to Japanese Unexamined Patent Application Publication No. 2003-051887).

However, in the technology disclosed in Japanese Unexamined Patent Application Publication No. 2003-051887, in the case of executing a job by coordinating among a plurality of devices, the job cannot be executed with ease.

SUMMARY OF THE INVENTION

According to an aspect of the present invention, an information processing system is connected to a first external device via a network. The information processing system includes circuitry configured to perform: obtaining voice information for operating the first external device; recognizing the voice information obtained at the obtaining; interpreting, from a recognition result obtained at the recognizing, processing information indicating processing to be performed in the first external device, first address information identifying the first external device, and second address information identifying a second external device to which the first external device is to send a result of the processing; and sending instruction information including the processing information and the second address information to the first external device identified by the first address information.

BRIEF DESCRIPTION OF THE DRAWINGS

FIG. 12 is a diagram illustrating an example of entity information that is used in interpreting the input voice of a user in the voice operation system according to the first embodiment;

FIG. 13 is a diagram illustrating the entity information that is registered based on uttered phrases in the voice operation system according to the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE PREFERRED EMBODIMENTS

Figure 1:
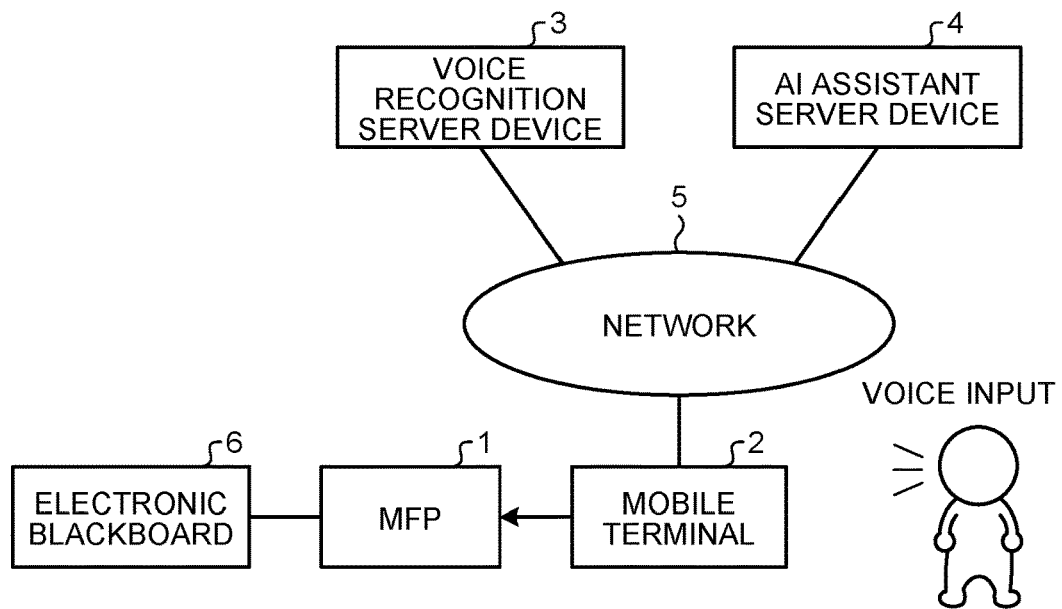
FIG. 1 is a diagram illustrating an exemplary system configuration of a voice operation system accord in to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing system and an information processing method that enable a plurality of devices to operate in coordination according to operation by voice.

Given below is the explanation about a voice operation system that represents an example of application of an information processing system and an information processing method.

First Embodiment

System Configuration

FIG. 1 is a system configuration diagram of a voice operation system according to a first embodiment. As illustrated in FIG. 1, the voice operation system according to the first embodiment is configured when a multifunction peripheral (MFP) 1 representing an example of a first external device; a mobile terminal 2 such as a smartphone or a tablet terminal (an example of an information processing device); a voice recognition server device 3; and an AI assistant server device 4 are connected to each other via a predetermined network 5 such as a local area network (LAN). Moreover, the voice operation system according to the first embodiment includes an electronic blackboard 6 representing an example of a second external device that is connected to the MFP 1. Herein, the first external device is not limited to an MFP, and can be some other electronic device including an office device such as an electronic blackboard or a projector. Alternatively, the second external device is not limited to an electronic blackboard, and can be some other electrical appliance including an office device such as an MFP or a projector. With reference to FIG. 1, the MFP 1 and the electronic blackboard 6 are directly connected to each other. However, that is not the only possible case. Alternatively, the MFP 1 and the electronic blackboard 6 can be connected to each other via the network 5 or via a different network other than the network 5. In the following explanation, the first external device is sometimes referred to as an input device, and the second external device is sometimes referred to as an output device.

The mobile terminal 2 receives a voice input from the user for the purpose of performing operation by voice in the MFP 1. Moreover, the mobile terminal 2 gives a voice feedback of received operations to the user. Furthermore, the mobile terminal 2 relays data communication (communication of text data (described later)) between the voice recognition server device 3 and the AI assistant server device 4. The voice recognition server device 3 analyzes the voice data received from the mobile terminal 2, and converts it into text data. Meanwhile, the voice recognition server device 3 represents a first server device. The AI assistant server device 4 analyzes text data, converts it into a preregistered user intention (a job execution command for the MFP 1), and sends the user intention to the mobile terminal 2.

Herein, the AI assistant server device 4 represents a second server device. The MFP 1 executes job execution commands that are sent from the mobile terminal 2. The communication between the mobile terminal 2 and the MFP 1 can be wireless communication or wired communication. That is, the mobile terminal 2 can be an operation terminal that is connected to the MFP 1 in a fixed manner.

In this example, there are two server devices, namely, the voice recognition server device 3 and the AI assistant server device 4. However, alternatively, the two server devices 3 and 4 can be integrated to be a physically single server device. Still alternatively, each of the server devices 3 and 4 can be implemented using a plurality of server devices.

Hardware Configuration of MFP

Figure 2:
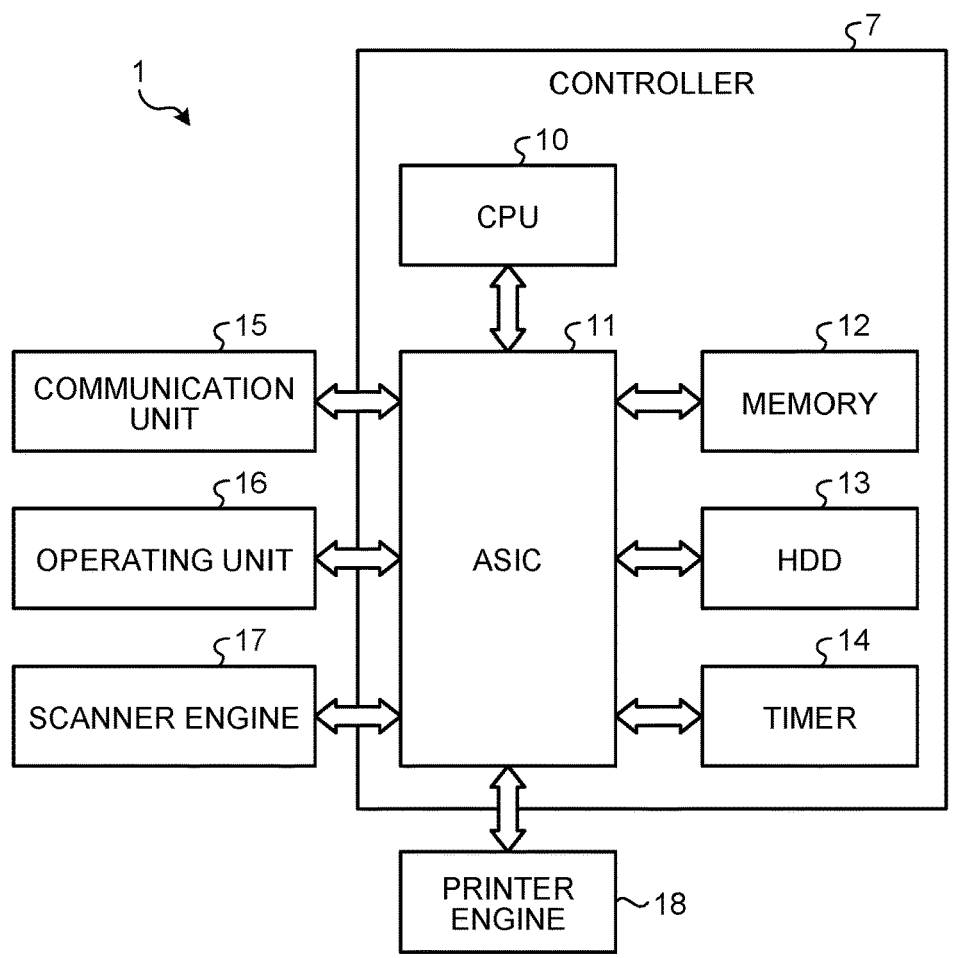
FIG. 2 is a diagram illustrating an exemplary hardware configuration of a multifunction peripheral (MFP) installed in the voice operation system according to the first embodiment.

The MFP 1 equipped with a plurality of functions such as a printer function and a scanner function. As illustrated in FIG. 2, the MFP 1 includes a controller a communication unit 15, an operating unit 16, a scanner engine 17 (a reading unit), and a printer engine 18.

The controller 7 includes a central processing unit (CPU) 10, an application specific integrated circuit (ASIC) 11, a memory 12, a hard disk drive (HDD) 13, and a timer 14. The CPU 10, the ASIC 11, the memory 12, the HDD 13, and the timer 14 are connected to each other in a communicable manner via a bus line.

The communication unit 15 is connected to the network 5 and, as described later, obtains job execution commands such as scanning instructions and printing instructions that are voice-input using the mobile terminal 2.

The operating unit 16 is, what is called, a touch panel in which a liquid crystal display (LCD) and a touch sensor are configured in an integrated manner. When an execution command for a desired operation is to be issued using the operating unit 16, the operator performs touch operations of operation buttons (software keys) displayed in the operating unit 16 and specifies the desired operation.

The scanner engine 17 controls a scanner unit and performs optical reading of documents. The printer engine 18 controls an image writing unit and prints images on, for example, sheets of transfer paper. The CPU 10 comprehensively controls such image forming devices. The ASIC 11 is, what is called, a large-scale integration (LSI) circuit, and performs a variety of image processing required for the images processed in the scanner engine 17 and the printer engine 18. Herein, the scanner engine 17 and the printer engine 18, which are the tools for executing job execution commands obtained from the mobile terminal device 2, represent functional units.

The memory 12 is used to store various applications to be executed by the CPU 10 and to store a variety of data used in the execution of the applications. The HDD 13 is used to store image data, various computer programs, font data, and various files. Meanwhile, in place of the HDD 13 or in addition to the HDD 13, a solid state drive (SSD) can also be installed. The HDD 13 is also used to store a device management table given later in Table 3. However, when the device management table is stored in the mobile terminal 2 or the AI assistant server 4, the MFP 1 need not store the device management table.

Hardware Configuration of Mobile Terminal

Figure 3:
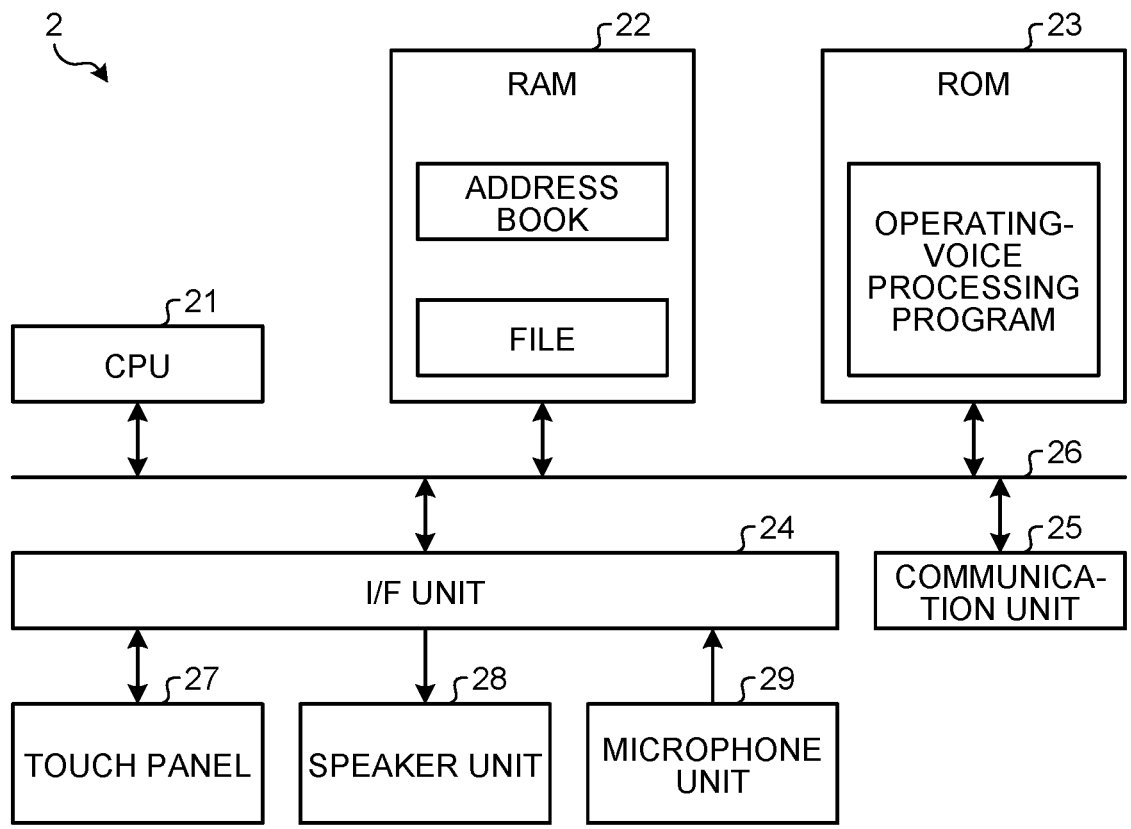
FIG. 3 is a diagram illustrating an exemplary hardware configuration of a mobile terminal used in the voice operation system according to the first embodiment.

As illustrated in FIG. 3, the mobile terminal 2 is configured when a CPU 21, a random access memory (RAM) 22, a read only memory (ROM) 23, an interface (I/F) unit 24, and a communication unit 25 are connected to each other via a bus line 26. The RAM 22 is used to store an address book of email addresses of the users who represent the addressees of emails and scanned images. Moreover, the RAM 22 is used to store files representing image data to be printed.

The ROM 23 is used to store an operating-voice processing program. The CPU 21 executes the operating-voice processing program and thus enables voice input operations with respect to the MFP 1. Moreover, the ROM 23 is also used to store the device management table given later in Table 3. However, when the device management table is stored in the MFP 1 or the AI assistant server 4, the mobile terminal 2 need not store the device management table.

To the I/F unit 24 are connected a touch panel 27, a speaker unit 28, and a microphone unit 29. The microphone unit 29 collects (obtains) the call voice as well as collects the input voice of a job execution command with respect to the MEP 1. The input voice is sent to the voice recognition server device 3 via the communication unit 25, and is then converted into text data.

Hardware Configuration of Voice Recognition Server Device

Figure 4:
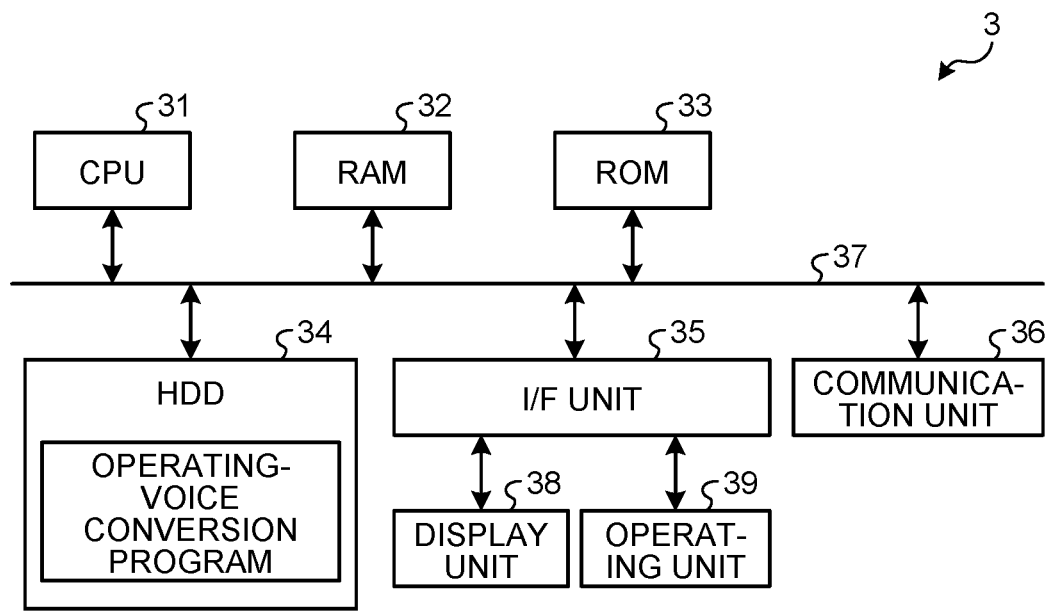
FIG. 4 is a diagram illustrating an exemplary hardware configuration of a voice recognition server device installed in the voice operation system according to the first embodiment.

As illustrated in FIG. 4, the voice recognition server device 3 is configured when a CPU 31, a RAM 32, a ROM 33, an HDD 34, an interface (I/F) unit 35, and a communication unit 36 are connected to each other via a bus line 37. To the I/F unit 35 are connected a display unit 38 and an operating unit 39. The HDD 34 is used to store an operating-voice conversion program for converting voice data into text data. The CPU 31 executes the operating-voice conversion program; converts the voice data, which is sent from the mobile terminal 2, into text data; and sends the text data to the mobile terminal 2.

Hardware Configuration of AI Assistant Server Device

Figure 5:
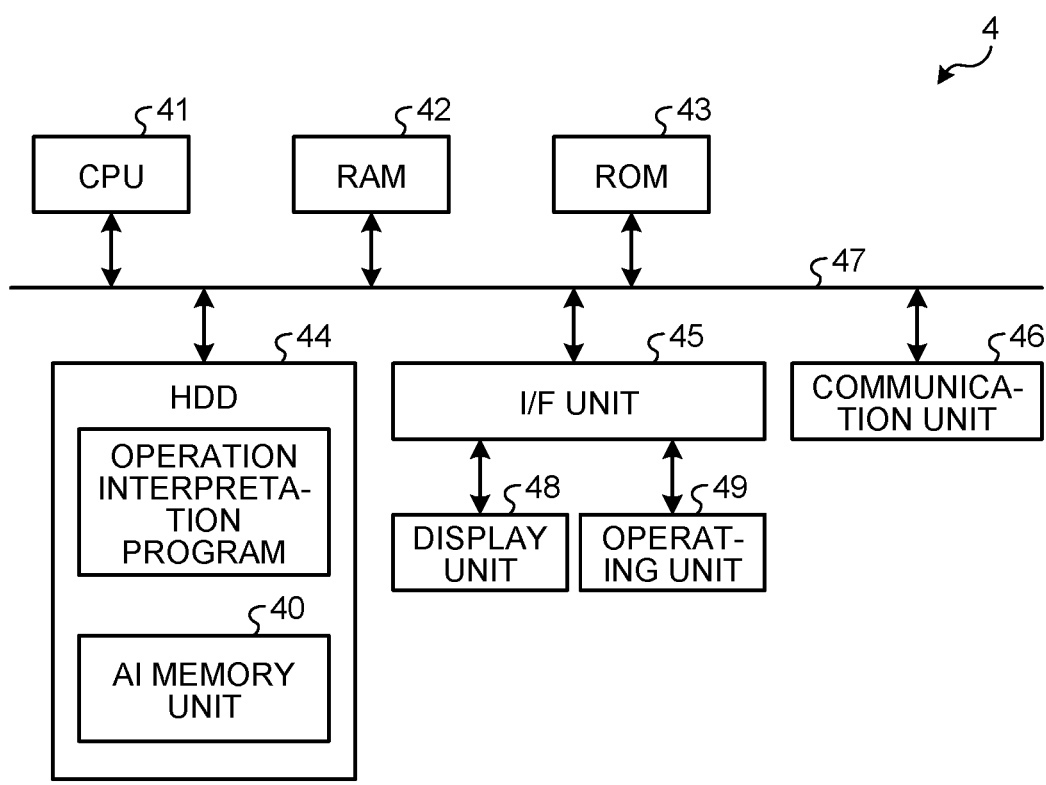
FIG. 5 is a diagram illustrating an exemplary hardware configuration of an artificial intelligence (AI) assistant server device installed in the voice operation system according to the first embodiment.

As illustrated in FIG. 5, the AI assistant server device 4 is configured when a CPU 41, a RAM 42, a ROM 43, an HDD 44, an interface (I/F) unit 45, and a communication unit 46 are connected to each other via a bus line 47. To the I/F unit 45 are connected a display unit 48 and an operating unit 49. The HDD 44 is used to store an operation interpretation program for interpreting the jobs instructed by the user. The CPU 41 executes the operation interpretation program and interprets each job, which is instructed by the user, from the text data generated (by conversion) in the voice recognition server device 3. The interpretation result is then sent to the mobile terminal 2. Then, the mobile terminal converts the interpretation result into a job command and sends it to the MFP 1. Thus, the MTP 1 can be operated according to the voice input performed via the mobile terminal 2. Meanwhile, the HDD 44 is also used to store the device management table given later in Table 3. However, when the device management table is stored in the MFP 1 or the mobile terminal 2, the AI assistant server device 4 need not store the device management table.

Hardware Configuration of Electronic Blackboard

Figure 6:
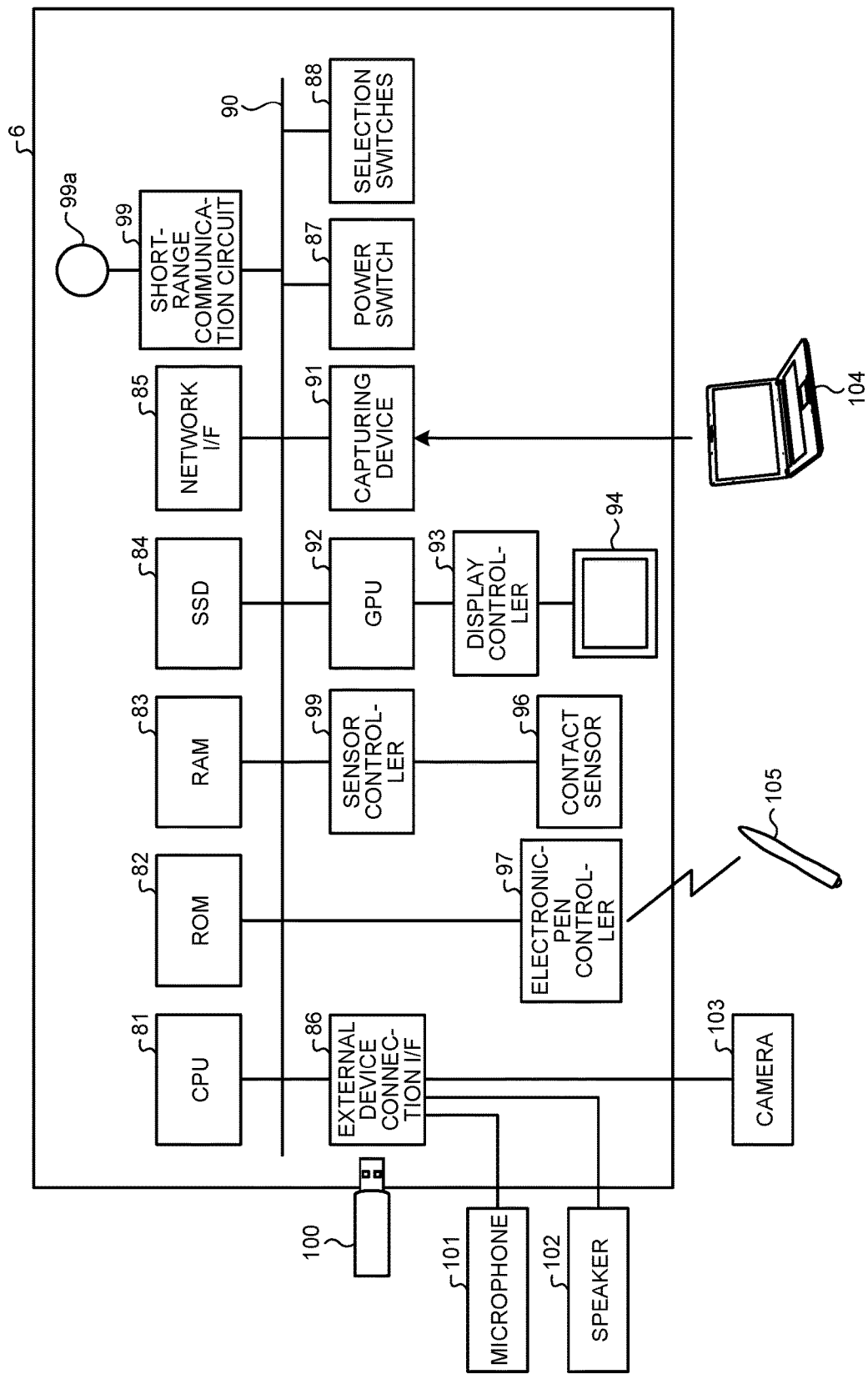
FIG. 6 is a diagram illustrating an exemplary hardware configuration of an electronic blackboard installed in the voice operation system according to the first embodiment.

As illustrated in FIG. 6, the electronic blackboard 6 is configured when a CPU 81, a ROM 82, a RAM 83, an SSD 84, a network I/F 85, an external device connection I/F 86, a power switch 87, selection switches 88, a capturing device 91, a graphics processing unit (GPU) 92, a sensor controller 95, an electronic-pen controller 97, and a short-range communication circuit 99 are connected to each other via a bus line 90. Moreover, the electronic blackboard 6 also includes a display controller 93, a display 94, a contact sensor 96, the electronic-pen controller 97, and an antenna 99a.

The CPU 81 controls the operations of the entire electronic blackboard 6. The ROM 82 is used to store computer programs, such as an initial program loader (IPL), that are to be used in driving the CPU 81. The RAM 83 is used as the work area for the CPU 81.

The SSD 84 is used to store a variety of data such as computer programs for an electronic blackboard. The network controller 85 controls the communication with a communication network. The external device connection I/F 86 is an interface for establishing connection with various external devices. In this case, examples of the external devices include a universal serial bus (USB) memory 100 and externally-attached devices (such as a microphone 101, a speaker 102, and a camera 103).

The capturing device 91 displays video information, as still images or moving images, in the display of an external personal computer (PC) 104. The CPU 92 is a semiconductor chip dedicated for handling graphics. The display controller 93 performs control and management of screen display for the purpose of outputting the output images from the CPU 92 to the display 94.

The contact sensor 96 detects a touch of an electronic pen 105 or a hand of the user on the display 94. The sensor controller 95 controls the operations of the contact sensor 96. The contact sensor 96 performs coordinate input and coordinate detection according to the infrared blocking method. In the method for coordinate input and coordinate detection, a plurality of infrared rays is radiated in parallel to the display 94 from two light emission-reception devices that are installed at both ends in the upper side of the display 94. Then, the infrared rays get reflected from a reflecting material provided around the display 94; and the returning light is received that returns on the same light path as the light path of the light emitted from light receiving elements. The contact sensor 96 outputs, to the sensor controller 95, the IDs of the infrared rays that are emitted from the two light emission-reception devices and that are blocked by an object; and the sensor controller 95 identifies the coordinate position of the object as its contact position. The electronic-pen controller 216 communicates with the electronic pen 105 and determines a touch of the leading end or the rear end of the electronic pen 105 on the display 94.

The short-range communication circuit 99 is a communication circuit for near field communication (NFC) or Bluetooth (registered trademark). The power switch 87 is a switch for turning ON and turning OFF the power of the electronic blackboard 6. The selection switches 88 are a group of switches for adjusting, for example, the brightness and the coloration of the display 94.

The bus line 90 is an address bus or a data bus for electrically connecting the constituent elements, such as the CPU 81, illustrated in FIG. 6.

Meanwhile, the contact sensor 96 is not limited to be configured using the infrared blocking method, and can alternatively be configured using various detection methods such as a capacitive touch panel that identifies the contact position by detecting the changes in the capacitance; or a resistive touch panel that identifies the contact position according to the variation of voltage of two resistance films facing each other; or an electromagnetic induction touch panel that identifies the contact position by detecting the electromagnetic induction that occurs when an object makes contact with the display unit. Moreover, the electronic-pen controller 97 not only can be configured to determine a touch of the leading end or the rear end of the electronic pen 105, but can also be configured to determine a touch of the portion of the electronic pen 105 held by the user or to determine a touch of some other portion of the electronic pen 105.

Functions of Mobile Terminal

Figure 7:
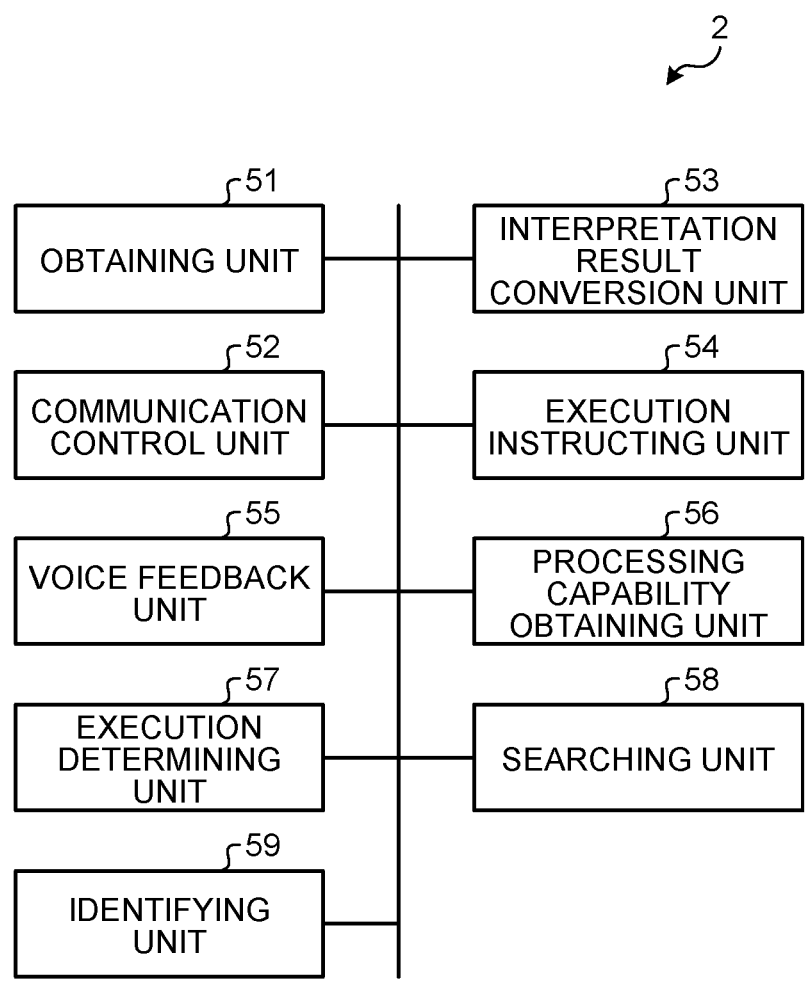
FIG. 7 is a diagram illustrating an exemplary functional block configuration of the mobile terminal used in the voice operation system according to the first embodiment.

In the mobile terminal 2, the CPU 21 executes the operating-voice processing program stored in the ROM 23, and functions as an obtaining unit 51; a communication control unit 52; a voice feedback unit 55 that represents an example of a correction output unit; a processing capability obtaining unit 56; an execution determining unit 57 that represents an example of a determining unit; a searching unit 58; and an identifying unit 59 as illustrated in FIG. 7.

The obtaining unit 51 is an example of an obtaining unit and a first obtaining unit, and obtains an instruction voice of the user collected via the microphone unit 29 and for voice-operating the MFP 1. The communication control unit 52 represents an output unit, a first output unit, a second output unit, a third output unit, a second obtaining unit, and a third obtaining unit; and controls the communication between the mobile terminal 2 and the MFP 1, the communication between the mobile terminal 2 and the voice recognition server device 3, and the communication between the mobile terminal 2 and the AI assistant server device 4. The interpretation result conversion unit 53 represents an example of a converting unit; and converts an interpretation result of the text data of an instruction voice of the user in the AI assistant server device 4, into a job execution command (an example of instruction information) for the MFP 1. The execution instructing unit 54 sends the job execution command to the MFP 1 and instructs execution of a job.

The voice feedback unit 55 represents an example of a correcting unit; and, in order to enable interactive voice input operations, for example, gives a voice feedback for prompting an input to supplement the insufficient data or gives a voice feedback for confirming the input. The processing capability obtaining unit 56 obtains, from the MTP 1, the processing capability (an example of information processing capability) regarding, for example, the maximum processable pixel count. The execution determining unit 57 compares the capability of the MFP 1 with the job specified by the user, and determines whether or not the user-specified job is executable in the MFP 1. The searching unit 58 represents an example of a print information detecting unit and an address detecting unit, and searches a memory such as the RAM 22 for the addressee or the file that is instructed by voice by the user. The identifying unit 59 identifies the electronic blackboard 6 representing the target device for coordination with the MTP 1. Moreover, the identifying unit 59 can also have the function of identifying the MFP 1, however, when the AI assistant server device 4 includes an identifying unit 74 or when the MFP 1 includes an identifying unit 112, the identifying unit 59 may be omitted.

In this example, the constituent elements from the obtaining unit 51 to the identifying unit 59 are implemented using software. However, alternatively, some or all of those constituent elements can be implemented using hardware such as an integrated circuit (IC). Moreover, the functions of the constituent elements from the obtaining unit 51 to the searching unit 58 can be implemented using only the operating-voice processing program, or some other computer programs can be made to execute some of the operations, or the operations can be indirectly performed using some other computer programs. For example, the information regarding the processing capability of the MFP 1 is obtained using some other computer program, and the processing capability obtaining unit 56 can obtain the information obtained by the other computer program and thus can obtain the information about the MFP 1 in an indirect manner.

Functions of Voice Recognition Server Device

Figure 8:
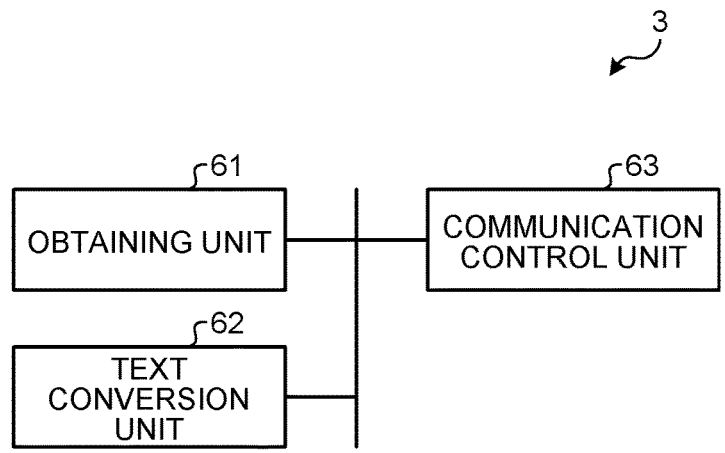
FIG. 8 is a diagram illustrating an exemplary functional block configuration of the voice recognition server device installed in the voice operation system according to the first embodiment.

In the voice recognition server device 3, the CPU 31 executes the operating-voice conversion program stored in the HDD 34 and functions as an obtaining unit 61, a text conversion unit 62, and a communication control unit 63 as illustrated in FIG. 8. The obtaining unit 61 obtains, from the mobile terminal 2, the voice data input by the user. The text conversion unit 62 is an example of a recognizing unit, and converts the voice data input by the user into text data (an example of a recognition result). The communication control unit 63 performs communication control of the communication unit 36 in such a way that the voice data input by the user is received and text data is sent to the mobile terminal 2.

In this example, the constituent elements from the obtaining unit 61 to the communication control unit 63 are implemented using software. However, alternatively, some or all of those constituent elements can be implemented using hardware such as an IC. Moreover, the functions of the constituent elements from the obtaining unit 61 to the communication control unit 63 can be implemented using only the operating-voice conversion program, or some other computer programs can be made to execute some of the operations, or the operations can be indirectly performed using some other computer programs.

Functions of AI Assistant Server Device

Figure 9:
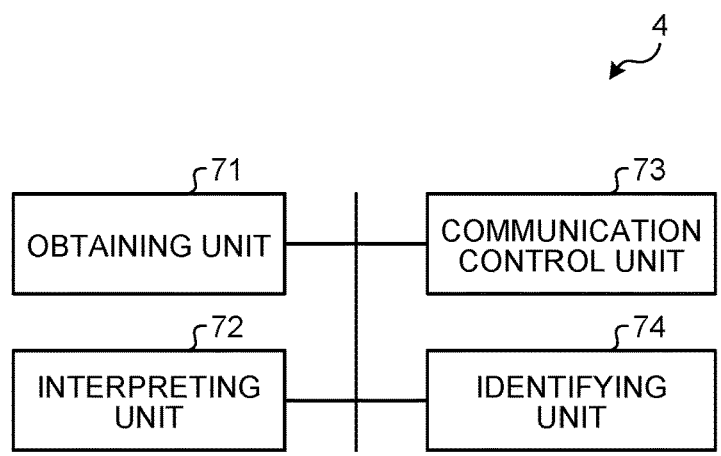
FIG. 9 is a diagram illustrating an exemplary functional block configuration of the AI assistant server device installed in the voice operation system according to the first embodiment.

In the AI assistant server device 4, the CPU 41 executes the operation interpretation program stored in the HDD 44, and functions as an obtaining unit 71, an interpreting unit 72, and a communication control unit 73 as illustrated in FIG. 9. The obtaining unit 71 obtains text data of the voice data that is input by the user in the mobile terminal 2. The interpreting unit 72 interprets, based on the text data, the operation instruction issued by the user. The communication control unit 73 performs communication control of the communication unit 46 in such a way that the interpretation result is sent to the mobile terminal 2 and text data of the voice data, which is input by the user, is received. The identifying unit 74 identifies the electronic blackboard 6 representing the target device for coordination with the MFP 1. Moreover, the identifying unit 74 can also have the function of identifying the MFP 1. However, when the mobile terminal 2 includes the identifying unit 59 or when the MFP 1 includes the identifying unit 112, the identifying unit 74 may be omitted.

In this example, the constituent elements from the obtaining unit 71 to the identifying unit 74 are implemented using software. However, alternatively, some or all of those constituent elements can be implemented using hardware such as an IC. Moreover, the functions of the constituent elements from the obtaining unit 71 to the communication control unit 73 can be implemented using only the operation interpretation program, or some other computer programs can be made to execute some of the operations, or the operations can be indirectly performed using some other computer programs.

Functions of MFP

Figure 10:
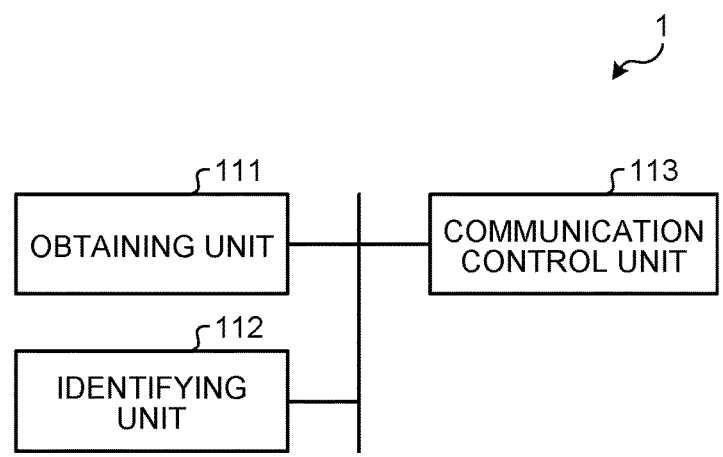
FIG. 10 is a diagram illustrating an exemplary functional block configuration of the MFP installed in the voice operation system according to the first embodiment.

In the MFP 1, the CPU 10 executes a computer program stored in the HDD 13 and functions as an obtaining unit 111, the identifying unit 112, and a communication control unit 113 (a sending unit) as illustrated in FIG. 10. The obtaining unit 111 obtains job commands sent from the mobile terminal 2. If information enabling identification of the output device that would be performing coordinated operations is not included in a job command obtained from the mobile terminal 2; then, according to the output device location specified as a setting value in the job command, the identifying unit 112 refers to the device management table given in Table 3 (described later) and stored in the HDD 13, and identifies the output device. The communication control unit 113 controls the communication unit 15 to receive a job command from the mobile terminal 2 and to send the data (scanned data) regarding the output device identified by the identifying unit 112.

In this example, the constituent elements from the obtaining unit 111 to the communication control unit 113 are implemented using software. However, alternatively, some or all of those constituent elements can be implemented using hardware such as an IC. Moreover, the functions of the constituent elements from the obtaining unit 111 to the communication control unit 113 can be implemented using only the abovementioned computer program, or some other computer programs can be made to execute some of the operations, or the operations can be indirectly performed using some other computer programs.

Meanwhile, the operating-voice processing program, the operating-voice conversion program, the operation interpretation program, and the computer program of the MFP 1 can be recorded as installable or executable files in a computer-readable recording medium such as a compact disc-read only memory (CD-ROM) or a flexible disc (FD). Alternatively, the computer programs can be recorded in a computer-readable recording medium such as a compact disc-recordable (CD-R), a digital versatile disk (DVD), a Blu-ray (registered trademark) disc, or a semiconductor memory. Still alternatively, the computer programs can be provided in the installable form via a network such as the Internet, or can be stored in advance in the internal ROM.

Overall Operations During Voice Input Operation

Figure 11:
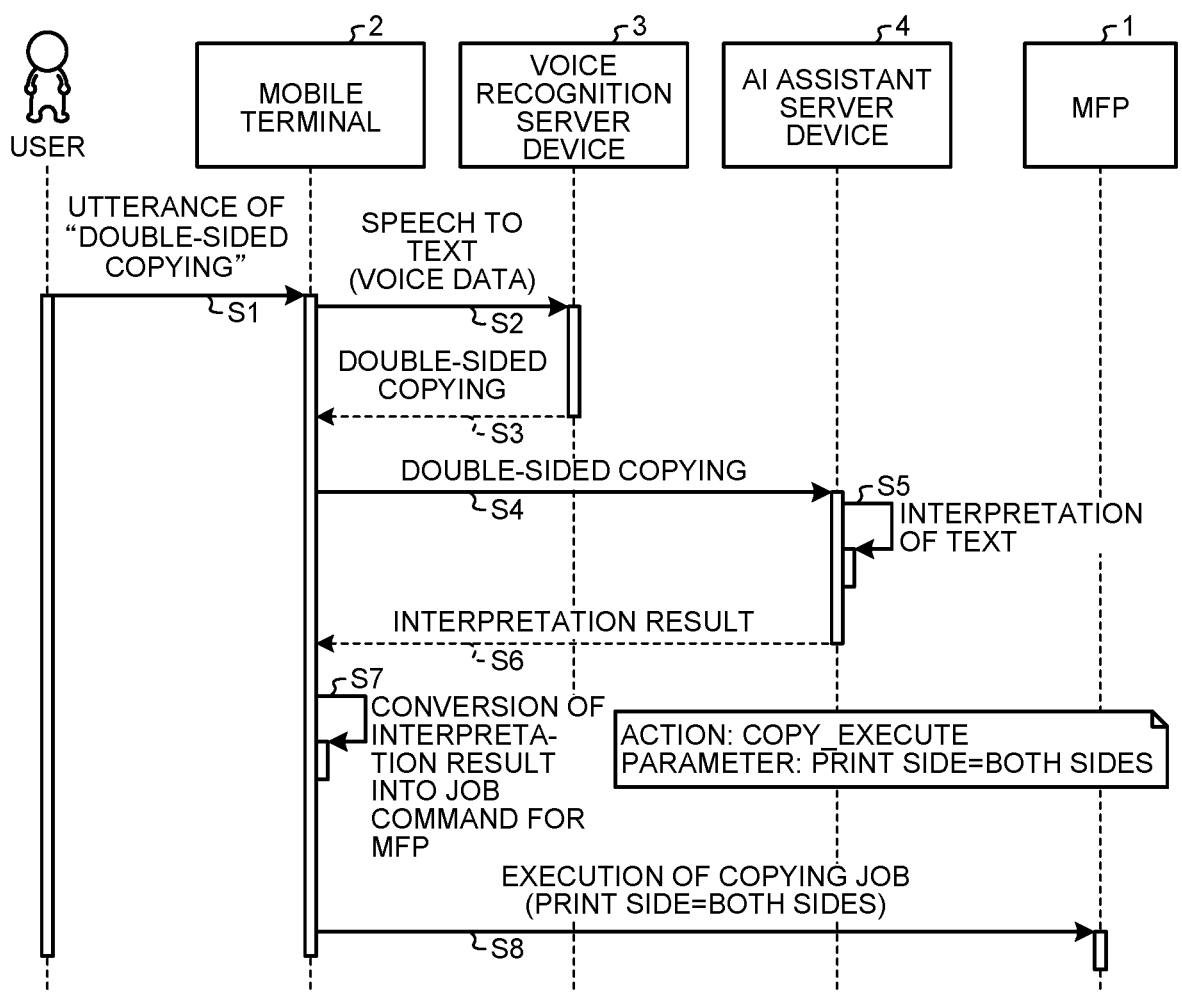
FIG. 11 is a sequence diagram for explaining an example of the overall flow of operations performed during a voice input operation in the voice operation system according to the first embodiment.

Explained with reference to FIG. 11 is the overall flow of operations performed during a voice input operation in the voice operation system according to the first embodiment. In the example illustrated in FIG. 11, a voice input operation is performed via the mobile terminal 2 for implementing the double-sided copying function of the MTP 1. In this case, the user activates the operating-voice processing program of the mobile terminal and utters, for example, "double-sided copying". The voice of the user is collected by the microphone unit 29 of the mobile terminal 2, and is obtained by the obtaining unit 51 (Step S1). Then, the communication control unit 52 of the mobile terminal 2 controls the communication unit 25 to send voice data of "double-sided copying" and issue a text conversion request to the voice recognition server device 3 (Step S2).

In the voice recognition server device 3, the text conversion unit 62 converts the voice data of "double-sided copying" into text data. Then, the communication control unit 63 controls the communication unit 36 to send the text data, which is obtained by conversion, to the mobile terminal 2 (Step S3). In the mobile terminal 2, the communication control unit 52 sends the text data of "double-sided copying" to the AI assistant server device 4 (Step S4).

In this example, the interpreting unit 72 of the AI assistant server device 4 interprets that the operation to be requested to the MFP 1 for execution is "copying (Action: Copy_Execute)", and interprets that the "print side is on both sides (print side=both sides)" (Step S5). In this way, based on the text data, the interpreting unit 72 generates an interpretation result indicating the job type (action) and the job details (parameters) specified by the user. Then, the communication control unit 63 of the AI assistant server device 4 sends the interpretation result to the mobile terminal 2 via the communication unit 46 (Step S6).

In the mobile terminal 2, the interpretation result conversion unit 53 converts the interpretation result, which is received from the AI assistant server device 4, into a job command for the MFP 1 (Step S7). Table 1 given below illustrates an example of interpretation results and job commands that are obtained by conversion of the interpretation results. Meanwhile, in order to convert an interpretation result into a job command, the interpretation result conversion unit 53 can be configured to store information equivalent to Table 1 in the memory unit of the mobile terminal device 2 for reference purposes.

TABLE 1

| Name | Value | Operations in Voice Actions App |
|---|---|---|
| Action | COPY_EXECUTE | Execution of copying job |
|  | SCAN_EXECUTE | Execution of scanning job |
|  | PRINT_EXECUTE | Execution of printing job |
|  | FAX_EXECUTE | Execution of faxing job |
|  | SCAN_TO_DISPAY | Transmission of scanning result to device |
|  | DISPLAY_TO_PRINT | Printing of display contents of device |
|  | SCREENSHOT_TO_PRINT | Printing of screenshots stored in device |
|  | DOCUMENT_TO_DISPLAY | Transmission of documents stored in MFP to device |
| Parameter | Print side | Modification of setting value of print side |
|  | Number of copies | Modification of setting value of number of copies |
|  | Output device | Specification of device type |
|  | Output device location | Specification of device location |

*"Parameter" may include all parameters specifiable as setting values of job

In the example given in Table 1, as the operations performed only in the MFP 1, "COPY_EXECUTE", "SCAN_EXECUTE", "PRINT_EXECUTE", and "FAX_EXECUTE" are illustrated as examples of actions. Moreover, as the operations performed in coordination between the MFP 1 and the electronic blackboard 6, "SCAN_TO_DISPLAY", "DISPLAY_TO_PRINT", "SCREENSHOT_TO_PRINT", and "DOCUMENT_TO_DISPLAY" are illustrated as examples of actions. Furthermore, "print side", "number of copies", "output device", and "output device location" are illustrated as examples of the parameters. Herein, the parameters include all parameters that are specifiable as the setting values of jobs.

In the mobile terminal 2, the interpretation result conversion unit 53 converts the interpretation result of "COPY_EXECUTE" as a job command of "execute a copying job" for the MFP 1. Moreover, the interpretation result conversion unit 53 converts the interpretation result of "SCAN_EXECUTE" as a job command of "execute a scanning job" for the MFP 1. Furthermore, the interpretation result conversion unit 53 converts the interpretation result of "PRINT_EXECUTE" as a job command of "execute a printing job" for the MFP 1. Moreover, the interpretation result conversion unit 53 converts the interpretation result of "FAX_EXECUTE" as a job command of "execute faxing job" for the MFP 1. Furthermore, the interpretation result conversion unit 53 converts the interpretation result of "SCAN_TO_DISPLAY" as a job command of "send the scanning result to the device" for the MFP 1. Moreover, the interpretation result conversion unit 53 converts the interpretation result of "DISPLAY_TO_PRINT" as a job command of "print the display contents of the device" for the MFP 1. Furthermore, the interpretation result conversion unit 53 converts the interpretation result of "SCREENSHOT_TO_PRINT" as a job command of "print the screenshot stored in the device" for the MTP 1. Moreover, the interpretation result conversion unit 53 converts the interpretation result of "DOCUMENT_TO_DISPLAY" as a job command of "send the documents stored in the MFP to the device" for the MFP 1. Herein, the "device" implies a device (a second external device) such as the electronic blackboard 6 that can communicate with the MFP 1.

When the parameter "print side" is included in the interpretation result, the interpretation result conversion unit 53 of the mobile terminal 2 generates a job command of "change the setting value regarding the print side" for the MFP 1. Moreover, when the parameter "number of copies" is included in the interpretation result, the interpretation result conversion unit 53 generates a job command of "change the setting value regarding the number of copies" for the MFP 1. Furthermore, when the parameter "output device" is included in the interpretation result, the interpretation result conversion unit 53 generates a job command of "specify the device type" for the MFP 1. Herein, the device type represents information enabling identification of the second external device such as the electronic blackboard 6; and can contain the type of the device, the model number of the device, the device ID, and the functions of the device. Meanwhile, when the parameter "output device location" is included in the interpretation result, the interpretation result conversion unit 53 generates a job command of "specify the location of the device" for the MFP 1. Herein, the location of the device represents information enabling identification of the location of installation of the second external device; and can contain the building name, the floor, and the room name.

That is, in the mobile terminal 2, according to the information included in the "action" section of the interpretation result, the interpretation result conversion unit 53 determines the type of the job to be executed by the MFP 1; treats the values included in the "parameter" section as the setting values of the job; and converts the interpretation result into a job command.

Then, in the mobile terminal 2, the communication control unit 52 controls the communication unit 25 to send the generated job command to the MFP 1 (Step S8). In this example, a job command of "execute a copying job (print side=both sides)" is sent to the MFP 1. In response, double-sided printing is performed in the MFP 1.

Details of Interpretation Operation in AI Assistant Server Device

In the AI assistant server device 4, an AI memory unit 40 in the HDD 44 is used to store AI assistant service information that is to be used in interpreting the jobs specified by the user by performing voice input. The AI assistant service information contains entity information, action information, and intent information. The entity information represents information for associating the parameters of a job with natural language. Herein, a single parameter can have a plurality of synonyms registered is a corresponding manner. The action information represents information indicating the type of a job. The intent information represents information for associating the uttered phrase (natural language) of the user with the entity information, and for associating the uttered phrase (natural language) of the user with the action information. As a result of having the intent information, even if there is some change in the order of utterance or the nuances in the parameters, it still becomes possible to perform correct interpretation. Moreover, as a result of having the intent information, the response text (interpretation result) can be generated based on the input contents.

FIG. 12 illustrates an example of the entity information. In FIG. 12, the entity information corresponds to the printing color (Print Color). In FIG. 12, the term "Print Color" indicates the entity name. Moreover, in FIG. 12, the terms such as "auto color", "monochrome", "color", and so on that are given in the left-side column indicate parameter names. Furthermore, in FIG. 12, the terms such as "auto color", "monochrome, black and white", "color, full color", and so on that are given in the right-side column indicate synonyms.

As can be understood from FIG. 12, the parameters and the synonyms are stored in a corresponding manner as the entity information. As a result of registering the synonyms along with the parameters, for example, if black-and-white copying is to be instructed, the parameter setting can be performed regardless of whether "Please copy by black and white" is uttered or whether "Please copy by monochrome" is uttered.

FIG. 13 illustrates, at (a), an example of uttered phrases of the user; FIG. 13 illustrates, at (b), the action name; and FIG. 13 illustrates, at (c), the entity information. As illustrated at (a) to (c) in FIG. 13, in the screen displayed in the display unit 48 of the AI assistant server device 4, the utterance of the user is dragged by operating the operating unit 49. Alternatively, in the screen displayed in the display unit of a device that accessed the AI assistant server device 4 via a network, the utterance of the user is dragged using the operating unit of that device.

That enables selection of the entity information that is to be associated. Moreover, if a value is set in the selected entity information, the parameters included in the response get modified. For example, when "Please copy by black and white" is uttered; if the value is set to "SprintColor", then "printColor=monochrome" is obtained as the return value. If the value is set to "SprintColor.original", then "printColor=black and white" is obtained as the return value. Thus, if the value is set to "SprintColor.original", then the contents of the utterance of the user can be returned without modification as the parameters in the response.

Interactive Operations

In the voice operation system according to the first embodiment, an interactive system is implemented in which the system gives a response based on the details of the user input. In the voice operation system according to the first embodiment, apart from responding with fixed phrases required in interaction, two other types of responses, namely, an "insufficient input feedback" and an "input confirmation feedback" are given as the operation-specific responses from the MFP 1; and an interactive MFP operation system is implemented.

The "insufficient input feedback" is a response output when the required information for job execution is not fully available. When the result of the user input is not properly audible or when the required parameters are missing, the "insufficient input feedback" is output. Thus, if any parameters other than the required parameters are not specified, then there is no need to output the "insufficient input feedback". Moreover, apart from confirming the parameters, the function to be used, such as the copying function or the scanning function, can also be confirmed.

For example, according to the type of the external device that is in communication connection with the mobile terminal device 2, the functions and the parameters to be confirmed with the user can be varied. In that case, after establishing communication with the external device, the processing capability obtaining unit 56 can obtain the type and the functions of the external device at a predetermined timing; and, for example, the voice feedback unit 55 can decide on the functions and the parameters to be confirmed with the user based on the obtained information. For example, when the MFP 1 represents the external device, the functions of the MPF 1 such as copying, printing, scanning, and faxing can be confirmed with the user; and, only from among the functions of the MPF 1 such as copying, printing, scanning, and faxing, the function to be used can be confirmed with the user.

The "input confirmation feedback" is a response output when the required information for job execution is fully available. That is, the input confirmation feedback is output when all required parameters are specified. Moreover, the input confirmation feedback is performed to prompt the user to select between executing the job with the current setting values and modifying the setting values. In order to confirm whether or not execute the job with the current setting values, all of the user-specified parameters (regardless of the required parameters and the other parameters) can be voice-output for confirmation with the user.

Figure 14:
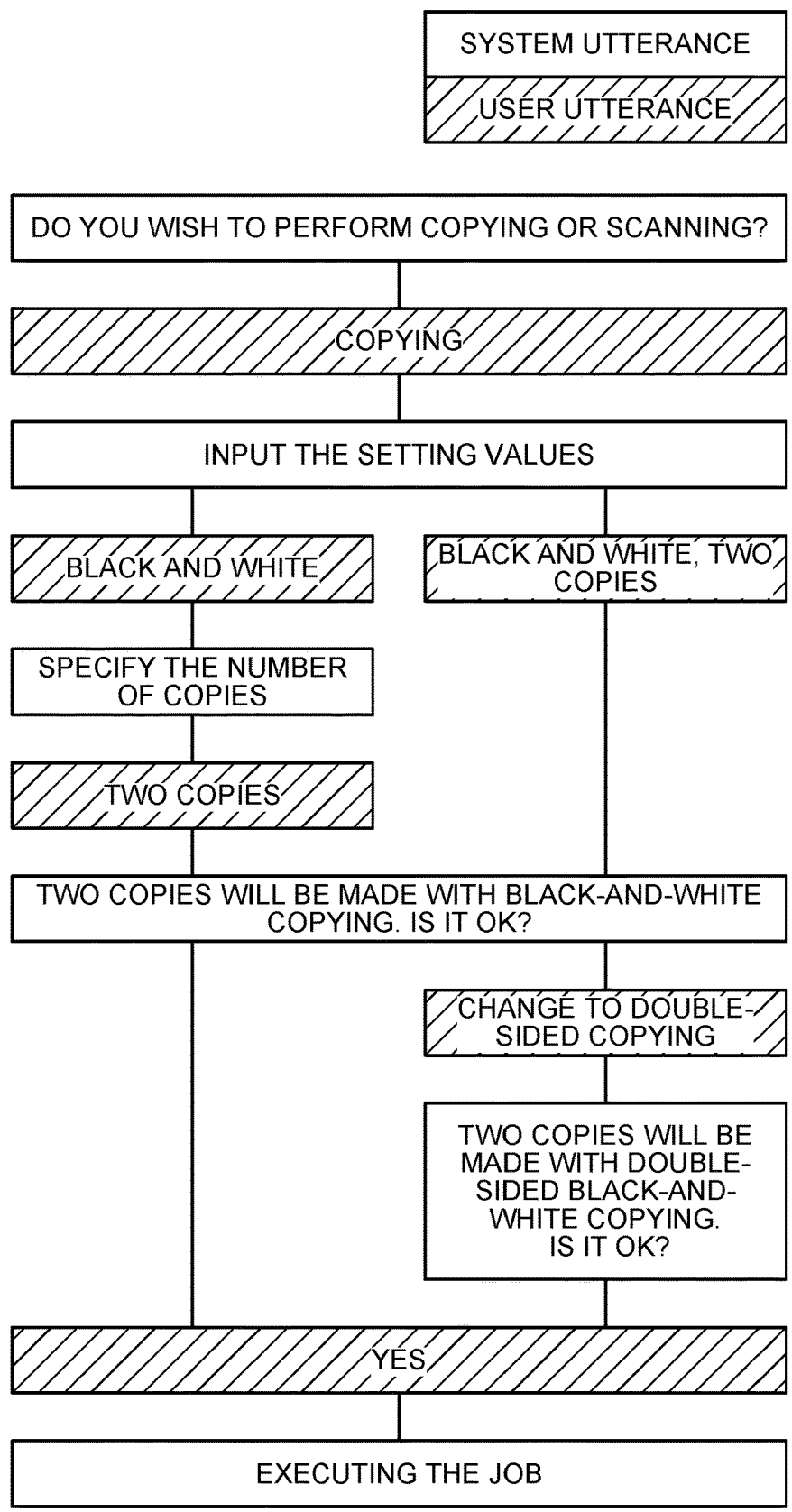
FIG. 14 is a diagram illustrating an example of the flow of interactive input operations in the voice operation system according to the first embodiment.

FIG. 14 illustrates an example of interactive operations that are performed between the system and a user and that include various feedbacks explained above. In the example illustrated in FIG. 14, the MFP 1 is operated to perform double-sided copying of black-and-white images and obtain two copies. In this example, the number of copies (=two) represents the required parameter. However, it is not limited to have the number of copies as the only required parameter, and alternatively a plurality of parameters such as black-and-white, color, and paper size can be included as the required parameters.

Meanwhile, which of the parameters are the required parameters can be stored in advance in the memory unit of the AI assistant server device 4. The user can be allowed to operate the operating unit 49 or access the AI assistant server device 4 via a network, and to modify the required parameters.

In the example illustrated in FIG. 14, the utterances having hatched lines represent the utterances of the user; and the utterances not having hatched lines represent the utterances of the system. Firstly, the system performs a voice output of "do you wish to perform copying or scanning?". In response, the user utters "copying" and instructs the use of the copying function. Then, the system performs a voice output of "input the setting values" to request for the input of the setting values of the user-specified "copying".

In response, assume that the user utters "black and white". In this example, since the number of copies is the required parameter, the system performs a voice output of "specify the number of copies" to request for the input of the number of copies. That represents an example of the "insufficient input feedback". In response to the "insufficient input feedback", the user specifies the number of copies such as "two copies". As a result, the insufficiency in the input gets resolved, the system responds with "Two copies will be made with black-and-white copying. Is it OK?" for prompting an instruction to start copying. That represents the "input confirmation feedback" output when the required information for job execution becomes fully available.

Meanwhile, in response to the voice output of "input the setting values" from the system, when the user responds with "black and white, two copies", the required information for job execution becomes fully available. Thus the system performs the "input confirmation feedback" of "Two copies will be made with black-and-white copying. Is it OK?" as explained above.

In the case of changing the mode from single-sided copying to double-sided copying, the user performs a voice input of "change to double-sided copying". In that case, since the required information for job execution is fully available, the system performs the "input confirmation feedback" of "Two copies will be made with double-sided black-and-white copying. Is it OK?".

In response to the "input confirmation feedback" of "Two copies will be made with black-and-white copying. Is it OK?" or "Two copies will be made with double-sided black-and-white copying. Is it OK?", if the user utters "yes"; the system responds with "executing the job", and executes the user-specified job.

Flow of Interactive Operations

Figure 15:
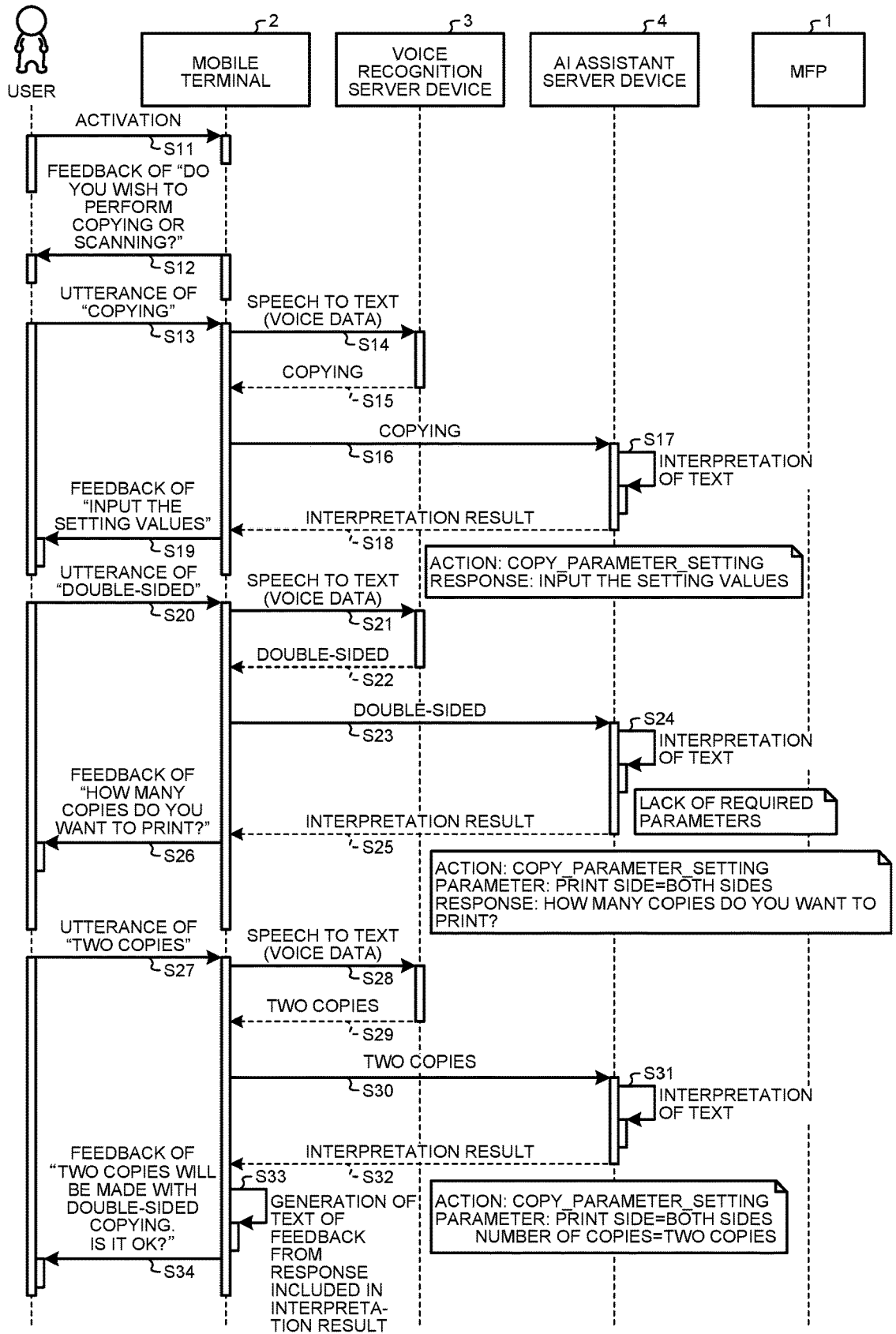
FIG. 15 is a sequence diagram for explaining an exemplary flow of operations in the first half of interactive input operations in the voice operation system according to the first embodiment.
Figure 16:
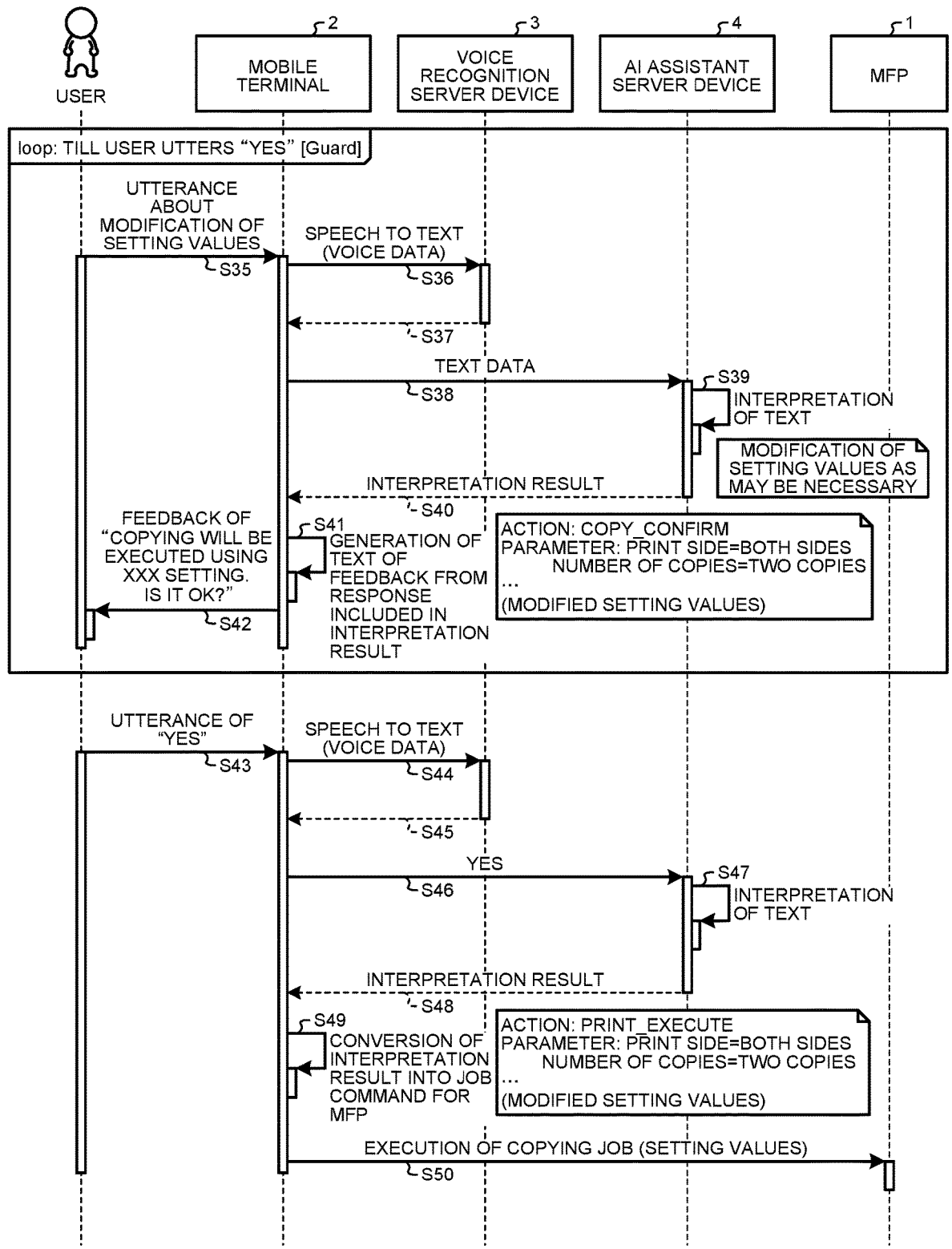
FIG. 16 is a sequence diagram for explaining an exemplary flow of operations in the second half of interactive input operations in the voice operation system according to the first embodiment.

FIGS. 15 and 16 are sequence diagrams for explaining the flow of interactive operations. FIG. 15 illustrates the flow of operations in the first half of the interactive operations, and FIG. 16 illustrates the flow of operations in the second half of the interactive operations.

Firstly, when the user activates the operating-voice processing program in the mobile terminal 2 (Step S11), the voice feedback unit 55 gives a voice feedback of "do you wish to perform copying or scanning?" (Step S12). If the user utters "copying" (Step S13), the communication control unit 52 of the mobile terminal 2 sends the voice data of "copying" to the voice recognition server device 3 and issues a text conversion request (Step S14). In the voice recognition server device 3, the text conversion unit 62 converts the voice data of "copying" into text data, and sends the text data to the mobile terminal 2 (Step S15).

In the mobile terminal 2, the obtaining unit 51 obtains the text data. Moreover, the communication control unit 52 of the mobile terminal 2 sends the obtained text data to the AI assistant server device 4 (Step S16). In the AI assistant server device 4, the interpreting unit 72 interprets the action and the parameters based on the uttered phrase of the user as specified in the received text data, as explained earlier with reference to FIGS. 12 and 13. In this example, since the user has only uttered "copying", the number of copies remains unclear (insufficient input).

For that reason, the interpreting unit 72 generates an interpretation result by adding a response of "input the setting values" to an action "Copy Parameter Setting" (Step S17). Then, the communication control unit 73 of the AI assistant server device 4 sends the interpretation result to the mobile terminal 2 (Step S18). In the mobile terminal 2, the voice feedback unit 55 performs a voice output of "input the setting values" via the speaker unit 28; and a text "Input the setting values" is displayed in the touch panel 27 (Step S19: insufficient input feedback).

Subsequently, in view of the insufficient input feedback, the user utters for example, "double-sided" (Step S20). Then, the communication control unit 52 of the mobile terminal 2 sends the voice data of "double-sided" to the voice recognition server device 3 and issues a text conversion request (Step S21). In the voice recognition server device 3, the text conversion unit 62 converts the voice data of "double-sided" into text data, and sends the text data to the mobile terminal 2 (Step S22).

In the mobile terminal 2, the obtaining unit 51 obtains the text data. Moreover, the communication control unit 52 of the mobile terminal 2 sends the obtained text data to the AI assistant server device 4 (Step S23). In the AI assistant server device 4, the interpreting unit 72 interprets the action and the parameters based on the uttered phrase of the user as specified in the received text data. In this example, since the user has only uttered "copying" and "double-sided", the number of copies remains unclear (missing required parameters).

Meanwhile, which of the parameters are the required parameters can be stored in advance in the memory unit of the AI assistant server device 4. In this case, based on the required parameters stored in the memory unit, the interpreting unit 72 (an example of a determining unit), determines whether or not all required parameters are set with the parameters obtained from the mobile terminal device 2. If the required parameters are not set, then the interpreting unit 72 can prompt the user, via the mobile terminal device 2, to set the required parameters. Herein, the required parameters imply the parameters required for the operations of the MFP 1 representing an example of the first external device. However, that is not the only possible case, and the parameters required for the operations of the electronic blackboard 6, which represents an example of the second device, can also be included as the required parameters.

The interpreting unit 72 generates an interpretation result by adding a response of "how many copies do you want?" to the action "Copy_Parameter_Setting" and the parameter "print side-both sides" (Step S24). Then, the communication control unit 73 of the AI assistant server device 4 sends the interpretation result to the mobile terminal 2 (Step S25). In the mobile terminal 2, the voice feedback unit 55 performs a voice output of "how many copies do you want?" via the speaker unit 28; and a text "How many copies do you want to print?" is displayed in the touch panel 27 (Step S26: insufficient input feedback).

Since the insufficient input feedback is again received, the user utters, for example, "two copies" (Step S27). Then, the communication control unit 52 of the mobile terminal 2 sends the voice data of "two copies" to the voice recognition server device 3 and issues a text conversion request (Step S28). Then the voice recognition server device 3, the text conversion unit 62 converts the voice data of "two copies" into text data, and sends the text data to the mobile terminal 2 (Step S29).

In the mobile terminal 2, the obtaining unit 51 obtains the text data. Moreover, the communication control unit 52 of the mobile terminal 2 sends the obtained text data to the AI assistant server device 4 (Step S30). In the AI assistant server device 4, the interpreting unit 72 interprets the action and the parameters based on the uttered phrase of the user as specified in the received text data. In this example, since the user has sent the voice data of "two copies", the insufficiency in the required parameters for a copying job gets resolved. Hence, the interpreting unit 72 generates an interpretation result by adding the parameters "print side=both sides" and "number of copies=two" to an action "Copy_Confirm" (Step S31). Then, the communication control unit 73 of the AI assistant server device 4 sends the interpretation result to the mobile terminal 2 (Step S32).

In the mobile terminal 2, since the insufficiency in the required parameters has been resolved and the preparation to start copying is completed, the voice feedback unit 55 generates, for example, a feedback text "Two copies will be made with double-sided copying. Is it OK?" based on the response included in the interpretation result (Step S33). Herein, the text can be generated by reading some or all of the text data from the memory unit of the mobile terminal 2 and by combining the read text data.

Meanwhile, the generation of a feedback text by the voice feedback unit 55 is not limited to Step S33. That is, whenever the interpretation result is obtained from the AI assistant server device 4, a feedback text can be generated in an identical manner at other steps too. However, if the text information to be fed back is included in the response to the interpretation result, the feedback text need not be generated. Subsequently, an input confirmation feedback is given (Step S34). In response to the input confirmation feedback, the user performs a voice input for modifying the setting values or instructing the start of copying.

In the sequence diagram illustrated in FIG. 16, the operations from Step S35 to Step S42 represent the flow of operations performed when a voice instruction is issued for modifying the setting values. With reference to FIG. 16, if the user utters about modification of the setting values (Step S35), the text conversion unit 62 of the voice recognition server device 3 generates, text data of the modified setting values and sends them to the AI assistant server device 4 via the mobile terminal 2 (Step S36 to Step S38). Based on the uttered phrase of the user as specified in the received text data, the AI assistant server device 4 generates an interpretation result indicating the modified setting values (Step S39); and sends the interpretation result to the mobile terminal 2 (Step S40).

In the mobile terminal 2, the voice feedback unit 55 generates a feedback text based on the response included in the interpretation result (Step S41) and gives an input confirmation feedback such as "Copying will be executed using XXX settings. Is it OK?" so as to confirm whether or not copying can be started using the modified setting values (Step S42).

In the sequence diagram illustrated in FIG. 16, the operations from Step S43 to Step S50 represent the flow of operations performed when an instruction is issued to start copying. That is, when the user responds with "yes" to the input confirmation feedback (Step S43), that response is converted to a text and is sent to the AI assistant server device 4 via the mobile terminal 2 (Step S14 to Step S46). The AI assistant server device 4 recognizes the copying start instruction based on the received text data; generates an interpretation result by adding the parameters "print side=both sides" and "number of copies=two" to an action "Copy_Execute"; and sends the interpretation result to the mobile terminal 2 (Steps S47 and S48).

In the mobile terminal 2, the interpretation result conversion unit 53 converts the interpretation result into a job command for the MFP 1 (Step S49) and sends the job command to the MFP 1 (Step S50). In this way, the MFP 1 can be controlled for copying using the voice input operations.

Example of Information Feedback from AI Assistant Server Device 4

In Table 2 given below are illustrated examples of the interpretation result that is fed back from the AI assistant server device 4 to the mobile terminal 2.

TABLE 2

| Name | Value | Operations in Voice Actions App |
|---|---|---|
| Action | COPY_PARAMETER_SETTING | Prompting input of setting values of job |
|  | COPY_CONFIRM | Prompting confirmation of setting values of job |
|  | COPY_EXECUTE | Print job execution |
| Parameter | Print side | Modification of setting value of print side |
|  | Number of copies | Modification of setting value of number of copies |
| Response | Text | Giving feedback of contents specified in text to user |

*"Parameter" may include all parameters specifiable as setting values of job

As illustrated in Table 2, for example, an action such as "COPY_PARAMETER_SETTING" for prompting input of the setting values of the job, or "COPY_CONFIRM" for prompting confirmation of the setting values of the job, or "COPY_EXECUTE" for informing about the start of execution of the job is included in an interpretation result and is fed back to the mobile terminal 2.

The voice feedback unit 55 can determine the feedback to be given to the user according to the action, the parameters, and the response included in the interpretation result. In order to decide on the contents to be fed back, the voice feedback unit 55 can be configured to store the information equivalent to Table 2 in the memory unit of the mobile terminal device 2 for reference purposes. Meanwhile, Table 2 is given for the example of copying. However, regarding printing, scanning, and faxing too; actions such as "PARAMETER_SETTING" for prompting input of the setting values of the job and "CONFIRM" for prompting confirmation of the setting values of the job can be used in an identical manner to Table 2.

Moreover, the setting value about the print side, such as double-sided or single-sided, or the parameter such as the number of copies is included in the interpretation result, and is fed back to the mobile terminal 2. Furthermore, when the required parameters are missing, a message for prompting the input of missing parameters is included as a response in the interpretation result and is fed back to the mobile terminal 2.

Interaction at Time of Execution of Job and Occurrence of Error

Figure 17:
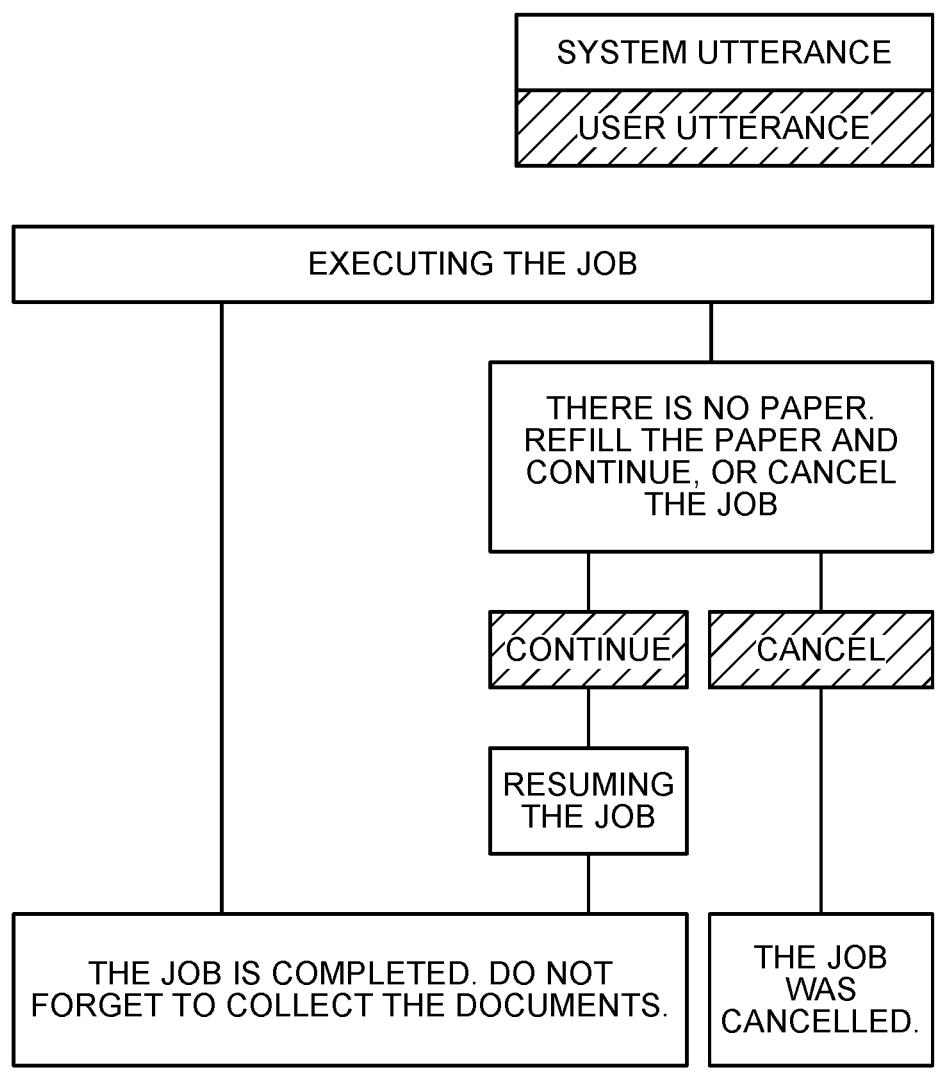
FIG. 17 is a diagram for explaining as exemplary flow of interactive input operations performed at the time of occurrence of an error in the voice operation system according to the first embodiment.

FIG. 17 illustrates an example of interaction in the case in which, for example, the user responds with "yes" to an input confirmation feedback of "Job will be executed. Is it OK?"; and either the job is executed or an error occurs.

When the user responds with "yes" to the input confirmation feedback of "Job will be executed. Is at OK?", the job is executed in the MFP 1. If the job is completed without any hitch; then, for example, a completion message (as a voice and as a text) such as "The job is completed. Do not forget to collect the documents." is output via the mobile terminal 2.

On the other hand, for example, in case an error such as insufficiency of paper sheets occurs, a confirmation feedback such as "there is no paper. Refill the paper and continue, or cancel the job" is given for the job. In response to the confirmation feedback, when the user refills paper sheets in the MFP 1 and utters "continue" as a response; the MFP 1 is instructed to continue the job, and thus the job is resumed in the MEP 1. However, in response to the confirmation feedback, if the user utters "cancel" and instructs cancellation of the job, the MFP 1 is notified about job cancelation, and thus the job is cancelled following the occurrence of the error. Then, a confirmation feedback such as "The job was cancelled." is output in the form of a voice and a text via the mobile terminal 2.

Figure 18:
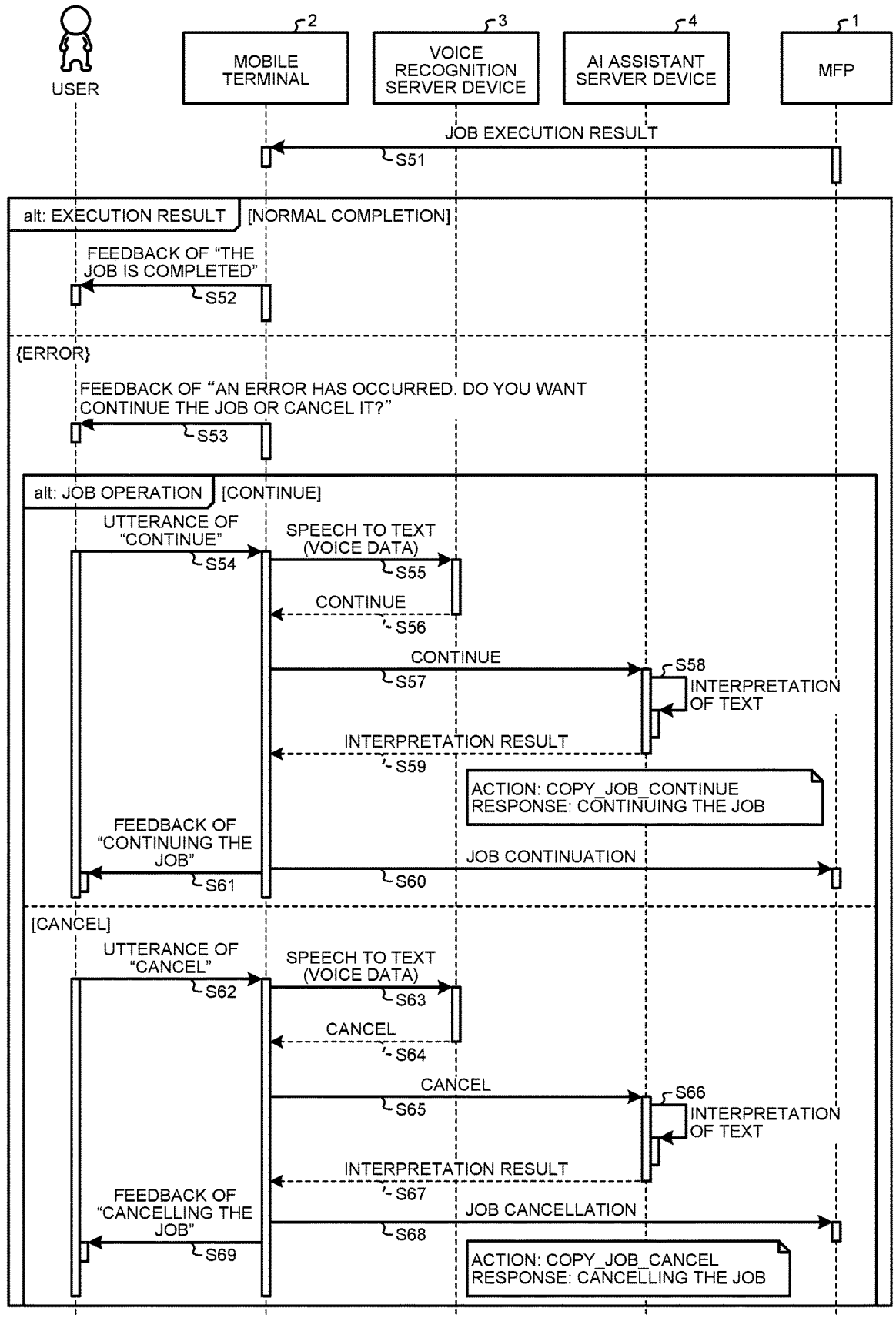
FIG. 18 is a sequence diagram for explaining an exemplary flow of interactive input operations performed at the time of occurrence of as error in the voice operation system according to the first embodiment.

Flow of Interactive Operations at Time of Execution of Job and Occurrence of Error FIG. 18 illustrates a sequence diagram for explaining the flow of interactive operations performed at the time of execution of a job and at the time of occurrence of an error. The MFP 1 sends, to the mobile terminal 2, either the execution result indicating normal completion of the job or the execution result indicating occurrence of an error. In the mobile terminal 2, when the execution result indicating normal completion of the job is received, the voice feedback unit 55 outputs a voice message such as "the job is completed" (Step S52). On the other hand, in the mobile terminal 2, when the execution result indicating the occurrence of an error is received, the voice feedback unit 55 outputs a voice message such as "an error has occurred. Do you want to continue the job or cancel it?" for inquiring about whether or not to continue the job (Step S53).

In FIG. 18, the operations from Step S54 to Step S56 represent the flow of operations performed by the constituent elements when it is specified to continue the job. That is, in response to the inquiry "an error has occurred. Do you want to continue the job or cancel it?"; when the user eliminates the cause for the occurrence of the error and utters "continue" as the response (Step S54), the response is converted into a text and is sent to the AI assistant server device 4 (Step S55 to Step S57).

The AI assistant server device 4 generates an interpretation result in which "COPY_JOB_CONTINUE" represents the action and "continuing the job" represents the response; and sends the interpretation result to the mobile terminal 2 (Steps S58 and S59). In the mobile terminal 2, the execution instructing unit 54 instructs the MFP 1 to continue the job (Step S60). Moreover, in the mobile terminal 2, the voice feedback unit 55 sends "continuing the job" as the input confirmation feedback (Step S61).

On the other hand, in FIG. 18, the operations from Step S62 to Step S69 represent the flow of operations performed by the constituent elements when the user has specified to cancel the job. That is, in response to the inquiry "an error has occurred. Do you want to continue the job or cancel it?", if the user utters "cancel" as the response (Step S62), the response is converted into a text and is sent to the AI assistant server device 4 (Step S63 to Step S65).

The AI assistant server device 4 generates an interpretation result in which "Copy_Job_Cancel" represents the action and "cancelling the job" represents the response; and sends the interpretation result to the mobile terminal 2 (Steps S66 and S67). In the mobile terminal 2, the execution instructing unit 54 instructs the MFP 1 to cancel the job (Step S68). Moreover, in the mobile terminal 2, the voice feedback unit 55 sends "cancelling the job" as the input confirmation feedback (Step S69).

Figure 19:
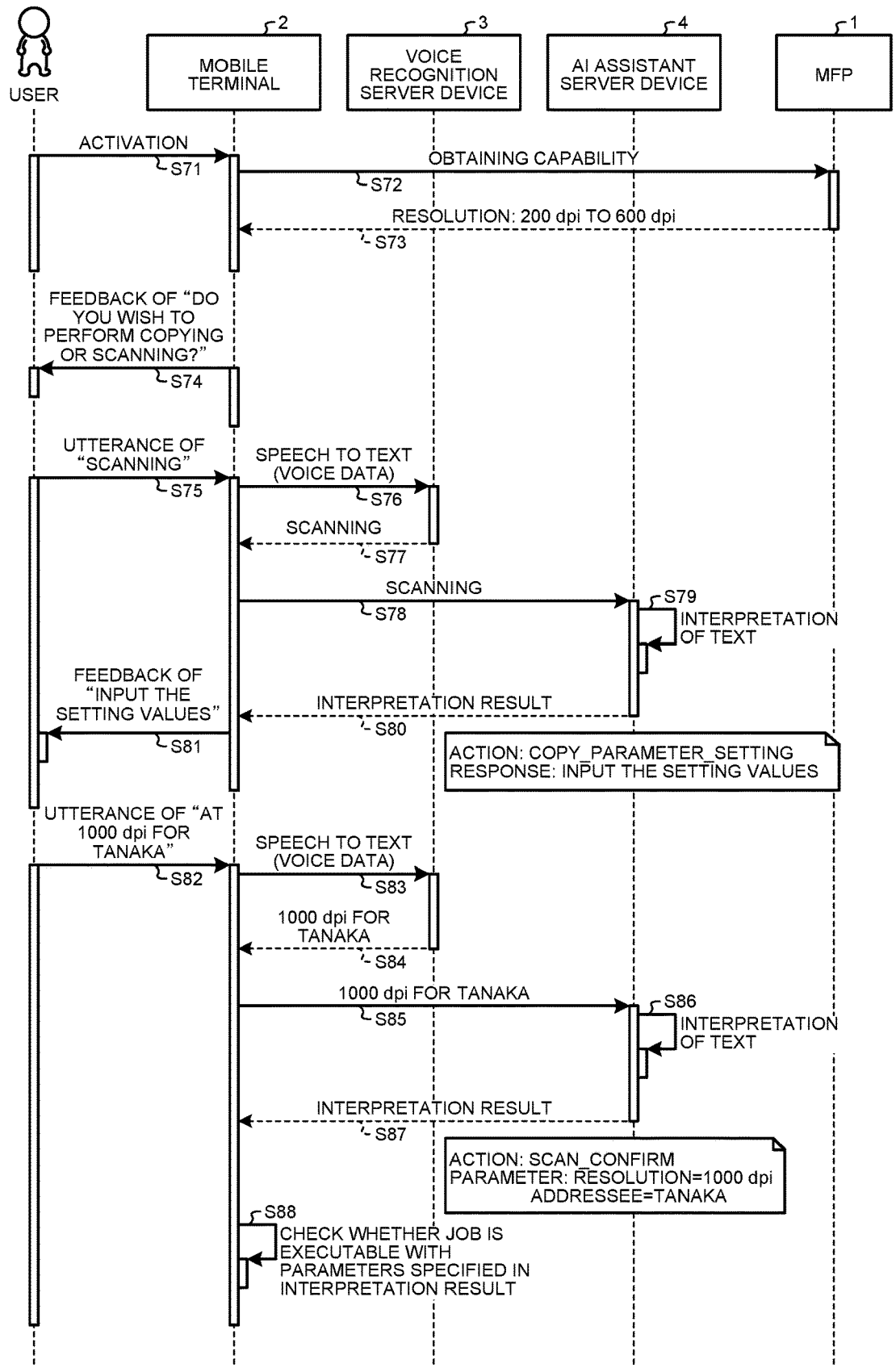
FIG. 19 is a sequence diagram for explaining an exemplary flow of operations in the first half of interactive input operations performed to execute scanning according to the device capability of the MFP in the voice operation system according to the first embodiment.
Figure 20:
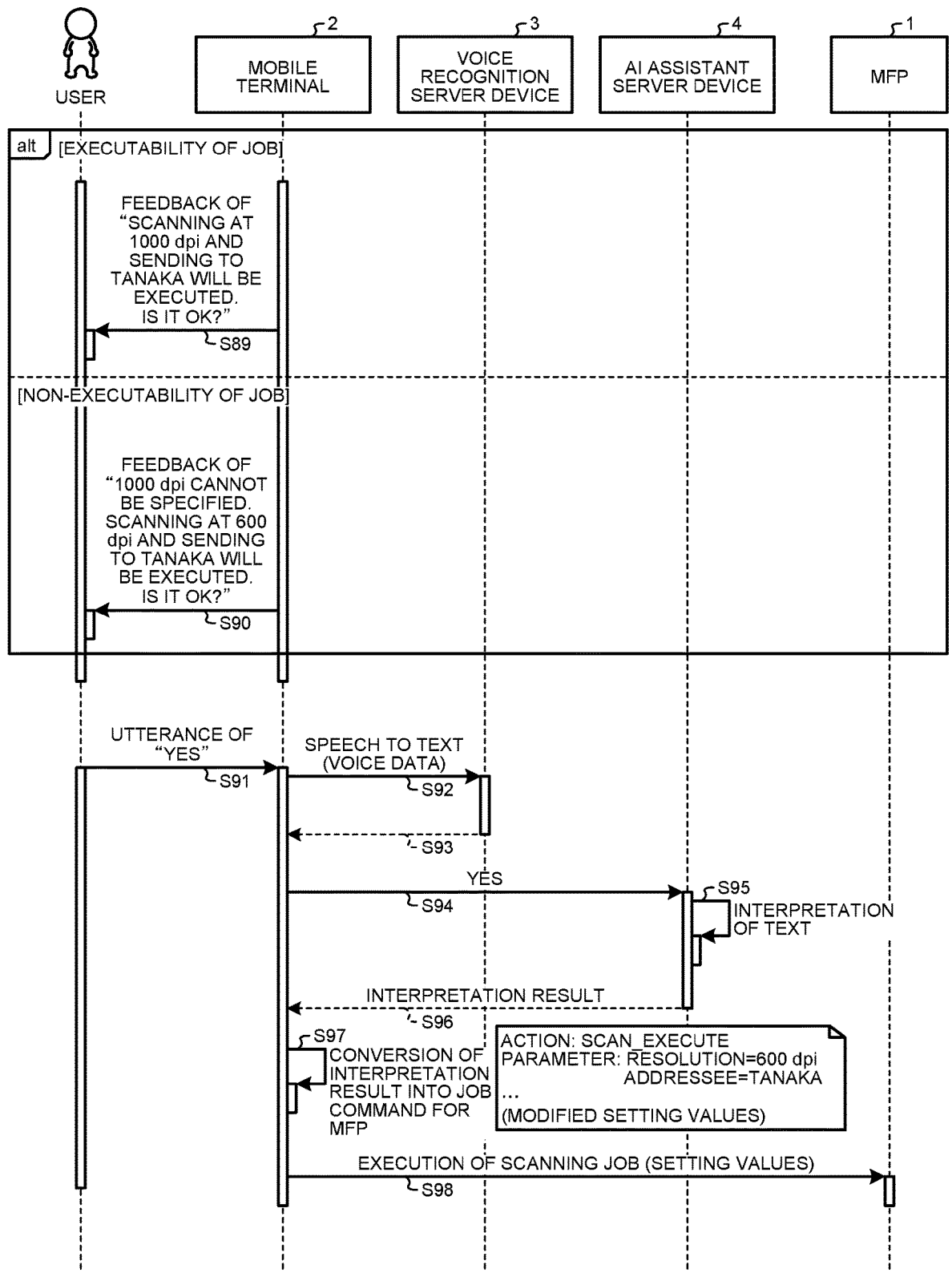
FIG. 20 is a sequence diagram for explaining an exemplary flow of operations in the second half of interactive input operations performed to execute scanning according to the device capability of the MFP in the voice operation system according to the first embodiment.

Adjustment Operation for Interactively Adjusting Parameters According to Device Capability of MFP In the voice operation system according to the first embodiment, the execution of a job compatible to the device capability of the MFP 1 is implemented using interactive operations. FIG. 19 is a sequence diagram for explaining the flow of operations performed to determine whether or not the MFP 1 has the device capability required for executing a user-specified job. FIG. 20 is a sequence diagram for explaining the flow of operations in the case in which the device capability of the MFP 1 enables execution of a job and in the case in which the device capability of the MFP 1 makes it difficult to execute a job.

Firstly, with reference to the sequence diagram illustrated in FIG. 19, when a mobile voice processing program in the mobile terminal 2 is activated (Step S71), the processing capability obtaining unit 56 inquires the MTP 1 about, for example, the process-able resolution as an example of the information processing capability (obtaining the capability: Step S72). In response to the inquiry, the MTP 1 sends "200 dpi to 600 dpi" as the processable resolution to the mobile terminal 2 (Step S73). As a result, the process-able resolution of the MFP 1 gets recognized in the mobile terminal 2. Herein, although the processing capability of the MFP 1 is assumed to be the information processing capability obtained by inquiry by the processing capability obtaining unit 56; it is not the only possible case. Alternatively, the information processing capability of the electronic blackboard 6, which represents an example of the second external device, can also be obtained.

Meanwhile, after the communication between the mobile terminal device 2 and the MFP 1 has been established, the processing capability obtaining unit 56 can obtain, in advance, the information about the processing capability at a predetermined timing. Meanwhile, alternatively, some other program can obtain the processing capability, and the processing capability obtaining unit 56 can obtain the information obtained by that other program, and thus can obtain the information about the MFP 1 in an indirect manner.

Subsequently, in the mobile terminal 2, the voice feedback unit 55 gives a voice feedback such as "do you wish to perform copying or scanning?" for prompting issuance of a job command (Step S74). If the user utters "scanning" (Step S75), then the utterance is converted into a text and is sent to the AI assistant server device 4 (Step S76 to Step S78). However, just by issuing a scanning instruction, the required parameters remain missing. Hence, the interpreting unit 72 sends, to the mobile terminal 2, the interpretation result in which "Scan_Parameter_Setting" represents the action and "input the setting values" represents the response (Steps S79 and S80). As a result, in the mobile terminal 2, the voice feedback unit 55 gives an insufficent input feedback of "input the setting values" (Step S81).

In response to the insufficient input feedback, if the user utters "at 1000 dpi for Tanaka", the utterance is converted into a text and is sent to the AI assistant server device (Step S82 to Step S85). In the AI assistant server device 4, the interpreting unit 72 sends, to the mobile terminal 2, the interpretation result in which "Scan_Confirm" represents the action and "resolution=1000 dpi, addressee=Tanaka" represent the parameters (Steps S86 and S87). In the mobile terminal 2, based on the parameters specified in the interpretation result, the execution determining unit 57 determines whether or not the user-specified job is executable in the MFP 1 (Step S88). Herein, based on the parameters, the execution determining unit 57 determines whether or not the user-specified job is executable in the MTP 1. However, that is not limited to that example. Alternatively, it is also possible to determine whether or not the user-specified job is executable in the electronic blackboard 6 representing an example of the second external device.

If the MFP 1 is capable of performing image processing at the resolution of 1000 dpi; then, as illustrated at Step S89 in FIG. 20, the voice feedback unit 55 of the mobile terminal 2 gives an input confirmation feedback of "Scanning at 1000 dpi and sending to Tanaka will be executed. Is it OK".

If the user responds with "yes" to the input confirmation feedback (Step S91), the response is converted into a text and is sent to the AI assistant server device 4 (Step S92 to Step S94). The AI assistant server device 4 sends, to the mobile terminal 2, the interpretation result in which "Scan_Execute" represents the action and "resolution=1000, addressee=Tanaka" represent the parameters (Steps S95 and S96).

In the mobile terminal 2, the interpretation result conversion unit 53 converts the interpretation result into a job command (Step S97). Then, the communication control unit 52 of the mobile terminal 2 sends the job command to the MFP 1 (Step S98).

On the other hand, if 600 dpi is the limit of the processing capability of the MFP 1, then the user-specified image processing at 1000 dpi becomes difficult to perform in the MFP 1. In that case, at Step S90, the mobile terminal 2 gives a confirmation feedback of "1000 dpi cannot be specified. Scanning at 600 dpi and sending to Tanaka will be executed. Is it OK?".

Meanwhile, within the range of the processing capability of the MFP 1, the execution determining unit 57 can select the function or the value that is closest to the function or the processing capability value specified by the user. For example, if the MFP 1 has the processable resolution in the range of 200 dpi to 600 dpi, then 600 dpi is selected on account of being closest to 1000 dpi specified by the user. Then, the voice feedback unit 55 outputs, as a confirmation feedback, the capability or the value selected by the execution determining unit 57 is output.

In response to the confirmation feedback, if the user utters "yes" (Step S91), then the utterance is converted into a text and is sent to the AI assistant server device 4 (Step S92 to Step S94). The AI assistant server device 4 sends, to the mobile terminal 2, the interpretation result in which "SCAN_EXECUTE" represents the action and "resolution=600, addressee=Tanaka" represent the parameters (Steps S95 and S96).

In the mobile terminal 2, the interpretation result conversion unit 53 converts the interpretation result into a job command (Step S97). Then, the communication control unit 52 of the mobile terminal 2 sends the job command to the MFP 1 (Step S98). As a result, using voice input operations, the MFP 1 can be operated to execute a job within the range of its processing capability.

Figure 21:
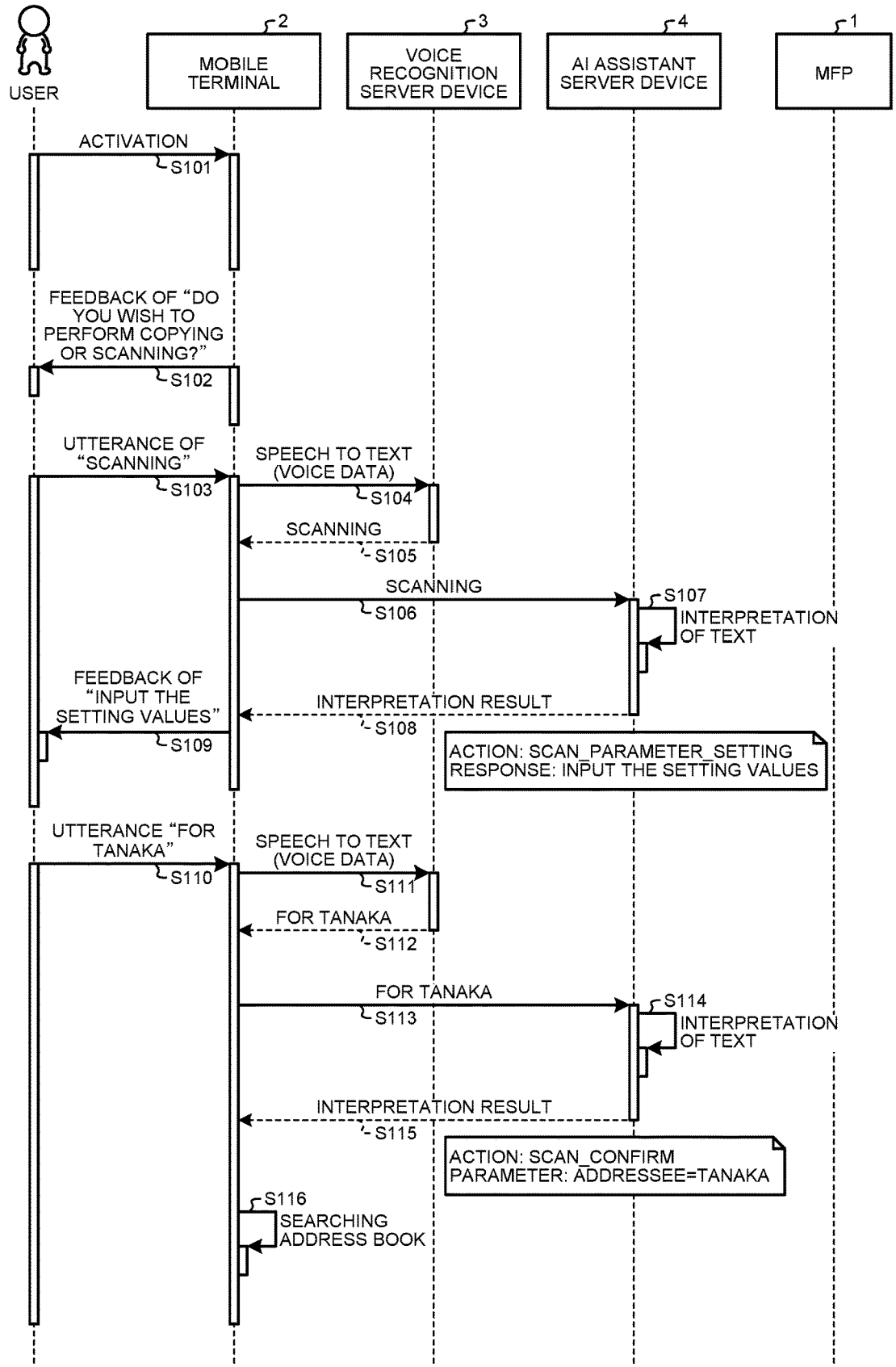
FIG. 21 is a sequence diagram for explaining an exemplary flow of operations in the first half of interactive input operations performed to send a scanned image to the user specified from an address book in the voice operation system according to the first embodiment.
Figure 22:
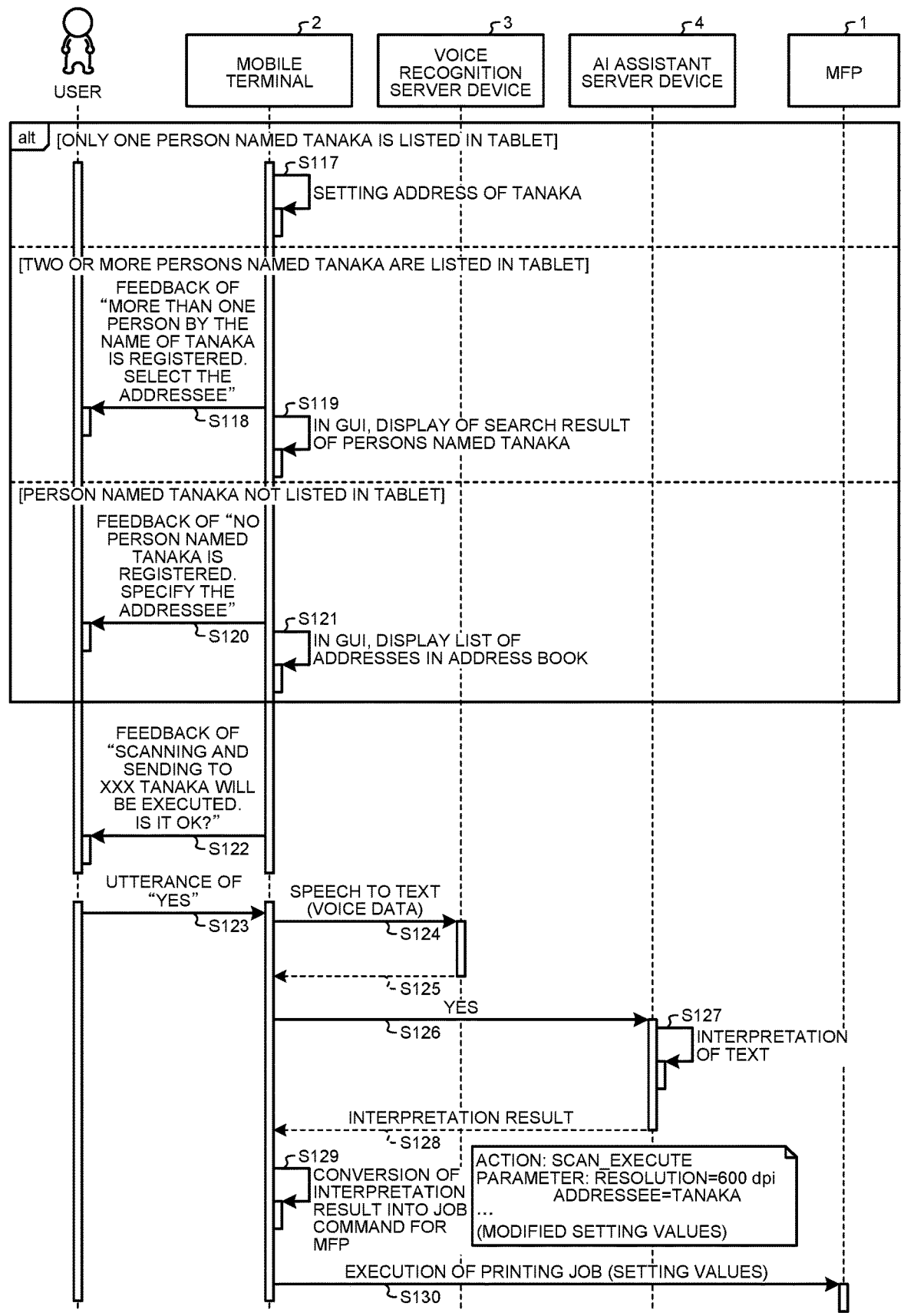
FIG. 22 is a sequence diagram for explaining an exemplary flow of operations in the second half of interactive input operations performed to send a scanned image to the user specified from the address book in the voice operation system according to the first embodiment.

Operation of Sending Scanned Image to Destination Retrieved from Address Book of Mobile Terminal Given below is the explanation of an operation of sending a scanned image to the destination retrieved from the address book of the mobile terminal 2. FIG. 21 illustrates a sequence diagram for explaining the flow of operations in the first half, and FIG. 22 illustrates a sequence diagram for explaining the flow of operations in the second half.

Firstly, with reference to the sequence diagram illustrated in FIG. 21, when the mobile voice processing program in the mobile terminal 2 is activated (Step S101), the voice feedback unit 55 gives a voice feedback of, for example, "do you wish to perform copying or scanning?" for prompting issuance of a job command (Step S102). If the user utters "scanning" (Step S103), then the utterance is converted into a text and is sent to the AI assistant server device 4 (Step S104 to Step S106). However, just by issuing a scanning instruction, the required parameters remain missing. Hence, the interpreting unit 72 sends, to the mobile terminal 2, the interpretation result in which "SCAN_PARAMETER_SETTING" represents the action and "input the setting values" represents the response (Steps S107 and S108). As a result, in the mobile terminal 2, the voice feedback unit 55 gives an insufficient input feedback of "input the setting values" (Step S109).

In response to the insufficient input feedback, if the user utters "for Tanaka" (Step S110), then the utterance is converted into a text and is sent to the AI assistant server device (Step S111 to Step S113). In the AI assistant server device 4, the interpreting unit 72 sends, to the mobile terminal 2, the interpretation result in which "SCAN_CONFIRM." represents the action and "addressee=Tanaka" represents the parameter (Steps S114 and S115). In the mobile terminal 2, the searching unit 58 searches the memory area of the address book, which is stored in the RAM 22, based on the parameter specified in the interpretation result, and retrieves the email address of Tanaka (Step S116).

Meanwhile, the search target is not limited to the RAM 22. Alternatively, a server connected to the mobile terminal device and a network can also be treated as the search target, or an inquiry can be made to the MFP 1 about whether or not the concerned email address exists.

In the memory area of the address book, if only one person by the name of Tanaka is recorded; then, at Step S117 illustrated in FIG. 22, the communication control unit 52 of the mobile terminal 2 generates an email directed to the email address of Tanaka as stored in the memory area of the address book. Then, the email having the scanned image attached therein is sent. As a result, the scanned image is sent to Tanaka.

However, if a plurality of persons by the name of Tanaka is recorded in the memory area of the address book, that is, if a plurality of addresses is present in which "Tanaka" represents the information enabling identification of the addressee, the voice feedback unit 55 of the mobile terminal 2 gives an insufficient input feedback of "more than one person by the name of Tanaka is registered. Select the addressee" (Step S118). Then, the searching unit 58 of the mobile terminal 2 lists, in the touch panel 27, the names and the email addresses of the persons by the name of Tanaka as retrieved from the memory area of the address book (Step S119).

The user selects the desired person named Tanaka from the list. The communication control unit 52 of the mobile terminal 2 generates an email directed to the email address of the user-selected person named Tanaka. Then, the email having the scanned image attached therein is sent. As a result, the scanned image is sent to the person named Tanaka as desired by the user.

Meanwhile, if no person by the name of Tanaka is recorded in the memory area of the address book, then the voice feedback unit 55 of the mobile terminal 2 gives an insufficient input feedback of "no person named. Tanaka is registered. Specify the addressee." (Step S120). Then, for example, the searching unit 58 of the mobile terminal 2 lists, by the syllabary order in the touch panel 27, the names and the email addresses of the users retrieved from the memory area of the address book (Step S121).

In the touch panel 27, a keyboard can also be displayed so as to enable the user to manually input the addressee and the email address. With that, the name of the concerned person and the email address can be obtained. Then, the obtained name and the obtained email address can be registered in the address book.

Then, the user selects the desired addressee from the displayed list. The communication control unit 52 of the mobile terminal 2 generates an email address for the addressee selected by the user. Then, the email with the scanned image attached therein is sent. As a result, the scanned image is sent to the addressee desired by the user.

That is, if a person named Tanaka or some other user is selected as the destination for the scanned image, the voice feedback unit 55 of the mobile terminal 2 gives a confirmation feedback of, for example, "Scanning and sending to XXX Tanaka will be executed. Is it OK?" (Step S122).

In response to the confirmation feedback, if the user utters "yes" (Step S123), then the utterance is converted into a text and is sent to the AI assistant server device 4 (Step S124 to Step S126). The AI assistant server device 4 sends, to the mobile terminal 2, the interpretation result in which "Scan_Execute" represents the action and "resolution=600, addressee-Tanaka" represent the parameters (Steps S127 and S128).

In the mobile terminal 2, the interpretation result conversion unit 53 converts the interpretation result into a job command (Step S129). The communication control unit 52 of the mobile terminal 2 sends the job command to the MFP 1 along with addressee information such as the addressee name and the email address (Step S130). As a result, the email having the scanned image attached therein is sent to the addressee desired by the user.

Figure 23:
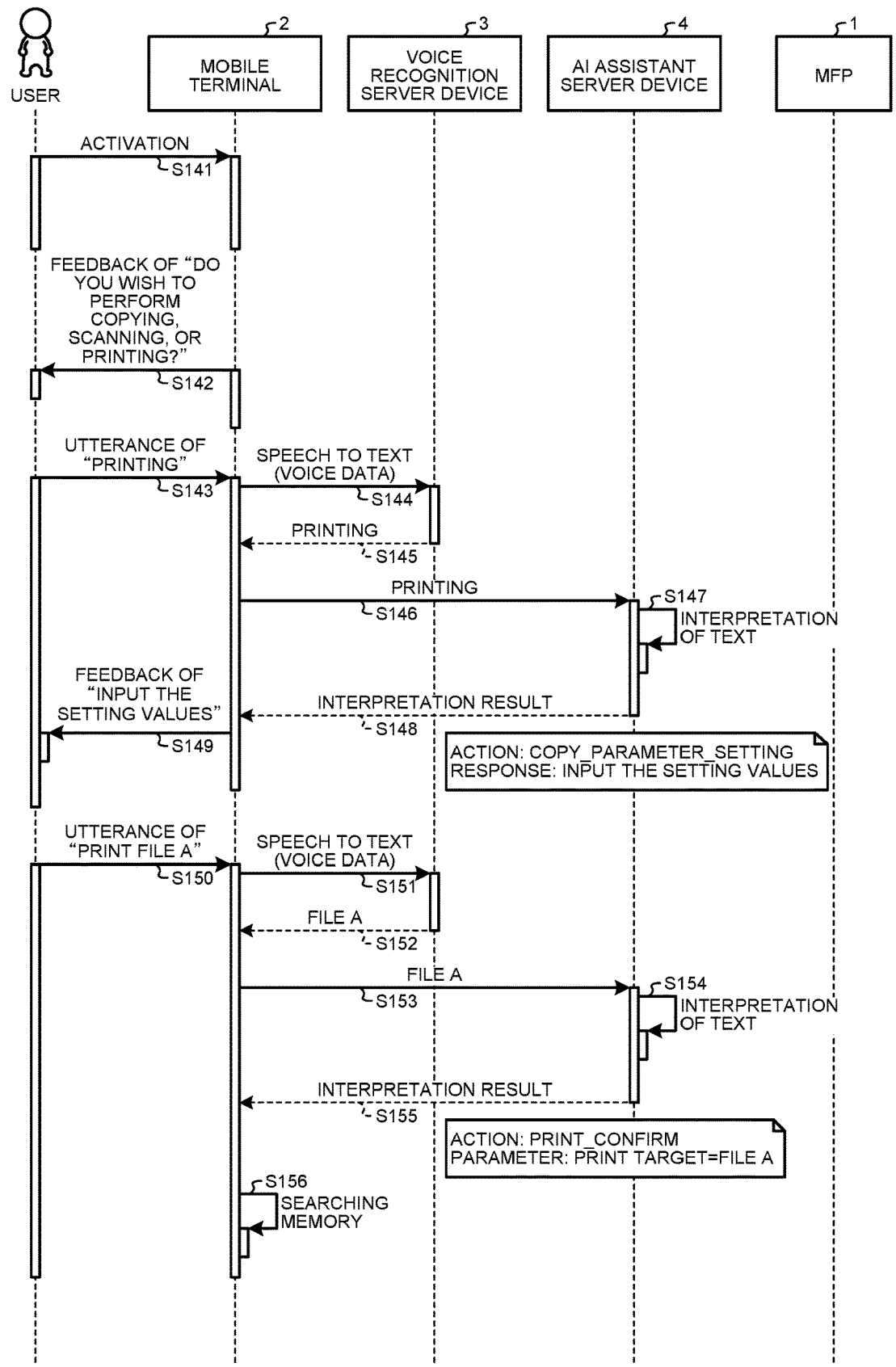
FIG. 23 is a sequence diagram for explaining an exemplary flow of operations in the first half of interactive input operations performed to print a specified file from a memory in the voice operation system according to the first embodiment.
Figure 24:
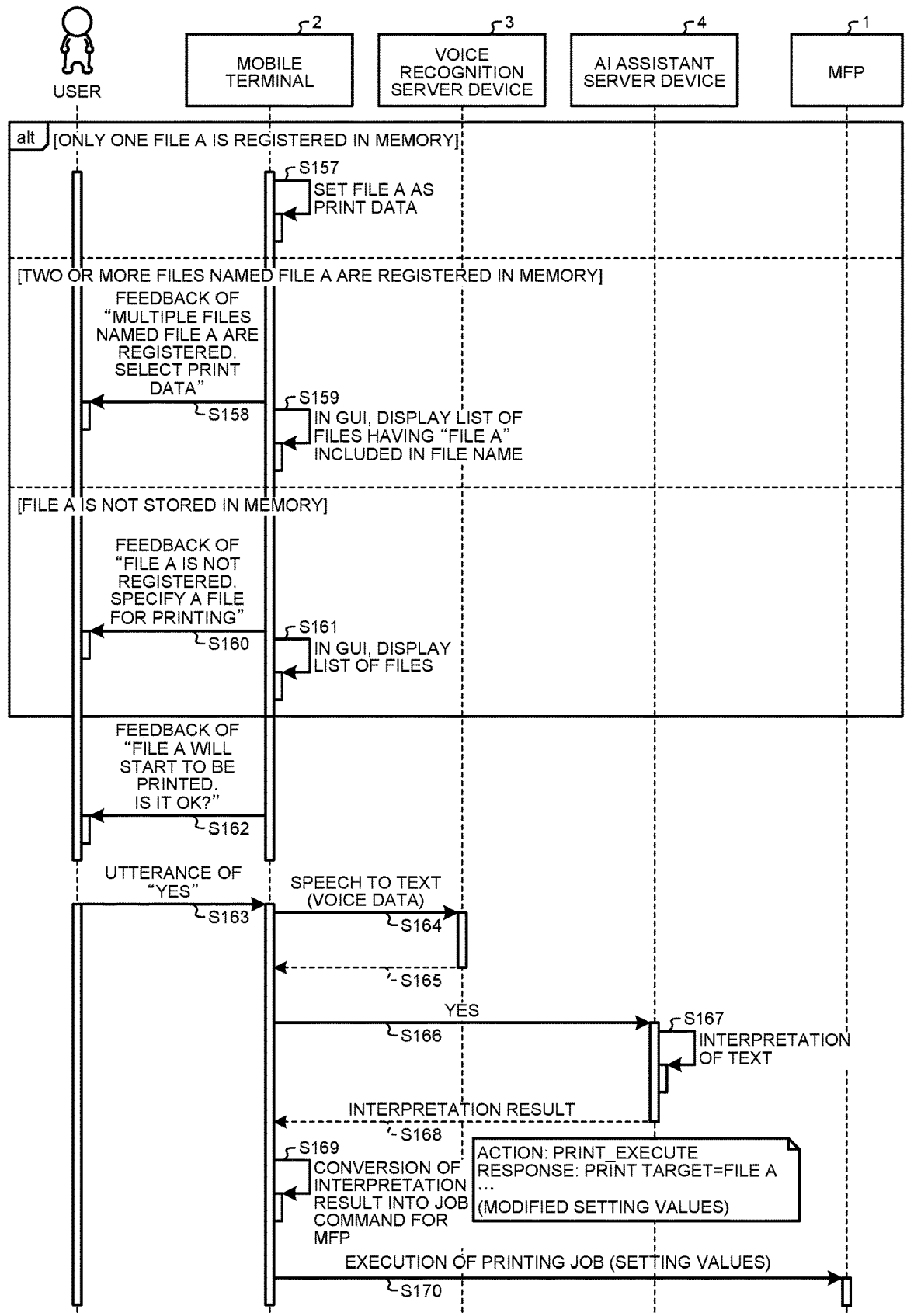
FIG. 24 is a sequence diagram for explaining an exemplary flow of operations in the second half of interactive input, operations performed to print the specified file from the memory in the voice operation system according to the first embodiment.

Operation of Searching for Print Target from Memory of Mobile Terminal and Printing it Given below is the explanation of the operation of printing a file retrieved from the memory such as the RAM 22 of the mobile terminal 2. FIG. 23 illustrates a sequence diagram for explaining the flow of operations in the first half, and FIG. 24 illustrates a sequence diagram for explaining the flow of operations in the second half.

Firstly, with reference to the sequence diagram illustrated in FIG. 23, when the mobile voice processing program in the mobile terminal 2 is activated. (Step S141), the voice feedback unit 55 gives a voice feedback of, for example, "do you wish to perform copying, or scanning, or printing?" for prompting issuance of a job command (Step S142). If the user utters "printing" (Step S143), then the utterance is converted into a text and is sent to the AI assistant server device 4 (Step S144 to Step S146). However, just by issuing a printing instruction, the required parameters remain missing. Hence, the interpreting unit 72 sends, to the mobile terminal 2, the interpretation result in which "PRINT_PARAMETER_SETTING" represents the action and "input the setting values" represents the response (Steps S147 and S148). As a result, in the mobile terminal 2, the voice feedback unit 55 gives an insufficient input feedback of "input the setting values" (Step S149).

In response to the insufficient input feedback, if the user utters "print file A" (Step S150), then the utterance is converted into a text and is sent to the AI assistant server device 4 (Step S151 to Step S153). In the AI assistant server device 4, the interpreting unit 72 sends, to the mobile terminal 2, the interpretation result in which "PRINT_CONFIRM" represents the action and "print target=file A" represents the parameter (Steps S154 and S155). In the mobile terminal 2, the searching unit 58 searches the memory such as the RAM 22 based on the parameter specified in the interpretation result, and retrieves the file A (Step S156).

Meanwhile, the search target is not limited to the RAM 22. Alternatively, a server connected to the mobile terminal device and a network can also be treated as the search target, or an inquiry can be made to the MFP 1 about whether or not the concerned email address exists.

In the memory, if only one file named file A is recorded; then, at Step S157 illustrated in FIG. 24, the communication control unit 52 of the mobile terminal 2 sets that file A as the print data. Then, the print data of the file A is sent to the MFP 1 for printing.

However, if two or more files named file A are stored in the memory, then the voice feedback unit 55 of the mobile terminal 2 gives an insufficient input feedback of "multiple files named file A are registered. Select the print data." (Step S158). Then, the searching unit 58 of the mobile terminal 2 lists, in the touch panel 27, the files having "file A" in the name as retrieved from the memory (Step S159). The user selects the desired file A from the list. Then, as described later, the communication control unit 52 of the mobile terminal 2 sends the user-selected file A to the MFP 1 and issues a print request.

Meanwhile, if the file A is not recorded in the memory, then the voice feedback unit 55 of the mobile terminal 2 gives an insufficient input feedback of "file A is not registered in the memory. Specify a file for printing" (Step S160). Then, the searching unit 58 of the mobile terminal 2 lists the files retrieved from the memory in the touch panel 27 (Step S161). The user selects the desired file from the list. Then, as described later, the communication control unit 52 of the mobile terminal 2 sends the user selected file to the MFP 1 and issues a print request.

That is, when the file A or some other file is selected for printing, the voice feedback unit 55 of the mobile terminal 2 gives a confirmation feedback of, for example, "File A will start to be printed. Is it OK?" (Step S162).

In response to the confirmation feedback, the user utters "yes" (Step S163), then the utterance is converted into a text and is sent to the AI assistant server device 4 (Step S164 to Step S166). The AI assistant server device 4 sends, to the mobile terminal 2, the interpretation result in which "Print_Execute" represents the action and "print target=file A" represents the parameter (Steps S167 and S168).

In the mobile terminal 2, the interpretation result conversion unit 53 converts the interpretation result into a job command (Step S169). Then, the communication control unit 52 of the mobile terminal 2 sends the job command and the user-selected file to the MFP 1 (Step S170). As a result, the file desired by the user is printed in the MFP 1.

Figure 25:
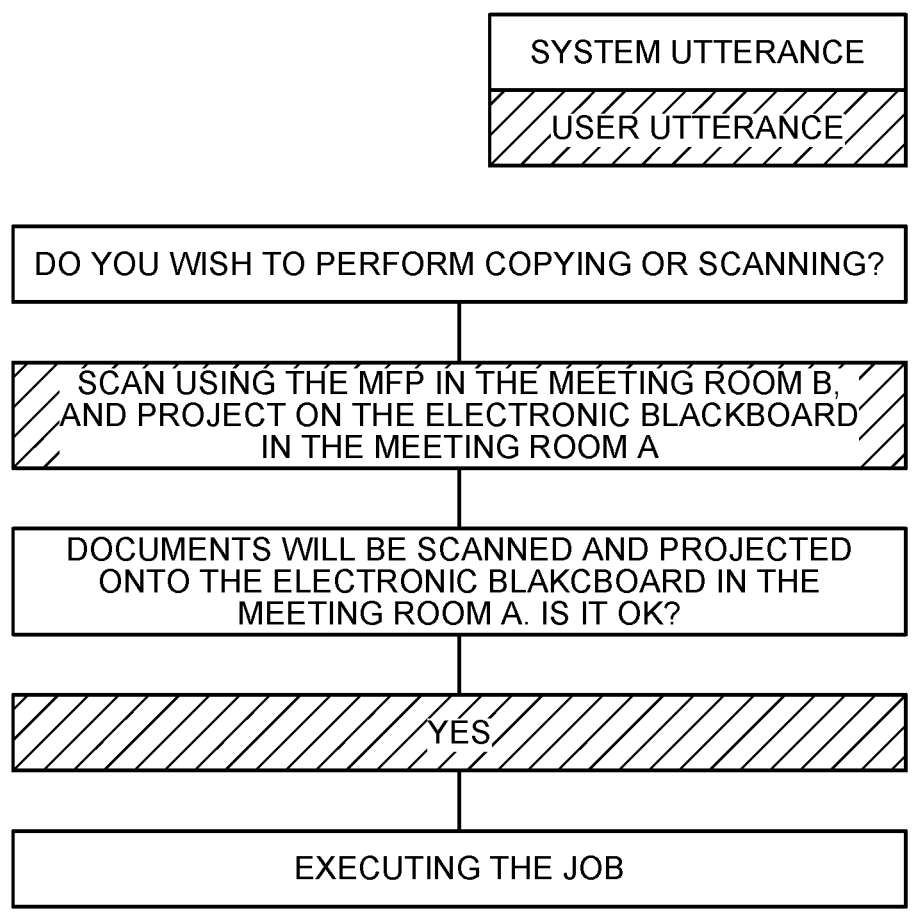
FIG. 25 is a sequence diagram for explaining an exemplary flow of operations in the first half of interactive input operations performed to project scanned data onto the electronic blackboard in the voice operation system according to the first embodiment.

Interaction for Execution of Job for Implementing Coordinated Operations Between MFP and Electronic Blackboard FIG. 25 illustrates an example of the interaction in which, in response to the input confirmation feedback of "do you wish to perform copying or scanning?", the user utters "scan using the MFP in the meeting room B, and project the scanned data on the electronic blackboard in the meeting room A"; and then the job is executed. In the example illustrated in FIG. 25, the output device location is assumed to represent the required parameter. However, the required parameter is not limited to the location of the output device, and can include parameters such as the type of the output device, the location of the input device, and the type of the input device.

Meanwhile, which of the parameters are the required parameters can be stored in advance in the memory unit of the AI assistant server device 4. The user can be allowed to operate the operating unit 49 or access the AI assistant server device 4 via the network 5, and to modify the required parameters.

In the example illustrated in FIG. 25, the utterances having hatched lines represent the utterances of the user; and the utterances not having hatched lines represent the utterances of the system. Firstly, the system performs a voice output (feedback) of "do you wish to perform copying or scanning?". In response, the user instructs "scan using the MFP in the meeting room B, and project the scanned data on the electronic blackboard in the meeting room A". Since the output device location representing the required parameter is included as the "meeting room A" in the user instruction, the system responds with "Scanning Documents will be scanned and projected onto the electronic blackboard in the meeting room A. Is it OK?", and prompts the user to instruct the start of the operation of scanning and sending the scanned data.

When the user responds with "yes", the system responds with "executing the job" and executes the user-specified job.

Figure 26:
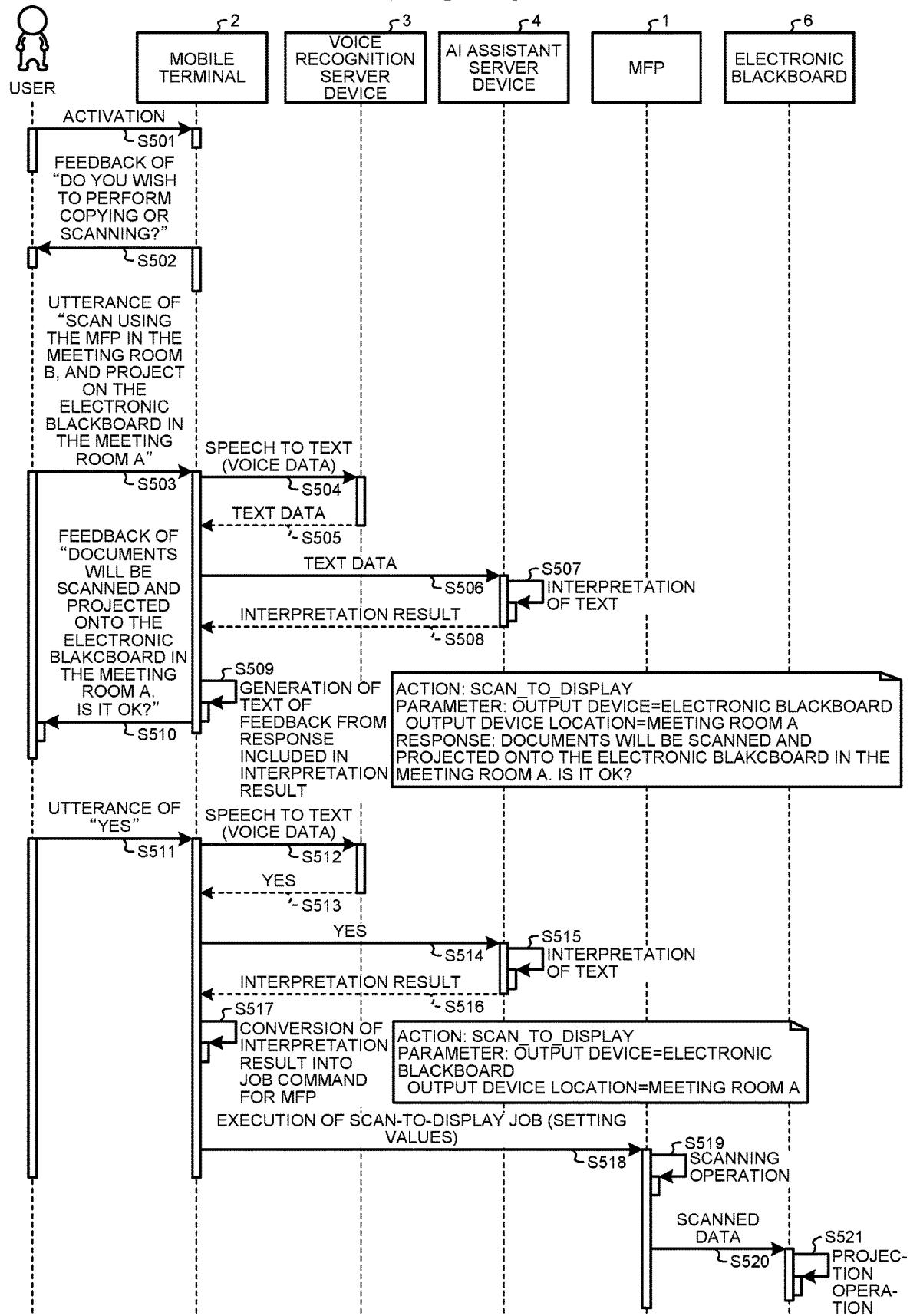
FIG. 26 is a sequence diagram for explaining an exemplary flow of operations in the second half of interactive input operations performed to project scanned data onto the electronic blackboard in the voice operation system according to the first embodiment.

Flow of Interactive Operations for Execution of Job for Implementing Coordinated Operations Between MFP and Electronic Blackboard FIG. 26 is a sequence diagram for explaining an exemplary flow of operations performed in the voice operation system according to the first embodiment for projecting scanned data onto an electronic blackboard by performing interactive input operations.

Firstly, with reference to the sequence diagram illustrated in FIG. 26, when the mobile voice processing program in the mobile terminal 2 is activated (Step S501), the voice feedback unit 55 gives a voice feedback of, for example, "do you wish to perform copying or scanning?" for prompting issuance of a job command (Step S502). If the user utters "scan using the MFP in the meeting room B, and project the scanned data on the electronic blackboard in the meeting room A" (Step S503), the text conversion unit 62 of the voice recognition server device 3 converts the utterance into a text and sends it to the AI assistant server device 4 (Step S504 to Step S506). Meanwhile, at the time of sending text data to the AI assistant server device 4, the mobile terminal 2 can also send user identification information for enabling identification of the user of the mobile terminal 2. Alternatively, instead of sending the user identification information, information enabling identification of the mobile terminal 2 can also be sent.

In the AI assistant server device 4, the interpreting unit 72 interprets the uttered phrase of the user as specified in the text data, and sends the action and the parameters representing the interpretation result to the mobile terminal 2. Herein, the interpreting unit 72 generates an interpretation result in which "SCAN_TO_DISPLAY" represents the action, and "output device=electronic blackboard" and "output device location=meeting room A" represent the parameters (Step S507); and sends the interpretation result to the mobile terminal 2 (Step S508). Meanwhile, when the input device needs to be identified, the interpreting unit 72 generates an interpretation result in which "input device=MFP" and "input device location=meeting room B" represent the parameters. The AI assistant server device 4 determines whether the required parameters are not missing. It is assumed that, when the action "SCAN_TO_DISPLAY" is received, the parameters "output device" and "output device location" are determined to be the required parameters. Thus, in the abovementioned case, the AI assistant server device 4 determines that the required parameters are available.

In the mobile terminal 2, the voice feedback unit 55 generates a feedback text based on the response included in the interpretation result (Step S509) and gives an input confirmation feedback of, for example, "Documents will be scanned and projected onto the electronic blackboard in the meeting room A. Is it OK?", so as to confirm whether or not the operation of scanning and sending the scanned data can be started (Step S510).

In response to the input confirmation feedback, if the user utters "yes" (Step S511), then the utterance is converted into a text and is sent to the AI assistant server device 4 via the mobile terminal 2 (Step S512 to Step S514). In the AI assistant server device 4, based on the received text data, when the interpreting unit 72 recognizes the instruction to start the operation of scanning and sending the scanned data, the identifying unit 74 identifies that the MFP 1 installed in the "meeting room B" represents the input device to be used in scanning, and also identifies that the electronic blackboard 6 installed in the "meeting room A" represents the destination for the scanned documents (scanned data) obtained by the MFP 1. In this way, based on the "input device" and the "input device location", the identifying unit 74 can identify the first external device to be used in scanning. Moreover, based on the "output device" and the "output device location", the identifying unit 74 can identify the second external device to which the scanned data is to be sent. In this case, from among the devices linked to the user identification information, the identifying unit 74 identifies the device that has "MFP" as the device type and that is installed in the meeting room B, that is, identifies the MFP 1 as the input device. Moreover, from among the devices linked to the user identification information, the identifying unit 74 identifies the device that has "electronic blackboard" as the device type and that is installed in the meeting room A, that is, identifies the electronic blackboard 6 as the output device.

TABLE 3

| Device ID | Device type | Location | Function | Address information |
|---|---|---|---|---|
| D0001 | Electronic blackboard | Meeting room A | Display | xxx.xxx.x.x |
| D0002 | Projector | Meeting room B | Display | yyy.yyy.y.y |
| D0003 | MFP | Meeting room B | Printing/ Scanning | zzz.zzz.z.z |

For example, the HDD 44 is used to store the device management table representing an example of association information as illustrated in Table 3. Herein, "device ID" represents the information enabling identification of a device and includes a unique number formed by combining alphanumeric characters. Moreover, "device type" represents the information indicating the device type such as "electronic blackboard", "projector", or "MFP". Regarding the "device type", a single device can have a plurality of types or names assigned thereto. For example, an "MFP" can have a plurality of types or names such as "multifunction peripheral", "MFP", "printer", and "printing machine" assigned thereto. Furthermore, "location" represents the information indicating the location of installation of the corresponding device, and represents the information indicating the room name or the building name. Regarding the "location", a single device can have a plurality of locations or names assigned thereto. For example, the "meeting room A" can have a plurality of locations such as "business facility X", "wing Y", and "floor Z" assigned thereto. Moreover, "function" represents the information indicating the functions of the corresponding device. The "function" can be specified in the form of "input" or "output"; and the "input" can be further classified into "scanning" or "memory reading", and the "output" can be further classified into "display" and "printing". Furthermore, "address information" represents the information enabling identification of the corresponding device and is, for example, an IP address. Alternatively, the "address information" can be an email address, the model name, or the model number.

The HDD 44 can be used to store the device management table for each of a plurality of sets of user identification information. A user can store the device management table in advance in the HDD 44. For example, the user can access the AI assistant server 4 from a client PC and can input the information of the device management table. As illustrated in Table 3 given above, the device management table is used to hold the following information in a corresponding manner: the device IDs; the device types (an example of information regarding external devices); the device locations (an example of information regarding external devices); the device functions; and the device address information. The identifying unit 74 refers to the device management table and identifies the electronic blackboard 6, which represents the second external device, based on the parameters such as "input device", "input device location", "output device", and "output device location". That is, the identifying unit 74 identifies the device type (electronic blackboard), the functions, and the address information of the second external device. In the AI assistant server 4, the interpreting unit 72 generates an interpretation result by adding, to the action "SCAN_TO_DISPLAY", "input device address information=zzz.zzz.z.z" representing first address information and "output device address information==xxx.xxx.x.x" representing second address information; and sends the interpretation result to the mobile terminal 2 (Steps S515 and S516).

Meanwhile, when a plurality of devices satisfies the conditions indicated by the parameters, the address information of the plurality of identified devices can be sent to the mobile terminal 2. In that case, the concerned devices can be selectably displayed in the touch panel 27 of the mobile terminal 2, and the device selected by the user can be decided as the input device or the output device. In that case, the mobile terminal 2 can send the address information corresponding to the user-selected device to the MFP 1. Meanwhile, as described later, instead of identifying the MFP 1 and the electronic blackboard 6 using the identifying unit 74, they can be identified using the identifying unit 59 of the mobile terminal 2, or the electronic blackboard 6 can be identified using the identifying unit 112 of the MFP 1. In this case, an interpretation result is generated in which the parameters "input device=MFP", "input device location=meeting room B", "output device=electronic blackboard", and "output device location=meeting room A" are added to the action "SCAN_TO_DISPLAY"; and the interpretation result is sent to the mobile terminal 2.

In the mobile terminal 2, the interpretation result conversion unit 53 converts the interpretation result into a job command for the MFP 1 (Step S517), and sends the job command to the MFP 1 (Step S518). Herein, the MFP 1 representing the target for sending a job command, that is, representing the input device can be identified in advance by the mobile terminal 2. That is, the devices communicable with the mobile terminal 2 can be displayed in the touch panel 27, and the device selected by the user can be decided as the MPF 1 to which the job command is to be sent. In that case, since the input device need not be identified by the identifying unit 59 and the identifying unit 74, they can be configured to be able to identify at least the output device.

When the parameters obtained from the AI assistant server 4 do not include the address information of the MFP 1 or the electronic blackboard 6, the identifying unit 59 of the mobile terminal 2 can identify the address information of the MFP 1 or the electronic blackboard 6. That is, as explained above with reference to the identifying unit 59 and the identifying unit 74, the input device that would perform scanning is identified according to the "input device" and the "input device location". Moreover, the identifying unit 59 identifies the output device, to which the scanned data is to be sent, according to the "output device" and the "output device location". In the abovementioned case, the identifying unit 59 identifies the device that has "MFP" as the device type and that is installed in the meeting room B, that is, identifies the MFP 1 as the input device. Moreover, the identifying unit 59 identifies the device that has "electronic blackboard" as the device type and that is installed in the meeting room A, that is, identifies the electronic blackboard 6. Meanwhile, in the mobile terminal 2, the address information corresponding to each device can be stored in advance in the ROM 23. Thus, the ROM 23 is used to store the device management table that represents an example of the association information illustrated in Table 3 given earlier.

The interpretation result conversion unit 53 sends the job command, which includes processing information corresponding to the action and includes the address information of the output device, to the MFP 1 that is identified from the address information of the input device. Herein, the processing information represents information for requesting the MFP 1 to perform scanning and send the scanning result to the output device; and the address information of the output device represents the address information of the electronic blackboard 6 that is identified by the identifying unit 59. Meanwhile, as described later, instead of using the identifying unit 59 to identify the electronic blackboard 6, the identifying unit 112 of the MFP 1 can be used in the identification. In that case, the parameters "output device-electronic blackboard" and "output device location-meeting room A" can be converted into a job command, and the job command can be sent to the MFP 1.

Meanwhile, when a plurality of devices satisfies the conditions, the mobile terminal 2 can selectably display the concerned devices in the touch panel 27, and the device selected by the user can be decided as the device to which the scanned data is to be sent. Moreover, the mobile terminal 2 can get to know the corresponding communicable devices in advance. The mobile terminal 2 can monitor the network, and can obtain in advance the device information containing the types and the installation locations of the corresponding communicable devices. Alternatively, the mobile terminal 2 can obtain the device information from the user. For example, the device information that the user input from the touch panel 27 of the mobile terminal 2 may be received or the device information may be downloaded from an external server via a network.

Upon receiving the job command from the mobile terminal 2, the MFP 1 executes the job based on the processing information specified in the job command, and decides on the destination for sending the processing result of the job based on the address information specified in the job command. Herein, the MFP 1 scans the documents according to the job command (Step S519), and then sends the scanned documents (scanned data) and a projection instruction for projecting the scanned data (an example of an operation command) to the electronic blackboard 6 representing the second external device. When the address information corresponding to the electronic blackboard 6 is specified in the job command, the MFP 1 performs the sending operation based on that address information. However, when the address information is not specified in the job command, the identifying unit 112 of the MFP 1 identifies, based on the parameters specified in the job command, that the electronic blackboard 6 installed in the "meeting room A" represents the destination for the scanned documents (scanned data). In this way, according to the parameters "output device" and "output device location", the identifying unit 112 of the MFP 1 can identify the second external device to which the scanned data is to be sent. In the abovementioned case, the identifying unit 112 identifies the device that is communicable with the MFP 1, that has "electronic blackboard" as the device type, and that is installed in the meeting room A, that is, identifies the electronic blackboard 6. For example, in the MFP 1, the address information corresponding to each device can be stored in the HDD 13.

For example, the HDD 13 of the MFP 1 is used to store the device management table representing an example of association information illustrated in Table 3 given above. As illustrated in Table 3, the device management table is used to hold the following information in a corresponding manner: the device IDs; the device types (an example of information regarding external devices); the device locations (an example of information regarding external devices); the device functions; and the device address information. The identifying unit 112 of the MFP 1 refers to the device management table and identifies the electronic blackboard 6, which represents the second external device, based on the parameters such as "output device" and "output device location" specified in the job command received from the mobile terminal 2. That is, the identifying unit 112 identifies the device type (electronic blackboard), the functions, and the address information of the second external device.

Meanwhile, when a plurality of devices satisfies the conditions indicated by the parameters "output device" and "output device location", the MPF 1 can selectably display the concerned devices in the operating unit 16, and the device selected by the user can be decided as the device to which the scanned data is to be sent. Moreover, the MFP 1 can get to know the corresponding communicable devices in advance. The MFP 1 can monitor the network, and can obtain in advance the device information containing the types and the installation locations of the corresponding communicable devices. Alternatively, the PEP 1 can obtain the device information from the user. For example, the device information that the user input from the operating unit 16 of the MFP 1 or from a client PC may be received.

Using the address information specified in the job command or using the address information corresponding to the device identified by the identifying unit 112, the MFP 1 sends the scanned documents (scanned data) and a projection instruction for projecting the scanned data (an example of an operation command) to the electronic blackboard 6 representing the second external device (Step S520). Meanwhile, in addition to sending the scanned data, the MFP 1 can also send a job command for instructing projection of the scanned data onto the display 94. At that time, based on the processing information specified in the job command obtained from the mobile terminal 2, the MFP 1 can generate a job command to be sent to the second external device. For example, when the action "SCAN_TO_DISPLAY" is specified in the interpretation result obtained by the interpreting unit 72, the MPF 1 sends a job command, which includes processing information for instructing projection, to the second external device.

Upon receiving the scanned data and the projection instruction from the MFP 1, the electronic blackboard 6 projects the scanned data onto the display 94 (Step S521). As a result, the coordinated operations of scanning the documents using the MFP 1 and projecting the scanned data using the electronic blackboard 6 can be controlled by performing voice input operations. Meanwhile, although the explanation above is given about the case in which the action "SCAN_TO_DISPLAY" is specified in the interpretation result obtained by the interpreting unit 72, the same explanation is applicable in the case of other actions too.

Interaction for Execution of Job for Implementing Coordinated Operations Between MFP and Device In the example illustrated in FIGS. 25 and 26, the explanation is given about the case in which the user utters about the parameters "input device", "input device location", "output device", and "output device location". However, either one of the parameters "input device" and "input device location" as well as either one of the parameters "output device" and "output device location" need not be always uttered. With reference to the example illustrated in FIGS. 27 and 28, the explanation is given about the operations when only the parameter "output device location" is uttered.

Figure 27:
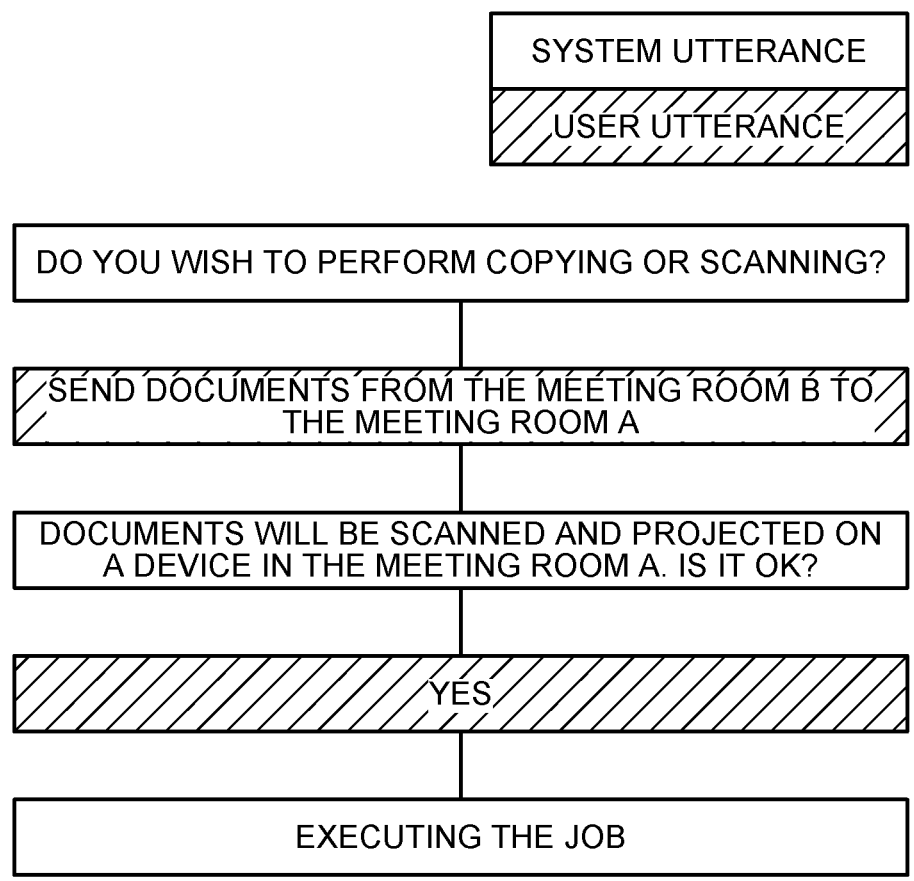
FIG. 27 is a diagram for explaining an exemplary flow of interactive input operations performed to project scanned data onto a device in the voice operation system according to the first embodiment.

FIG. 27 illustrates an example of the interaction in which, in response to the input confirmation feedback of, for example, "do you wish to perform copying or scanning?", the user utters "send documents from the meeting room B to the meeting room A"; and the job is executed. In the example illustrated in FIG. 27, the output device location is assumed to represent the required parameter.

Meanwhile, which of the parameters are the required parameters can be stored in advance in the memory unit of the AI assistant server device 4. The user can be allowed to operate the operating unit 49 or access the AI assistant server device 4 via the network 5, and to modify the required parameters.

In the example illustrated in FIG. 27, the utterances having hatched lines represent the utterances of the user; and the utterances not having hatched lines represent the utterances of the system. Firstly, the system performs a voice output (feedback) of "do you wish to perform copying or scanning?". In response, the user instructs "send documents from the meeting room B to the meeting room A". In the system, since the output device location representing the required parameter is included as the "meeting room A" in the user instruction, the devices (second external devices) linked to the "meeting room" are identified. Then, the system responds with "Documents will be scanned and projected on a device in the meeting room A. Is it OK?"; and prompts the user to instruct the start of the operation of scanning and sending the scanned data.

When the user responds with "yes", the system responds with "executing the job" and executes the user-specified job.

Figure 28:
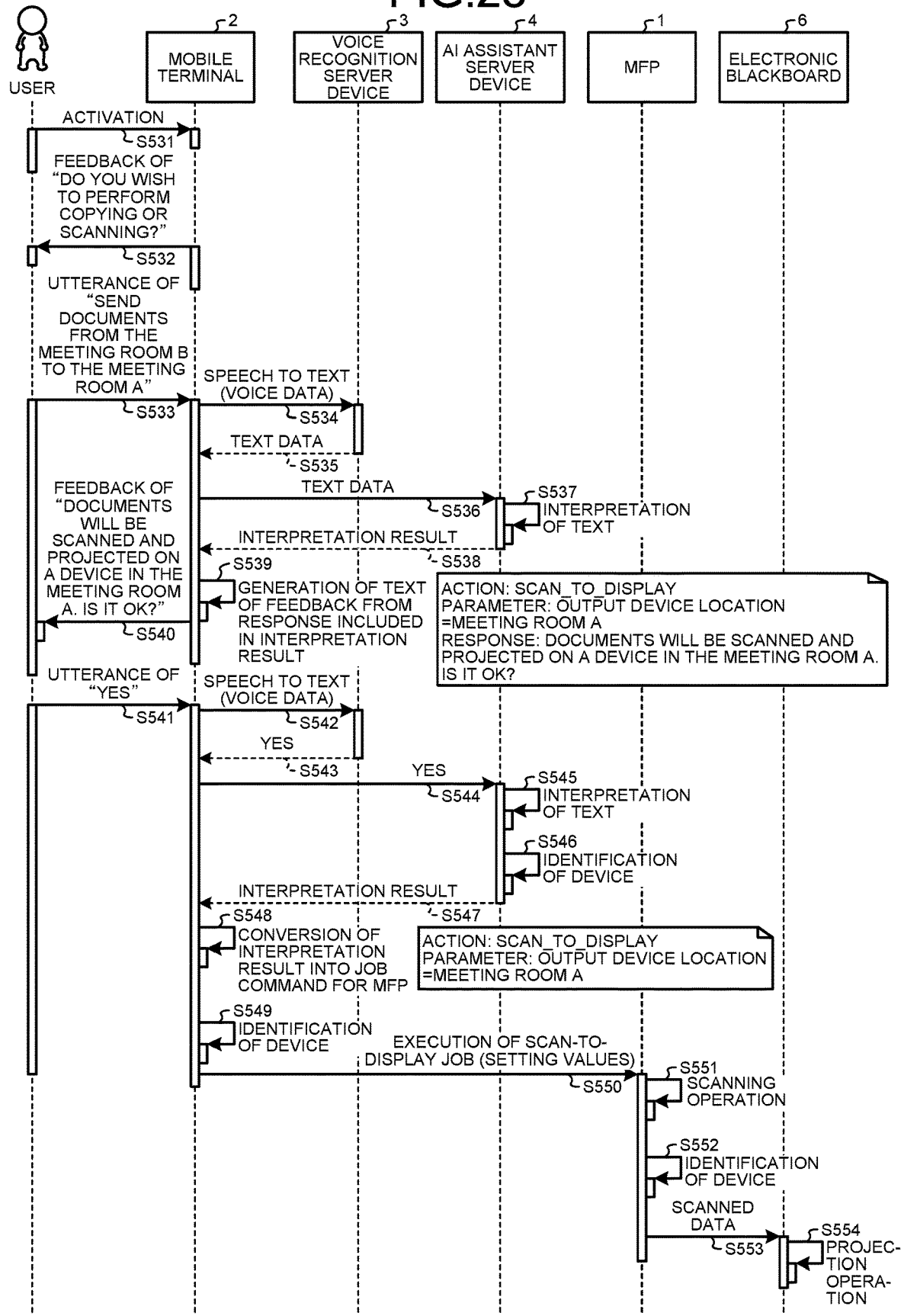
FIG. 28 is a sequence diagram for explaining an exemplary flow of interactive input operations performed to project scanned data onto a device in the voice operation system according to the first embodiment.

Flow of Interactive Operations for Execution of Job for Implementing Coordinated Operations Between MFP and Device FIG. 28 is a sequence diagram for explaining an exemplary flow of operations performed in the voice operation system according to the first embodiment for projecting scanned data onto a device according to interactive input operations.

Firstly, with reference to the sequence diagram illustrated in FIG. 28, when the mobile voice processing program in the mobile terminal 2 is activated (Step S531), the voice feedback unit 55 gives a voice feedback of, for example, "do you wish to perform copying or scanning?" for prompting issuance of a job command (Step S532). If the user utters "send documents from the meeting room B to the meeting room A" (Step S533), the text conversion unit 62 of the voice recognition server device 3 converts the utterance into a text and sends it to the AI assistant server device 4 (Step S534 to Step S536). Meanwhile, at the time of sending text data to the AI assistant server device 4, the mobile terminal 2 can send user identification information for enabling identification of the user of the mobile terminal 2. Moreover, instead of sending the user identification information, information enabling identification of the mobile terminal 2 can also be sent.

In the AI assistant server device 4, the interpreting unit 72 interprets the uttered phrase of the user as specified in the text data, and sends the action and the parameters representing the interpretation result to the mobile terminal 2. Herein, the interpreting unit 72 generates an interpretation result in which "SCAN_TO_DISPLAY" represents the action, and "output device location=meeting room A" represents the parameter (Step S537); and sends the interpretation result to the mobile terminal 2 (Step S538). The AI assistant server device 4 determines whether the required parameters are not missing. It is assumed that, when the action "SCAN_TO_DISPLAY" is received, the parameter "output device location" is determined to be the required parameter. Thus, in the abovementioned case, the AI assistant server device 4 determines that the required parameter is available.

In the mobile terminal 2, the voice feedback unit 55 generates a feedback text based on the response included in the interpretation result (Step S539) and gives an input confirmation feedback of, for example, "Documents will be scanned and projected on a device in the meeting room A. Is it OK?", so as to confirm whether or not the operation of scanning and sending the scanned data can be started (Step S540).

In response to the input confirmation feedback, if the user utters "yes" (Step S541), then the utterance is converted into a text and is sent to the AI assistant server device 4 via the mobile terminal 2 (Step S542 to Step S544). In the AI assistant server device 4, based on the received text data, when the interpreting unit 72 recognizes the instruction to start the operation of scanning and sending the scanned data, the identifying unit 74 identifies that the MFP 1 installed in the "meeting room B" represents the input device to be used in scanning. Moreover, the identifying unit 74 also identifies that the electronic blackboard 6 installed in the "meeting room A" represents the destination for the scanned documents (scanned data) (Step S546). More particularly, the identifying unit 74 refers to the device management table given earlier in Table 3 and stored the HDD 44; determines that the device corresponding to the parameter "input device location=meeting room B" specified in the job command has the device type of "MFP"; and determines that the device corresponding to the "output device location=meeting room A" has the device type of "electronic blackboard". That is, from among the devices linked to the user identification information, the identifying unit 74 identifies the MFP 1 as the device that is installed in the meeting room B and that is capable of executing a job command of "scanning". Moreover, from among the devices linked to the user identification information, the identifying unit 74 identifies the electronic blackboard 6 as the device that is installed in the meeting room A and that is capable of executing a job command of "display". In the case explained above, since the job command is "send the scanning result to the device"; based on the information about the functions of the devices, the identifying unit 74 identifies the MPF 1 as the device having the scanning function and identifies the electronic blackboard 6 as the device having the display function. In this way, the identifying unit 74 of the AI assistant server 1 can identify the input device, in which scanning is to be performed, according to the "input device location"; and can identify the output device, to which the scanned data is to be sent, according to the "output device location". That is, the identifying unit 74 identifies the device type (MFP), the functions, and the address information of the first external device; and identifies the device type (electronic blackboard), the functions, and the address information of the second external device.

In the AI assistant server 4, the interpreting unit 72 generates an interpretation result by adding the parameters "input device address information=zzz.zzz.z.z" and "output device address information=xxx.xxx.x.x" to the action "SCAN_TO_DISPLAY"; and sends the interpretation result to the mobile terminal 2 (Steps S545 and S547).

Meanwhile, when a plurality of devices satisfies the conditions, the address information of the plurality of identified devices can be sent to the mobile terminal 2. In that case, the concerned devices can be selectably displayed in the touch panel 27 of the mobile terminal 2, and the devices selected by the user can be decided as the input device and the output device. In that case, the mobile terminal 2 can send the address information corresponding to the user-selected devices to the MFP 1. Meanwhile, as described later, instead of using the identifying unit 74 to identify the MFP 1 and the electronic blackboard 6, they can be identified using the identifying unit 59 of the mobile terminal 2, or the electronic blackboard 6 can be identified using the identifying unit 112 of the MFP 1. In that case, an interpretation result is generated in which the parameter "output device location-meeting room A" is added to the action "SCAN_TO_DISPLAY"; and the interpretation result is sent to the mobile terminal 2.

In the mobile terminal 2, the interpretation result conversion unit 53 converts the interpretation result into a job command for the MFP 1 (Step S548), and sends the job command to the MFP 1 (Step S550). Herein, the MFP 1 representing the target for sending a job command, that is, representing the input device can be identified is advance by the mobile terminal 2. For example, the devices communicable with the mobile terminal 2 can be displayed in the touch panel 27, and the device selected by the user can be decided as the MPF 1 to which the job command is to be sent. In that case, since the input device need not be identified by the identifying unit 59 and the identifying unit 74, they can be configured to be able to identify at least the output device.

When the parameters obtained from the AI assistant server 4 do not include the address information of the MFP 1 or the electronic blackboard 6, the identifying unit 59 of the mobile terminal 2 can identify the address information of the MFP 1 or the electronic blackboard 6. That is, as explained above with reference to the identifying unit 59 and the identifying unit 74, the MPF 1 installed in the "meeting room B" is identified as the device for performing scanning, and the destination for sending the scanned document (scanned data) is identified to be the electronic blackboard 6 installed in the "meeting room A" (Step S549). More particularly, the identifying unit 59 refers to the device management table given earlier in Table 3 and stored in the ROM 23; determines that the device corresponding to the parameter "input device location=meeting room B" specified in the job command has the device type of "MFP"; and determines that the device corresponding to the "output device location=meeting room A" has the device type of "electronic blackboard". That is, from among the devices linked to the user identification information, the identifying unit 74 identifies the MFP 1 as the device that is installed in the meeting room B and that is capable of executing a job command of "scanning". Moreover, from among the devices linked to the user identification information, the identifying unit 74 identifies the electronic blackboard 6 as the device that is installed in the meeting room A and that is capable of executing the job command. In the case explained above, since the job command is "send the scanning result to the device"; based on the information about the functions of the devices, the identifying unit 74 identifies the MFP 1 as the device having the scanning function and identifies the electronic blackboard 6 as the device having the display function. In this way, the identifying unit 59 of the mobile terminal 2 can identify the first external device for perform scanning according to the "input device location" and can identify the second external device, to which the scanned data is to be sent, according to the "output device location". That is, the identifying unit 59 identifies the device type (MFP), the functions, and the address information of the first external device; and identifies the device type (electronic blackboard), the functions, and the address information of the second external device.

The interpretation result conversion unit 53 sends, to the MFP 1 identified from the address information of the input device, the processing information corresponding to the action and the job command including the address information of the output device. Herein, the processing information represents information for requesting the MFP 1 to perform scanning and send the scanning result to the output device; and the address information of the output device represents the address information of the electronic blackboard 6 identified by the identifying unit 59. Meanwhile, as described later, instead of using the identifying unit 59 to identify the electronic blackboard 6, the identifying unit 112 of the MFP 1 can be used in the identification. In that case, instead of using the address information, the parameter "output device location-meeting room A" can be converted into a job command, and the job command can be sent to the MFP 1.

Meanwhile, when a plurality of devices satisfies the condition indicated by the parameter "output device location", the mobile terminal 2 can selectably display the concerned devices in the touch panel 27, and the device selected by the user can be decided as the device to which the scanned data is to be sent. Moreover, the mobile terminal 2 can get to know the corresponding communicable devices in advance. The mobile terminal 2 can monitor the network, and can obtain in advance the device information containing the types and the installation locations of the corresponding communicable devices. Alternatively, the mobile terminal 2 can obtain the device information from the user. For example, the user can input the device information from the touch panel 27 of the mobile terminal 2 or can download the device information from an external server via a network.

Upon receiving the job command from the mobile terminal 2, the MFP 1 executes the job based on the processing information specified in the job command, and decides on the destination for sending the processing result of the job based on the address information specified in the job command. Herein, the MFP 1 scans the documents according to the job command (Step S551), and then sends the scanned documents (scanned data) and a projection instruction for projecting the scanned data (an example of an operation command) to the electronic blackboard 6 representing the second external device. When the address information corresponding to the electronic blackboard 6 is specified in the job command, the MFP 1 performs the sending operation based on that address information. However, when the address information is not specified in the job command, the identifying unit 112 of the MFP 1 identifies, based on the parameters specified in the job command, that the electronic blackboard 6 installed in the "meeting room A" represents the destination for the scanned documents (scanned data) (Step S552). More particularly, the identifying unit 112 refers to the device management table given earlier in Table 3 and stored in the HDD 13, and identifies that the device corresponding to the parameter "output device location-meeting room A" specified in the job command has the device type of "electronic blackboard". That is, the identifying unit 112 identifies the electronic blackboard. 6 as the device that is communicable with the MFP 1, that is installed in the meeting room. A, and that is capable of executing the job command. In the case explained above, since the job command is "send the scanning result to the device"; based on the information about the functions of the devices, the identifying unit 112 identifies the electronic blackboard 6 as the device having the display function. In this way, the identifying unit 112 of the MFP 1 can identify the second external device, to which the scanned data is to be sent, according to the "output device location". That is, the identifying unit 112 identifies the device type (electronic blackboard), the functions, and the address information of the second external device.

Using the address information corresponding to the identified device, the MFP 1 sends the scanned documents (scanned data) and a projection instruction for projecting the scanned data (an example of an operation command) to the electronic blackboard 6 representing the second external device (Step S553). Meanwhile, in addition to sending the scanned data, the MFP 1 can also send a job command to instruct projection of the scanned data onto the display 94.

Upon receiving the scanned data and the projection instruction from the MFP 1, the electronic blackboard 6 projects the scanned data onto the display 94 (Step S554). In this way, the coordinated operations of scanning the documents using the MFP 1 and projecting the scanned data using the electronic blackboard 6 can be controlled by performing voice input operations.

Meanwhile, in response to the insufficiency in the required parameters, instead of simply performing an insufficient input feedback, the parameters at the time of previous job execution can be recorded and an inquiry can be made about whether the values of the recorded parameters can be used in a supplementary manner. In that case, it is sufficient for the user to respond only once at minimum, and only the parameters that need correction can be modified. Hence, the job can be executed with a smaller number of actions.

Effect of First Embodiment

As is clear from the explanation given above, in the voice operation system according to the first embodiment, the operating-voice processing program representing a platform application program is installed in the mobile terminal 2, so that the application relays the communication among the MFP 1, the voice recognition server device 3, and the AI assistant server device 4. When the user utters something at the microphone unit 29 of the mobile terminal 2, the contents of the utterance of the user are analyzed and the MFP 1 is operated to perform the user-instructed operation (the voice input operation). Moreover, the contents of the utterance of the user for operating the MFP 1 enable controlling not only the operations of the MFP 1 but also the operations of the electronic blackboard 6 representing the second external device.

As a result, by instructing complex operations using the voice, the need to perform operations using the GUI of the touch panel 27 can be eliminated. Hence, for a user who is familiar with the operations, the input operations can be performed in a more speedy and simple manner. On the other hand, even for an elderly person or a user not familiar with the operations, the interactive operation support enables speedy and simple execution of the user-desired operations such as complex network settings, sophisticated job settings, and implementation of new applications. Moreover, it is possible to perform utterance-based voice input operations in which the operations of not only the MFP 1, which represents an example of the first external device, but also the electronic blackboard 6, which represents an example of the second external device, are controlled in a coordinated manner. Hence, a plurality of devices can be easily made to perform coordinated operations.

Furthermore, since the user intentions are analyzed based on the text of the contents of the utterance of the user, the processing details based on the utterance of the user can be determined by the AI assistant server device 4.

Second Embodiment

Given below is the explanation of a voice operation system according to a second embodiment.

System Configuration

Figure 29:
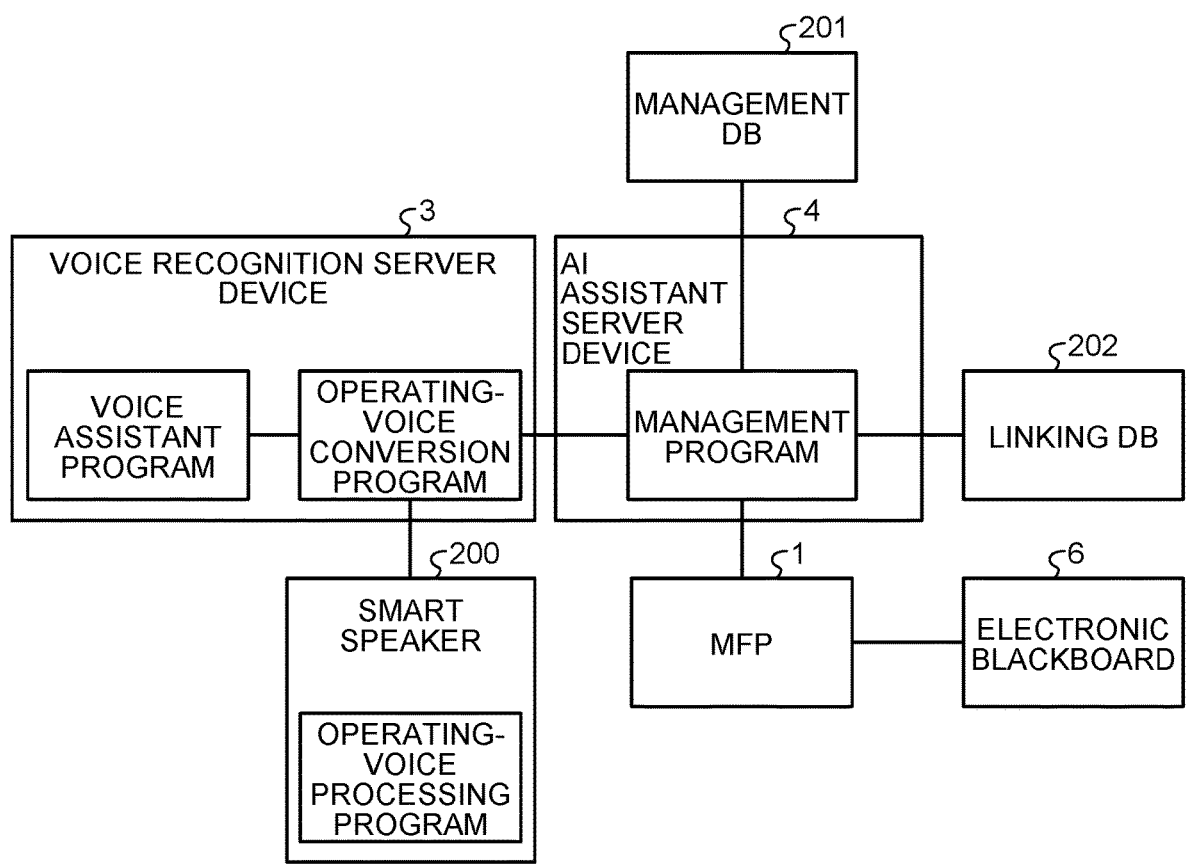
FIG. 29 is a system configuration diagram of a voice operation system according to a second embodiment.

FIG. 29 is a system configuration diagram of a voice operation system according to the second embodiment. As illustrated in FIG. 29, the voice operation system according to the second embodiment includes one or more multifunction peripherals (MFPs) 1, one or more electronic blackboards 6, one or more smart speakers 200 (or smartphones or tablet terminals), one or more voice recognition server devices 3, and one or more AI assistant server devices 4. Herein, the MFP 1, the smart speaker 200, the voice recognition server device 3, and the AI assistant server device 4 are connected to each via the network 5 such as a LAN. Moreover, the MFP 1 is connected to the electronic blackboard 6 either directly or via a network. Meanwhile, the electronic blackboard 6 can be connected via the network 5, or can be connected via some other network other than the network 5. With that, it becomes possible to provide a cloud service using the voice recognition server device 3 and the AI assistant server device 4.

Meanwhile, as the first external devices, other than the MFPs 1, it is also possible to install other electronic devices such as electronic blackboards and projectors. Moreover, as the second external devices, other than the electronic blackboards, it is also possible to use other electronic devices such as office devices including MFPs and projectors.

The AI assistant server device 4 includes a management database (management DB) 201 and a linking database 202. The management. DB 201 is a database for storing contents (data) such as text data, image data, and voice data provided as a cloud service by the AI assistant server device 4. The linking DB 202 is used to store, in a corresponding manner, the device ID enabling identification of each smart speaker 200 and the device ID of the MFP 1 associated to that smart speaker 200. That is, in the linking DB 202, the device ID of each smart speaker 200 and the device ID of the MFP 1 are stored in a corresponding manner, so as to enable identification of the MFP 1 that is voice-operable using each smart speaker 200. Meanwhile, in the linking DB 202, the device management table given earlier in Table 3 can also be stored. However, when the device management table is stored in the MFP 1, it need not be stored in the linking DB 202.

Herein, as the management DB 201 and the linking DB 202, it is possible to use a memory unit such as an HDD of the cloud service in the network 5. Alternatively, either one or both of the management DB 201 and the linking DB 202 can be stored in a different server device that is accessible by the cloud service via the network 5.

The smart speaker 200 includes a microphone unit (equivalent to the microphone unit 29 illustrated in FIG. 3) for obtaining the voice input by the user for voice-operating the corresponding MFP 1. Moreover, the smart speaker 200 includes a speaker unit (equivalent to the speaker unit 28 illustrated in FIG. 3) for performing a voice feedback to prompt the user to input the missing information. Furthermore, the smart speaker 200 performs data communication of, for example, voice data, text data, and image data between the voice recognition server device 3 and the AI assistant server device 4 that provide a cloud service. The voice recognition server device 3 analyzes the voice data received from the smart speaker 200 and converts the voice data into text data. Moreover, based on the text data and preregistered dictionary information, the voice recognition server device 3 interprets the user intentions, and sends the interpretation result to the AI assistant server device 4.

The AI assistant server device 4 converts the interpretation result, which is received from the voice recognition server device 3, into a job execution command in a format interpretable to the MFP 1, and sends it to the MFP 1. Thus, the MFP 1 executes the job execution command sent from the cloud service.

Hardware Configuration of MFP

The MFP 1 is equipped with a plurality of image processing functions such as the printer function and the scanner function. That is, as explained earlier with reference to FIG. 2, the MFP 1 includes the controller 7, the communication unit 15, the operating unit 16, the scanner engine 17, and the printer engine 18.

The controller 7 includes the CPU 10, the ASIC 11, the memory 12, the HDD 13, and the timer 14. The CPU 10, the ASIC 11, the memory 12, the HDD 13, and the timer 14 are connected to each other in a communicable manner via a bus line.

The communication unit 15 is connected to the network 5 and, as described later, obtains job execution commands such as scanning instructions and printing instructions that are voice-input using the mobile terminal 2.

The operating unit 16 is, what is called, a touch panel in which a liquid crystal display (LCD) and a touch sensor are configured in an integrated manner. When an execution command for a desired operation is to be issued using the operating unit 16, the operator performs touch operations of operation buttons (software keys) displayed in the operating unit 16 and specifies the desired operation.

The scanner engine 17 controls a scanner unit and performs optical reading of documents. The printer engine 18 controls an image writing unit and prints images on, for example, sheets of transfer paper. The CPU 10 comprehensively controls such image forming devices. The ASIC 11 is, what is called, a large-scale integration (LSI) circuit, and performs a variety of image processing required for the images processed in the scanner engine 17 and the printer engine 18. Herein, the scanner engine 17 and the printer engine 18, which are the tools for executing job execution commands obtained from the mobile terminal device 2, represent functional units.

The memory 12 is used to store various applications to be executed by the CPU 10 and to store a variety of data used in the execution of the applications. The HDD 13 is used to store image data, various computer programs, font data, and various files. Meanwhile, in place of the HDD 13 or in addition to the HDD 13, an SSD can also be installed.

Hardware Configuration of Smart Speaker

In an identical manner to the mobile terminal 2 illustrated in FIG. 3, in the smart speaker 200; the CPU 21, the RAM 22, the ROM 23, the I/F unit 24, and the communication unit 25 are connected to each other via the bus line 26.

The ROM 23 is used to store the operating-voice processing program. The CPU 21 executes the operating-voice processing program, obtains voice information from the microphone unit 29, and sends it to the cloud service. Moreover, the CPU 21 controls the display of data (voice data, text data, and image data), which is obtained from the cloud service, in the touch panel 27, or controls the voice output of that data via the speaker unit 28.

To the I/F unit 24 are connected the touch panel 27, the speaker unit 28, and the microphone unit 29. The microphone unit 29 collects (obtains) the call voice as well as the input voice of execution commands of a job with respect to the MFP 1. The input voice is sent to the cloud service via the communication unit 25.

Hardware Configuration of Cloud Service

As illustrated in FIG. 4, the voice recognition server device 3 as well as the AI assistant server device 4 constituting the cloud service is configured when the CPU 31, the RAM 32, the ROM 33, the HDD 34, the I/F unit 35, and the communication unit 36 are connected to each other via the bus line 37.

To the I/F unit 35 are connected the display unit 38 and the operating unit 39. The HDD 34 is used to store an operating-voice conversion program that converts voice data into text data, determines whether or not the text data is a match to dictionary information defined in advance; and, when the text data is a match, converts the text data into an intent that indicates the user intentions and into parameters that indicate variables of the job conditions. Moreover, the HDD 34 is used to store a voice assistant program that holds the dictionary information, and to store a management program that performs conversion into job execution instructions having the format interpretable by MFPs based on the intent and the parameters, and sends the job execution instructions to the registered MFPs.

The CPU 31 executes such computer programs. The operating-voice conversion program, the voice assistant program, and the management program can be executed either in a single server device or in different server devices. Alternatively, these computer programs can be executed in coordination among a plurality of server devices.

Hardware Configuration of Electronic Blackboard

As explained earlier with reference to FIG. 6, the electronic blackboard 6 is configured when the CPU 81, the ROM 82, the RAM 83, the SSD 84, the network I/F 85, the external device connection I/F 86, the power switch 87, the selection switches 88, the capturing device 91, the GPU 92, the sensor controller 95, the electronic-pen controller 97, and the short-range communication circuit 99 are connected to each other via the bus line 90. Moreover, the electronic blackboard 6 also includes the display controller 93, the display 94, the contact sensor 96, the electronic-pen controller 97, and the antenna 99a.

The CPU 81 controls the operations of the entire electronic blackboard 6. The ROM 82 is used to store computer programs, such as the IPL, to be used in driving the CPU 81. The RAM 83 is used as the work area for the CPU 81.

The SSD 84 is used to store a variety of data such as computer programs for an electronic blackboard. The network controller 85 controls the communication with a communication network. The external device connection I/F 86 is an interface for establishing connection with various external devices. In this case, examples of the external devices include the USB memory 100 and externally-attached devices (such as the microphone 101, the speaker 102, and the camera 103).

The capturing device 91 displays video information as still images or moving images in the display of the external PC 104. The GPU 92 is a semiconductor chip dedicated for handling graphics. The display controller 93 performs control and management of screen display for the purpose of outputting the output images from the GPU 92 to the display 94.

The contact sensor 96 detects a touch of the electronic pen 105 or a hand of the user on the display 94. The sensor controller 95 controls the operations of the contact sensor 96. The contact sensor 96 performs coordinate input and coordinate detection according to the infrared blocking method. In the method for coordinate input and coordinate detection, a plurality of infrared rays is radiated parallel to the display 94 from two light emission-reception devices that are installed at both ends in the upper side of the display 94. Then, the infrared rays get reflected from a reflecting material provided around the display 94; and the returning light is received that returns on the same light path as the light path of the light emitted from light receiving elements. The contact sensor 96 outputs, to the sensor controller 95, the IDs of the infrared rays emitted from the two light emission-reception devices blocked by an object; and the sensor controller 95 identifies the coordinate position of the object representing the contact position thereof. The electronic-pen controller 216 communicates with the electronic pen 105 and determines a touch of the leading end or the rear end of the electronic pen 105 onto the display 94.

The short-range communication circuit 99 is a communication circuit for NFC or Bluetooth (registered trademark). The power switch 87 is a switch for turning ON and turning OFF the power of the electronic blackboard 6. The selection switches 88 are a group of switches for adjusting, for example, the brightness and the coloration of the display 94.

The bus line 90 is an address bus or a data bus for electrically connecting the constituent elements, such as the CPU 81, illustrated in FIG. 6.

Meanwhile, the contact sensor 96 is not limited to be configured using the infrared blocking method, and can alternatively be configured using various detection methods such as a capacitive touch panel for identifying the contact position by detecting the changes in the capacitance; or a resistive touch panel for identifying the contact position according to the variation of voltage of two resistance films facing each other; or an electromagnetic induction touch panel for identifying the contact position by detecting the electromagnetic induction that occurs when an object makes contact with the display unit. Moreover, the electronic-pen controller 97 not only can be configured to determine a touch of the leading end or the rear end of the electronic pen 105, but can also be configured to determine a touch of the portion of the electronic pen 105 held by the user or to determine a touch of some other portion of the electronic pen 105.

Functions Based on Computer Programs

Figure 30:
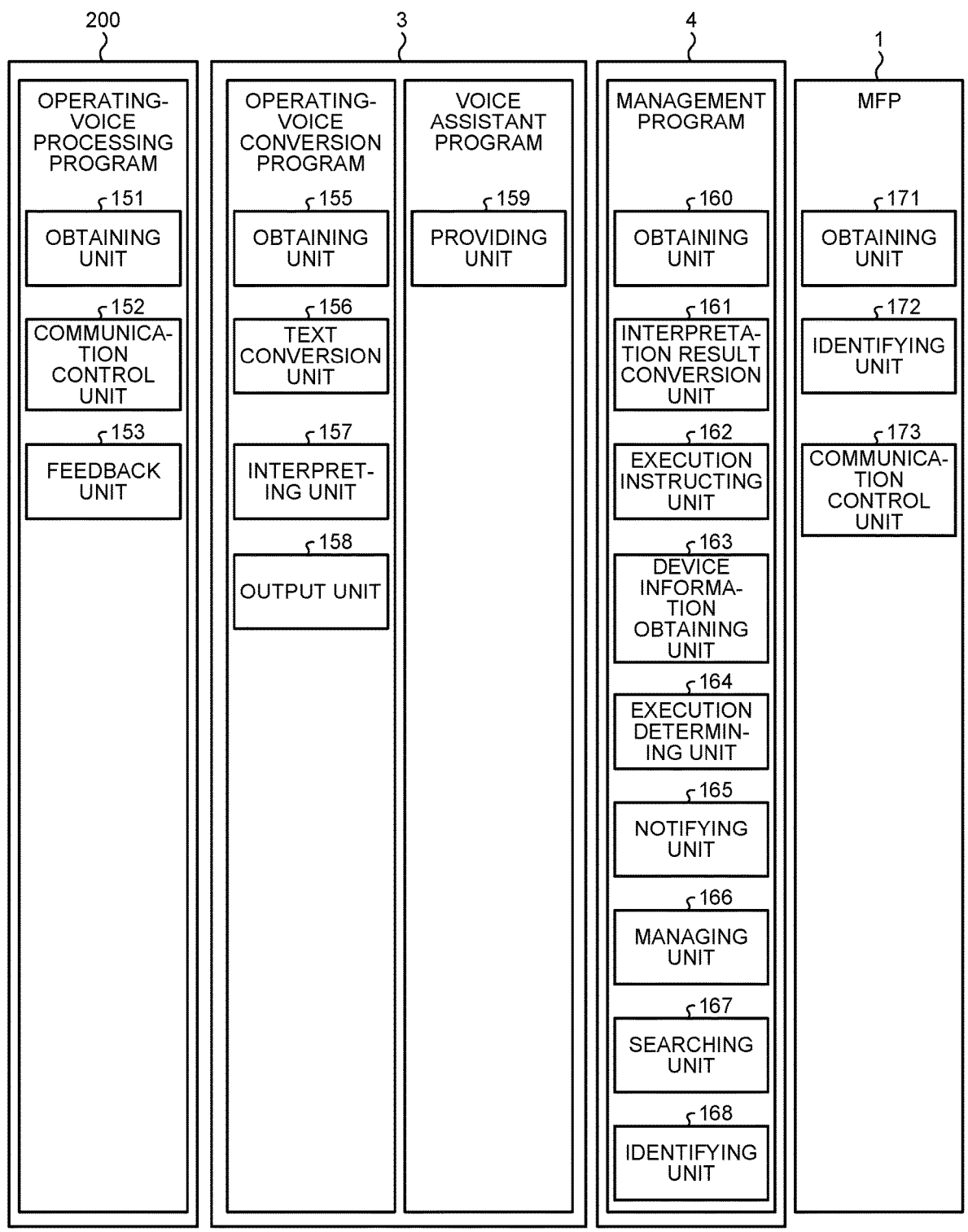
FIG. 30 is a diagram illustrating an exemplary configuration of functional blocks implemented as a result of executing various computer programs in the voice operation system according to the second embodiment.

FIG. 30 is a diagram illustrating the functions implemented when the CPU 21 of the smart speaker 200 executes the operating-voice processing program. Moreover, FIG. 30 is a diagram illustrating the functions implemented when the CPU 31 of the voice recognition server device 3 executes the operating-voice conversion program and the voice assistant program. Furthermore, FIG. 30 is a diagram illustrating the functions implemented when the CPU 31 of the AI assistant server device 4 executes the management program.

Functions of Operating-Voice Processing Program

The CPU 21 of the smart speaker 200 executes the operating-voice processing program stored in the memory unit such as the ROM 23, and functions as an obtaining unit 151, a communication control unit 152, and a feedback unit 153 that represents an example of a correction output unit. The obtaining unit 51 obtains the instruction voice of the user collected via the microphone unit 29 and for voice-operating the MFP 1. Moreover, the obtaining unit 151 can also obtain the operations and the instructions from the user via a touch panel or physical switches. The communication control unit 152 controls the communication between the smart speaker 200 and the cloud service. The communication control unit 152 sends the information obtained by the obtaining unit 151 to the cloud service; and obtains text data, image data, and voice data from the cloud service. Moreover, in the case of sending the information obtained by the obtaining unit 151 to the cloud service, the communication control unit 152 sends the device ID enabling identification of the smart speaker 200.

In order to enable implementation of interactive voice input operations, the feedback unit 153 gives a voice feedback to prompt, for example, an input operation to supplement insufficient data or gives a voice feedback to confirm an input operation. Moreover, the feedback unit 153 can provide the user with the feedback text or the feedback image by displaying it in the touch panel 27.

In this example, the constituent elements from the obtaining unit 151 to the feedback unit 153 are implemented using software. However, alternatively, some or all of those constituent elements can be implemented using hardware such as an IC. Moreover, the constituent elements from the obtaining unit 151 to the feedback unit 153 can be implemented using only the operating-voice processing program, or some other computer programs can be made to execute some of the operations, or the operations can be indirectly performed using some other computer programs.

Functions of Operating-Voice Processing Program

The CPU 31 of the voice recognition server device 3 executes the operating-voice conversion program stored in the HDD 34, and functions as an obtaining unit 155; a text conversion unit 156 representing an example of a recognizing unit; an interpreting unit 157; and an output unit 158. The obtaining unit 155 obtains the voice data input by the user and sent from the smart speaker 200. Moreover, the obtaining unit 155 can obtain the user operations of the touch panel, buttons, and switches of the smart speaker 200.

The text conversion unit 156 converts the voice data, which is input by the user, into text data (an example of the recognition result). The interpreting unit 157 interprets the user instruction based on the text data. More particularly, based on the dictionary information provided by the voice assistant program, the interpreting unit 157 confirms whether or not the words specified in the text data are a match to the dictionary information. If the words are a match, then the interpreting unit 157 converts the text data into the intent that indicates the user intentions and into parameters that indicate variables of the job conditions. The interpreting unit 157 sends the intent and the parameters to the management program, along with sending the device ID of the smart speaker 200 for enabling identification of the smart speaker 200 that obtained the voice data. The output unit 158 controls the communication of the communication unit 36 so that data such as the text data, the voice data, and the image data is sent to the smart speaker 200.

In this example, the constituent elements from the obtaining unit 155 to the output unit 158 are implemented using software. However, alternatively, some or all of those constituent elements can be implemented using hardware such as an IC. Moreover, the constituent elements from the obtaining unit 155 to the output unit 158 can be implemented using only the operating-voice conversion program, or some other computer programs can be made to execute some of the operations, or the operations can be indirectly performed using some other computer programs. For example, the voice assistant program can be made to execute some or all of the functions of the interpreting unit 157 of the operating-voice conversion program. In that case, for example, a voice assistant application can be made to confirm whether or not the words specified in the text data are a match to the dictionary information and, when the words are a match, to convert the text data into the intent that indicates the user intentions and into the parameters that indicate variables of the job conditions; and then the interpreting unit 157 can obtain the intent and the parameters from the voice assistant program.

Functions of Voice Assistant Program

The CPU 31 of the voice recognition server device 3 executes the voice assistant program stored in the HDD 34, and functions as a providing unit 159. The providing unit 159 manages the dictionary information which is stored in the HDD 34 and in which the relationship between the text data, the intent, and the parameters is defined in advance; and provides the dictionary information to the operating-voice conversion program. Moreover, based on text data, the providing unit 159 can interpret the operation instruction issued by the user. More particularly, the providing unit 159 obtains text data from the operating-voice conversion program; confirms whether or not the words specified in the text data are a match to the dictionary information; and, when the words are a match, converts the text data into the intent and the parameters. Then, the providing unit 159 provides the intent and the parameters to the operating-voice conversion program.

In this example, the providing unit 159 is implemented using software. However, alternatively, the providing unit 159 can be implemented, partially or entirely, using hardware such as an IC, in an identical manner to the other computer programs mentioned above.

Functions of Management Program

The CPU 31 of the AI assistant server device 4 executes the management program stored in the HDD 34, and functions as an obtaining unit 160; an interpretation result conversion unit 161 representing an example of a converting unit; an execution instructing unit 162; a device information obtaining unit 163 representing an example of a processing capability obtaining unit; an execution determining unit 164 representing an example of a determining unit; a notifying unit 165; a managing unit 166; a searching unit 167; and an identifying unit 168.

The obtaining unit 160 obtains the intent, the parameters, and the device ID of the smart speaker 200 as sent from the voice recognition server device 3. The interpretation result conversion unit 161 converts the interpretation result regarding the intent and the parameters, as obtained by conversion in the operating-voice conversion program, into a job execution command (an example of instruction information) in the interpretable format for the MFP 1. The execution instructing unit 162 sends the job execution command to the MTP 1 and instructs job execution.

The execution instructing unit 162 refers to the linking DB 202 and sends the job execution command to the MFP 1 associated to the smart speaker 200. That is, the execution instructing unit 162 obtains the intent, the parameters, and the device ID enabling identification of the smart speaker 200 used by the user; searches the linking DB 202 for the MFP 1 associated to the obtained device ID; and sends the job execution command to the retrieved MTP 1.

The device information obtaining unit 163 obtains, from the MFP 1, the device information (an example of information processing capability) regarding, for example, the maximum processable pixel count in the MFP 1. The device information obtaining unit 163 stores, in a memory unit such as an HDD, the device information, which is obtained from a plurality of external devices such as the MFPs 1, in a corresponding manner to identification information such as the device IDs enabling identification of the external devices; and manages the stored information.

Moreover, the device information obtaining unit 163 obtains the device state including the connection status about whether or not the communication connection with the concerned MFP 1 is established; the power state such as the power ON/OFF state or the sleep mode of the concerned MPF 1; the presence or absence of errors and the error types; the remaining amount of consumables such as paper sheets and toners; the login status of the user; and authority information indicating the functions enabled for the user who has logged in.

The execution determining unit 164 compares the processing capability of the MFP 1, which is indicated in the device information, with the user-specified job (i.e., the intent and the parameters generated in the operating-voice conversion program), and determines whether or not the user-specified job is executable in the MFP 1. If it is determined that the user-specified job is executable in the MFP 1, then the execution determining unit 164 sends a job execution command to the MFP 1. On the other hand, if it is determined that the user-specified job is not executable in the MFP 1, then the execution determining unit 164 feeds back response information, such as an error message, to the smart speaker 200 via the operating-voice conversion program.

The notifying unit 165 notifies the operating-voice conversion program about text data, voice data, and image data as the response to the job execution instruction from the user. Moreover, when there are missing parameters indicating the job conditions for executing the job, the notifying unit 165 performs a feedback to the terminal via the operating-voice conversion program and prompts the user to input the parameters. Herein, as the information required for confirming the missing parameters, the parameter information can be sent. Moreover, as the information required for prompting the user to specify the parameters; text data, voice data, and image data can be sent.

The managing unit 166 registers the device ID of the smart speaker 200 and the device ID of the MFP 1 in a corresponding manner in the linking DB 202 based on the information and the instruction input to the MFP 1, or the smart speaker 200, or a client device connected to the cloud service via a network. In the linking DB 202, the association information about the device ID of the smart speaker 200 and the device ID of the MFP is held in, for example, a management table. The searching unit 167 searches the management DB 201 for files based on the parameters specified in the interpretation result. The identifying unit 168 refers to the device management table given earlier in Table 3 and stored in the linking DB 202, and identifies the device based on the parameters specified in the interpretation result. However, when the MFP 1 includes an identifying unit 172, the identifying unit 168 may be omitted.

In this example, the constituent elements from the obtaining unit 160 to the identifying unit 168 are implemented using software. However, alternatively, some or all of those constituent elements can be implemented using hardware such as an IC, in an identical manner to the other computer programs explained above.

Functions of Computer Program of MFP

The CPU 10 of the MFP 1 executes a computer program stored in the HDD 13, and functions as an obtaining unit 171, an identifying unit 172, and a communication control unit 173 (sending unit). The obtaining unit 171 obtains job commands sent from the AI assistant server device 4. The identifying unit 172 refers to the device management table, which is given in Table 3 (described later) and which is stored in the HDD 13, according to the output device location representing a setting value specified in a job command; and identifies the device. However, when the AI assistant server 4 includes the identifying unit 168, the identifying unit 172 may be omitted. The communication control unit 173 controls the communication unit 15 to receive job commands sent from the AI assistant server device 4 and to send the data (scanned data) to the device identified by the identifying unit 172.

In this example, the constituent elements from the obtaining unit 171 to the communication control unit 173 are implemented using software. However, alternatively, some or all of those constituent elements can be implemented using hardware such as an IC. Moreover, the functions of the constituent elements from the obtaining unit 171 to the communication control unit 173 can be implemented using only the abovementioned computer program, or some other computer programs can be made to execute some of the operations, or the operations can be indirectly performed using some other computer programs.

Meanwhile, the operating-voice processing program, the operating-voice conversion program, the voice assistant program, the management program, and the computer program of the MFP 1 can be recorded as installable or executable files in a computer-readable recording medium such as a CD-ROM or a flexible disc (FD). Alternatively, the computer programs can be recorded in a computer-readable recording medium such as a CD-R, a DVD, a Blu-ray (registered trademark) disc, or a semiconductor memory. Still alternatively, the computer programs can be provided in the installable form via a network such as the Internet, or can be stored in advance in the internal ROM.

Overall Operations During Voice Input Operation

Figure 31:
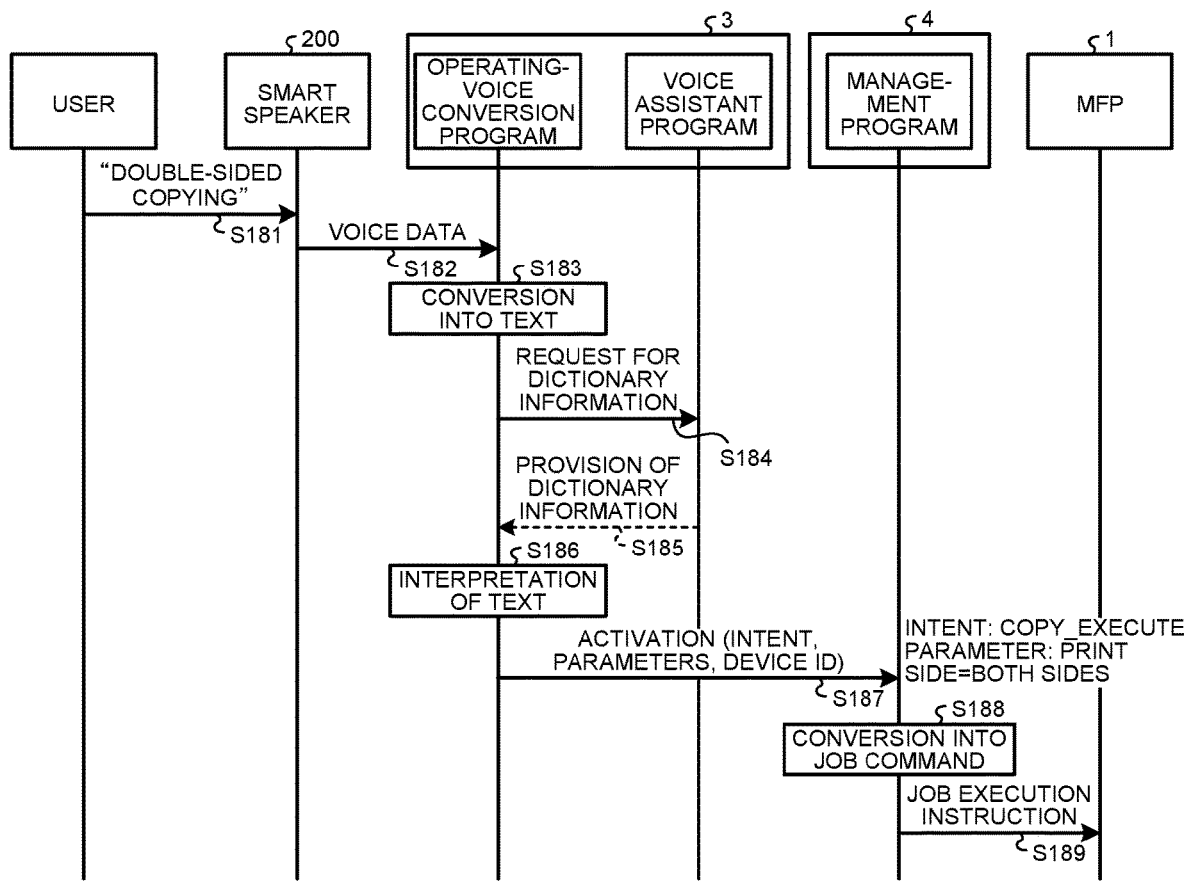
FIG. 31 is a sequence diagram for explaining an exemplary flow of overall operations performed during a voice operation in the voice operation system according to the second embodiment.

Explained with reference to FIG. 31 are the overall operations performed during a voice input operation. In the voice operation system according to the second embodiment. In the example illustrated in. FIG. 31, a voice input operation is performed via the smart speaker 200 for implementing the double-sided copying function of the MFP 1. In that case, the user activates the operating-voice processing program of the smart speaker 200 and utters, for example, "double-sided copying" (Step S181). The voice of the user is collected by the microphone unit 29 of the smart speaker 200, and is obtained by the obtaining unit 151. Herein, the operating-voice processing program either can be activated at the same time of activating the smart speaker 200 or can be activated after predetermined operations or predetermined operation by voice are performed with respect to the smart speaker 200.

In the smart speaker 200, the communication control unit 152 sends voice data of "double-sided copying" to the voice recognition server device 3 of the cloud service (Step S182). At that time, the communication control unit 152 sends the device ID of the smart speaker 200, which enables identification of the smart speaker 200, to the voice recognition server device 3. In the voice recognition server device 3, the text conversion unit 156 that is implemented by the operating-voice conversion program converts the voice data of "double-sided copying" into text data (Step S183).

Then, based on the dictionary information obtained from the voice assistant program (Steps S184 and S185), the interpreting unit 157 confirms whether or not the words specified the text data are a match to the dictionary information (Step S186). If the words are a match, then the interpreting unit 157 converts the text data into the intent indicating the user-instructed operation and into the parameters indicating variables of the job conditions, and sends the intent and the parameters to the AI assistant server device 4; along with sending the device ID enabling identification of the smart speaker 200 that obtained the voice data (Step S187).

More particularly, in this example, the interpreting unit 157 interprets that the operation requested for execution in the MFP 1 is "copying (intent: Copy_Execute)", and interprets that "the print side is on both sides (print side=both sides)" (Step S186). In this way, based on the text data, the interpreting unit 157 generates an interpreting result indicating the type (intent) and the contents (parameters) of the user-specified job. The interpretation result is then sent to the management program (Step S187). At that time, the interpreting unit 157 can send, to the AI assistant server device 4, the device ID enabling identification of the smart speaker 200, to which the voice data is to be sent, in a corresponding manner to the interpretation result.

In the AI assistant server device 4, the interpretation result conversion unit 161 of the management program converts the interpretation result, which is obtained from the smart speaker 200, into a job command for the MFP 1 (Step S188). An example of the interpretation result and the job command obtained by conversion from the interpretation result was explained earlier with reference to Table 1. Meanwhile, the configuration can be such that, in order to convert the interpretation result into a job command, the information equivalent to Table 1 is stored in the memory unit such as the HDD 34 of the AI assistant server device 4, so that the interpretation result conversion unit 161 can refer to that information.

In the example given earlier in Table 1, as the operations performed only in the MFP 1, "COPY_EXECUTE", "SCAN_EXECUTE", "PRINT_EXECUTE", and "FAX_EXECUTE" are illustrated as examples of the intent. Moreover, as the operations performed in coordination between the MFP 1 and the electronic blackboard 6, "SCAN_TO_DISPLAY", "DISPLAY_TO_PRINT", "SCREENSHOT_TO_PRINT", and "DOCUMENT_TO_DISPLAY" are illustrated as examples of the intent. Furthermore, "print side", "number of copes", "output device", and "output device location." are illustrated as examples of the parameters. Herein, the parameters include all parameters that are specifiable as the setting values of jobs.

In the AI assistant server device 4, the interpretation result conversion unit 161 converts the interpretation result of "COPY_EXECUTE" as a job command of "execute a copying job" for the MFP 1. In an identical manner, the interpretation result conversion unit 161 converts the interpretation result of "SCAN_EXECUTE" as a job command of "execute a scanning job" for the MFP 1. In an identical manner, the interpretation result conversion unit 161 converts the interpretation result of "PRINT_EXECUTE" as a job command of "execute a printing job" for the MFP 1. In an identical manner, the interpretation result conversion unit 161 converts the interpretation result of "FAX_EXECUTE" as a job command of "execute a faxing job" for the MFP 1.

Meanwhile, the explanation given above is about the examples of the fundamental jobs executed in the MFP 1. However, the jobs interpretable in the cloud service are not limited to such fundamental jobs. For example, it is also possible instruct a job in which the communication target is made to collect device information and send it to the cloud service, or to instruct a job in which predetermined information stored in the memory unit of the communication target is displayed in the display unit of the communication target. For example, the interpretation result conversion unit 161 converts the interpretation result of "SCAN_TO_DISPLAY" into a job command of "send the scanning result to the device" for the MFP 1. In an identical manner, the interpretation result conversion unit 161 converts the interpretation result of "DISPLAY_TO_PRINT" into a job command of "print the display contents of the device" for the MFP 1. In an identical manner, the interpretation result conversion unit 161 converts the interpretation result of "SCREENSHOT_TO_PRINT" as a job command of "print the screenshot stored in the device" for the MFP 1. In an identical manner, the interpretation result conversion unit 161 converts the interpretation result of "DOCUMENT_TO_DISPLAY" as a job command of "send the documents stored in the MFP to the device" for the MFP 1. Herein, the "device" implies a device (a second external device) such as the electronic blackboard 6 that can communicate with the MFP 1.

Moreover, when the parameter "print side" is included in the interpretation result, the interpretation result conversion unit 161 generates a job command of "change the setting value regarding the print side" for the MFP 1. In an identical manner, when the parameter "number of copies" is included in the interpretation result, the interpretation result conversion unit 161 generates a job command of "change the setting value regarding the number of copies" for the MFP 1. In an identical manner, when the parameter "output device" is included in the interpretation result, the interpretation result conversion unit 161 generates a job command of "specify the device type" for the MFP 1. Herein, the device type represents information enabling identification of the second external device such as the electronic blackboard 6; and can contain the type of the device, the model number of the device, the device ID, and the functions of the device. Meanwhile, in an identical manner, when the parameter "output device location" is included in the interpretation result, the interpretation result conversion unit 161 generates a job command of "specify the location of the device" for the MFP 1. Herein, the location or the device represents information enabling identification of the location of installation of the second external device; and can contain the building name, the floor, and the room name.

That is, according to the information included in the "intent" section of the interpretation result, the interpretation result conversion unit 161 determines the intention of the user, that is, the type of the job to be executed by the MFP 1; treats the values included in the "parameter" section as the setting values of the job; and converts the interpretation result into a job command.

Then, the interpretation result conversion unit 161 in the AI assistant server device 4 sends the generated job command to the MFP 1 via the communication unit 36 (Step S189). In this example, a job command of "execute a copying job (print side-both sides)" is sent to the MFP 1. Meanwhile, the communication control unit 52 sends the job command to the MFP identified by the managing unit. That is, the execution of a job can be instructed to the MFP that is identified by the ID linked to the device ID enabling identification of the source terminal of the voice data. As a result, double-sided printing gets carried out in the MFP 1.

Details of Interpretation Operation in Cloud Service Devices

In the voice recognition server device 3, the dictionary information is stored in the HDD 34. Based on the dictionary information, the operating-voice conversion program generates the intent and the parameters. More particularly, the operating-voice conversion program determines whether or not the words specified in the text data, which is obtained by conversion of the voice data, are a match to the dictionary information; and, when the words are a match, generates an interpretation result including the intent and the parameters defined in the dictionary information.

The dictionary information can be in any format, as long as the intent and the parameters can be generated. As an example, in this example, the dictionary information is configured with entity information, intent information, and association information. The entity information represents information for associating the parameters of a job with natural language. Herein, a single parameter can have a plurality of synonyms registered in a corresponding manner. The intent information represents information indicating the type of a job. The association information represents information for associating the uttered phrase (natural language) of the user with the entity information, and for associating the uttered phrase (natural language) of the user with the intent information. As a result of having the association information, even if there is some change in the order of utterance or the nuances in the parameters, it becomes possible to perform correct interpretation. Moreover, as a result of having the association information, the response text (interpretation result) can be generated based on the input contents.

As explained earlier, FIG. 12 illustrates an example of the entity information. In the example illustrated in FIG. 12, the entity information corresponds to printing color (print Color). In FIG. 12, the term "print Color" indicates the entity name. Moreover, in FIG. 12, the terms such as "auto_color", "monochrome", "color", and/or on given in the left-side column indicate parameter names. Furthermore, in FIG. 12, the terms such as "auto_color", "monochrome, black and white", and "color, full color" given in the right-side column indicate synonyms.

As can be understood from FIG. 12, the parameters and the synonyms are stored in a corresponding manner as the entity information. As a result of registering the synonyms along with the parameters, for example, if black-and-white copying is to be instructed, the parameter setting can be performed regardless of whether "Please copy by black and white" is uttered or whether "Please copy by monochrome" is uttered.

FIG. 13 illustrates, at (a), an example of uttered phrases of the user; FIG. 13 illustrates, at (b), the intent name; and FIG. 13 illustrates, at (c), the entity information. As illustrated at (a) to (c) in FIG. 13, in the screen displayed in the display unit 38 provided in the cloud service, the utterance of the user is dragged by operating the operating unit 39. Alternatively, in the screen displayed in the display unit of a device that accessed the cloud service via a network, the utterance of the user is dragged using the operating unit of that device.

That enables selection of the entity information that is to be associated. Moreover, if a value is set in the selected entity information, the parameters included in the response get modified. For example, when "Please copy by black and white" is uttered, if the value is set to "SprintColor", then "printColor=monochrome" is obtained as the return value. If the value is set to "SprintColor.original", then "printColor=black and white" is obtained as the return value. Herein, if the value is set to "SprintColor.original", then the contents of the utterance of the user can be returned without modification as the parameters in the response.

Interactive Operations

In the voice operation system according to the second embodiment, an interactive system is implemented in which the system makes a response based on the details of the user input. In the voice operation system according to the second embodiment, apart from responding with fixed phrases required in interaction, two other types of responses, namely, an "insufficient input feedback" and an "input confirmation feedback" are given as the operation specific responses from the MFP 1; and an interactive MFP operation system is implemented in which the MFP operations can be performed in an interactive manner.

The "insufficient input feedback" is a response output when the required information for job execution is not fully available. When the result of the user input is not properly audible or when the required parameters are missing, the "insufficient input feedback" is output. Thus, if the parameters other than the required parameters are not specified, then the "insufficient input feedback" need not output. Moreover, apart from confirming the parameters, the function to be used, such as the copying function or the scanning function, can also be confirmed.

For example, according to the type of the external device that is in communication connection with the cloud service, the functions and the parameters to be confirmed with the user can be varied. In that case, after establishing communication with the external device, the device information obtaining unit 163 can obtain the type and the functions of the external device at a predetermined timing; and, for example, the feedback unit 153 can decide on the functions and the parameters to be confirmed with the user based on the obtained information.

For example, when the MFP 1 represents the external device, the functions of the MFP 1 such as copying, printing, scanning, and faxing can be confirmed with the user; and, moreover, only from among the functions of the MFP 1 such as copying, printing, scanning, and faxing, the function to be used can be confirmed with the user. Moreover, the required parameters can be modified according to the setting conditions specified by the user. That is, if the user-specified printing condition indicates variable magnification printing, then the paper size is set as a required parameter. Moreover, if the user-specified printing condition indicates double-sided printing, then the setting indicating whether the documents are single-sided documents or double-sided documents is set as a required parameter. Furthermore, if the user-specified printing condition indicates weekly-magazine binding, then the finished size and the number of pages included in a single copy are set as the required parameters.

The "input confirmation feedback" is a response output when the required information for job execution is fully available. That is, the input confirmation feedback is output when all required parameters are specified. Moreover, the input confirmation feedback is performed to prompt the user to select between executing the job with the current setting values or modifying the setting values. In order to confirm whether or not execute the job with the current setting values, all of the user-specified parameters (regardless of the required parameters and the other parameters) can be voice-output for confirmation from the user.

Example of Interactive Operations with Respect to MFP for Executing Double-Sided Copying and Obtaining Two Copies FIGS. 32 to 40 are sequence diagrams for explaining the flow of interactive operations.

Flow of Operations for Activating Voice Assistant Program

Figure 32:
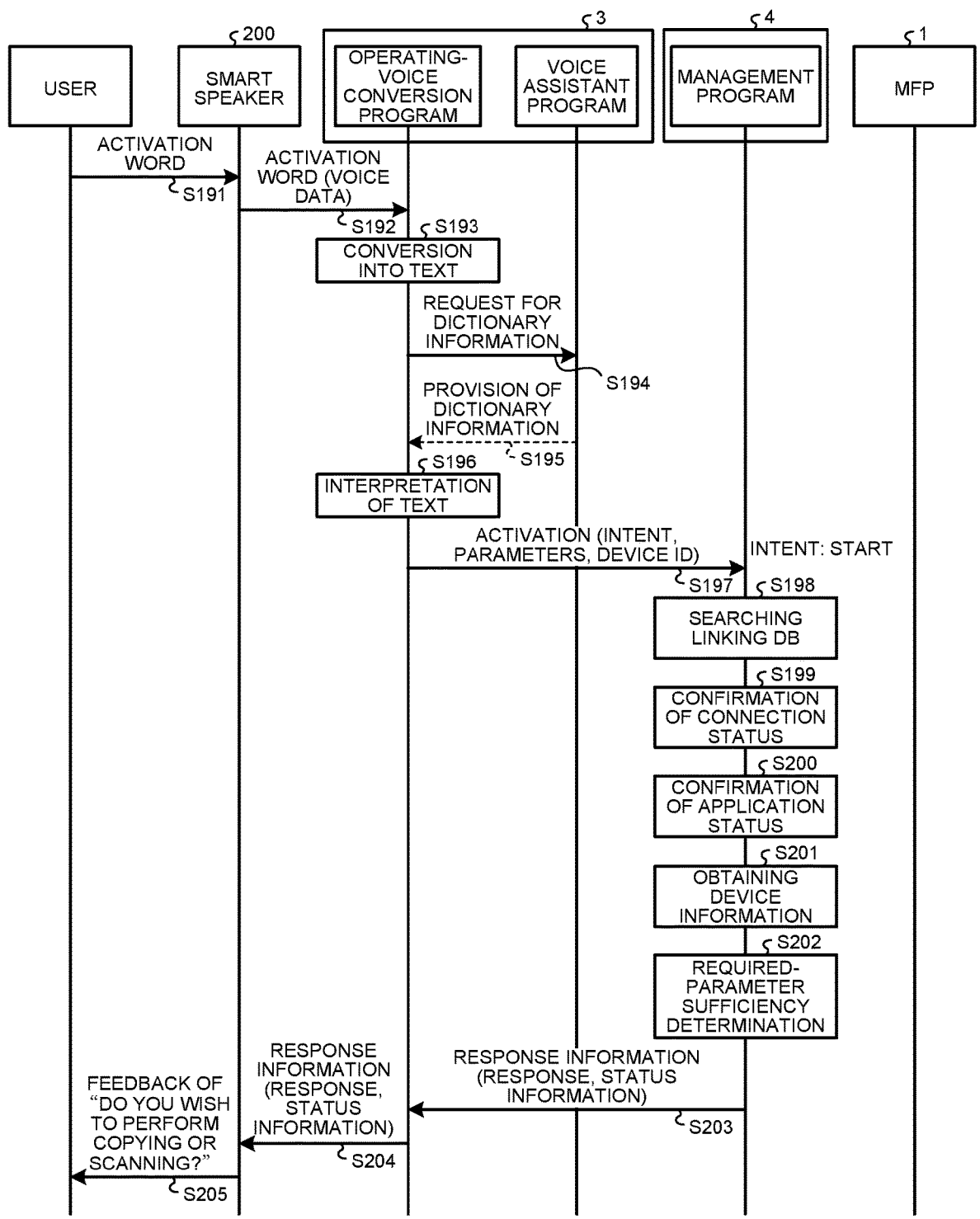
FIG. 32 is a sequence diagram for explaining an exemplary flow of operations for activating a voice assistant program.

FIG. 32 illustrates the flow of operations for activating the voice assistant program. With reference to FIG. 32, firstly, when the operating-voice processing program of the smart speaker 200 is activated, the user performs, for example, a voice input to instruct activation of the voice assistant program. As an example, when the user utters an activation word for activating the voice assistant program, the voice assistant program of the voice recognition server device 3 can be activated (Step S191).

The communication control unit 152 of the smart speaker 200 sends the voice data of the activation word to the voice recognition server device 3 (Step S192). In the voice recognition server device 3, the text conversion unit 156 converts the voice data of the activation word into text data (Step S193). Moreover, in the voice recognition server device 3, based on the dictionary information provided from the voice assistant program (the dictionary information stored in the HDD 34) (Steps S194 and S195), the interpreting unit 157 converts the text data of the activation keyword into the intent and parameters (performs text interpretation) (Step S196), and sends the interpretation result along with the device ID of the smart speaker 200 to the AI assistant server device 4 (Step S197).

In the AI assistant server device 4, based on the intent and the parameters, the execution determining unit 164 determines whether or not all required parameters for job execution are available (Step S198 to Step S202). For example, the execution determining unit 164 determines whether or not the required parameters are fully available (Step S202) and, if any of the required parameters are missing, sends response information to the smart speaker 200 via the operating-voice conversion program of the voice recognition server device 3 (Steps S203 and S204).

The response information contains, for example, text data, voice data, and image data. Herein, as an example, the text data of "Do you wish to perform copying or scanning?" is sent to the smart speaker 200. Herein, as long as the message prompts the user to input the type of the job and input the setting conditions for the job, the contents of the message are not limited to this example. Meanwhile, in case the text data is not convertible into voice data in the smart speaker 200, the information can be sent in the form of voice data. Moreover, the feedback to the user is not limited to a voice output, and a text or an image can also be displayed in the touch panel 27. Subsequently, in the smart speaker 200, the feedback unit 153 gives a voice feedback of "do you wish to perform copying or scanning?" (Step S205).

Meanwhile, at the time of instructing activation of the voice assistant program of the voice recognition server device 3, if the job type and the setting conditions are specified, then the abovementioned step can be omitted. Moreover, before sending the response information, the execution determining unit 164 of the AI assistant server device 4 can search the linking DB 202 for the MFP 1 corresponding to the obtained device ID of the smart speaker 200.

At that time, if the MFP 1 linked to the device ID of the smart speaker 200 is not stored in the linking DB 202, then the execution determining unit 164 notifies the user about the fact that the smart speaker 200 is not associated to any communication target. For example, the execution determining unit 164 generates response information that contains the response indicating "this device is not associated to any other devices". Moreover, the execution determining unit 164 can also include, in the response, the method for linking the device and the communication target. Meanwhile, the retrieval of the MFP 1 from the linking DB 202 and the generation of the response information can be performed at an arbitrary timing other than the timing of obtaining the device ID of the smart speaker 200.

Moreover, before sending the response information, the execution determining unit 164 can confirm the device state of the communication target. The execution determining unit 164 can obtain the device information using the device information obtaining unit 163 or can refer to the device information obtained in advance by the device information obtaining unit 163, and determine whether or not communication is possible with the communication target and whether or not the communication target is available for use. At that tome, if the connection between the device ID of the smart speaker 200 and the MFP 1 to be linked is not yet established, or if the MFP cannot be used on account of being under activation; then the user is informed about the same.

For example, the execution determining unit 164 generates response information that contains a response such as "the device is offline" or "the device is getting ready". Moreover, the execution determining unit 164 can also include the countermeasure in the response. Meanwhile, the confirmation of the device state can be performed at an arbitrary timing other than the timing of obtaining the intent, the parameters, and the device ID from the operating-voice conversion program of the voice recognition server device 3.

Moreover, before sending the response information, the execution determining unit 164 can confirm the state of the application to be used for executing the user-specified function in the communication target. The execution determining unit 164 can obtain the device information using the device information obtaining unit 163 or can refer to the device information obtained in advance by the device information obtaining unit 163, and determine whether or not the concerned application is installed or whether or not the concerned application is in the executable state.

For example, if the application related to the copying function specified for execution is not installed in the MFP 1 that is linked to the device ID of the smart speaker 200, or if the application related to the copying is not available on account of being under activation; then the execution determining unit 164 notifies the user about the same. For example, the execution determining unit 164 generates response information that includes a response such as "the application is not installed" or "the application is currently not available". Moreover, the execution determining unit 164 can also include the countermeasure in the response.

Meanwhile, the confirmation of the state of the application can be performed at an arbitrary timing other than the timing of obtaining the intent, the parameters, and the device ID from the operating-voice conversion program. Moreover, before sending the response information, the execution determining unit 164 can obtain the device information using the device information obtaining unit, or can read the device information obtained in advance by the device information obtaining unit. The obtained device information is used, for example, in determining whether or not the job type and the job conditions specified by the user are executable in the communication target.

Flow of Operations Performed when Copying Function is Specified

Figure 33:
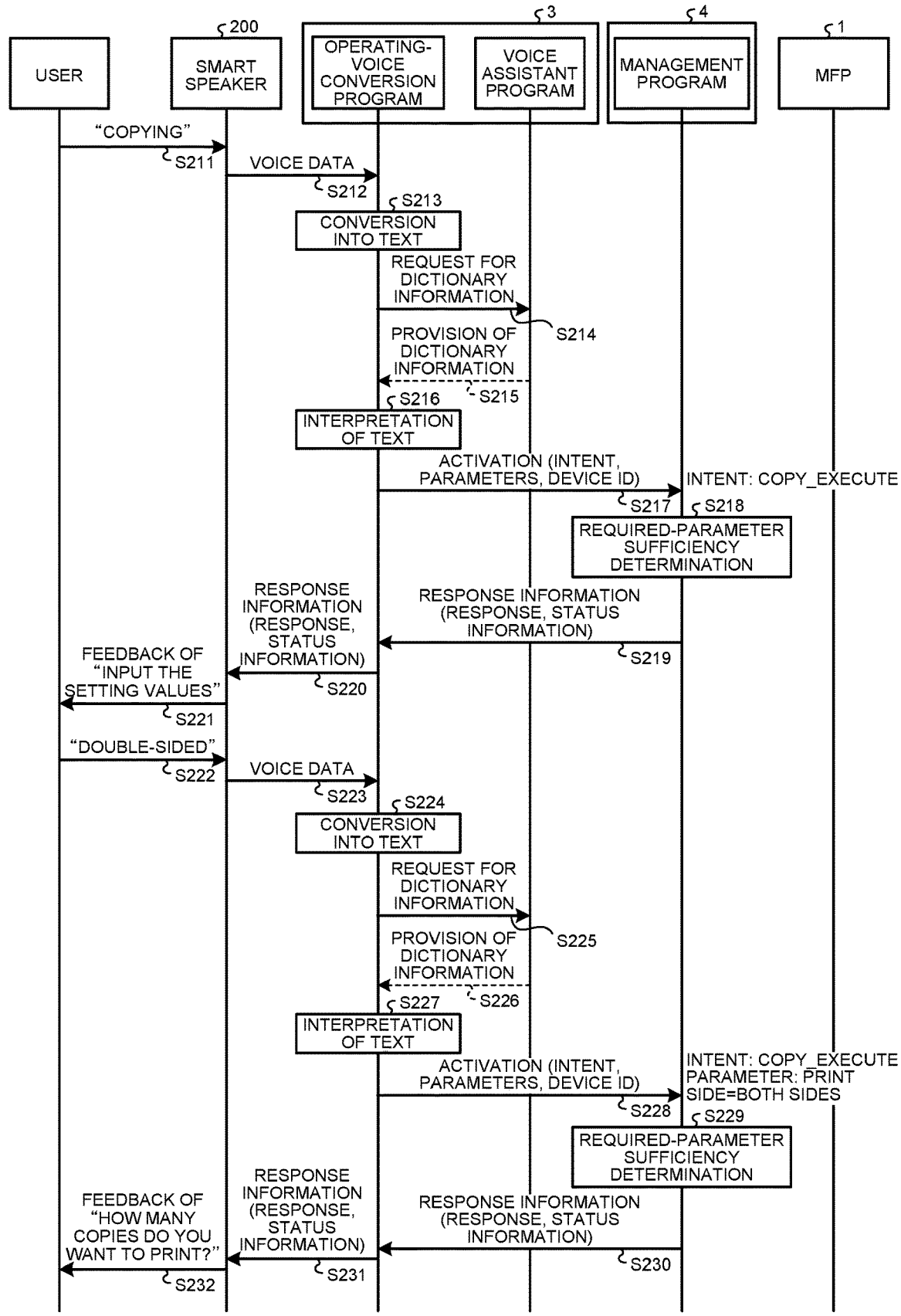
FIG. 33 is as is a sequence diagram for explaining an exemplary flow of operations performed when a copying function is specified.

FIG. 33 is a sequence diagram for explaining the flow of operations performed when the copying function is specified. If the user utters "copying" in response to the voice feedback of "do you wish to perform copying or scanning?" output at Step S205 explained earlier (Step S211), or if the user has already uttered "copying" at the time of issuing the activation instruction for the voice assistant program; then the communication control unit 152 of the smart speaker 200 sends voice data of "copying" to the voice recognition server device 3 (Step S212). In the voice recognition server device 3, the text conversion unit 156 of the operating-voice conversion program converts the voice data of "copying" into text data (Step S213).

As explained earlier with reference to FIGS. 12 and 13, the interpreting unit 157 of the voice recognition server device interprets the uttered phrase of the user as specified in the text data (Step S214 to Step S216); and sends the interpretation result, which includes the intent and the parameters, and the device ID of the smart speaker 200 to the AI assistant server device 4. Herein, the interpreting unit 157 generates the intent indicating "COPY_EXECUTE" as the interpretation result, and sends it to the management program (Step S217).

Subsequently, in this example, since the user only utters "copying", the copying details such as the number of copies and the single-sided/double-sided copying remains unclear (missing required parameters). For that reason, in the AI assistant server device 4, the execution determining unit 164 (an example of a determining unit) of the management program determines that the required parameters are missing (Step S218). As a result, the AI assistant server device 4 inquires the smart, speaker 200 about the missing parameters (Steps S219 and S220). Meanwhile, although the abovementioned required parameters are assumed to be the parameters required in the operations of the MFP 1 representing an example of the first external device; that is not the only possible case. Alternatively, the parameters required in the operations of the electronic blackboard 6, which represents an example of the second external device, can also be included in the required parameters.

More particularly, in the AI assistant server device 4, the execution determining unit 164 generates response information (response) such as "input the setting values". Then, in the AI assistant server device 4, the notifying unit 165 of the management program sends the response information to the smart speaker 200 via the voice conversion program of the voice recognition server device 3 (Step S220). In the smart speaker 200, the feedback unit 153 performs a voice output of "input the setting values" via the smart speaker 200, and displays a text "Input the setting values" in the touch panel 27 (Step S221: insufficient input feedback). However, either the voice output or the text display on the touch panel can be skipped.

Meanwhile, at the time of sending the response information to the operating-voice conversion program, the notifying unit 165 of the management program in the AI assistant server device 4 can also send state information indicating that the session is going on. The state information indicates the status of the session. For example, when a job execution command for an external device such as the MFP 1 is not yet sent and if the job setting operation by the user is going on, then the state information is sent indicating that the session is going on. Moreover, when the job execution command is completely sent to the external device, the state information is sent indicating that the session has ended.

However, the state information is not limited to that example, and can indicate the status of the session in a more detailed manner. In the voice recognition server device 3, according to the state information, the interpreting unit 157 of the operating-voice conversion program determines whether to continue the session or to end the session. That is, when the session is going on, even if the user specifies the job setting conditions by speaking out for a plurality of times, the interpreting unit 157 of the operating-voice conversion program can determine that the job setting conditions belong to a single job. Once the session is over, the interpreting unit 157 of the operating-voice conversion program can determine that job setting conditions included in the subsequent utterances of the user belong to a new job. As a result, even when the instructions regarding the job type and the job setting conditions are given using utterances made for a plurality of number of times, the operating-voice conversion program of the voice recognition server device 3 can determine whether the instructions are meant for the same job or for a different new job.

Meanwhile, when the situation of not receiving signals from the smart speaker 200 goes on for a predetermined period of time or beyond, the operating-voice conversion program of the voice recognition server device 3 can determine that the session has ended. Even in the case in which the voice recognition server device 3 is managing the session, the communication target (the MFP 1) can execute a job regardless of the session. In that case, upon obtaining a job execution command, the MFP 1 representing the communication target overwrites the currently-held job conditions with the job conditions specified in the obtained job execution command. At that time, all job conditions held in the communication target can be either deleted or reset to default conditions, and then the job conditions specified in the job execution command can be set.

Moreover, regarding the job conditions that contradict the job conditions held in the communication target, the job conditions specified in the job execution command can be overwritingly set with priority; and, regarding the non-contradicting job conditions, the job conditions already held in the communication target can be maintained. When a job has been executed, the communication target can delete the job conditions specified in the job execution command, and set the default state registered therein in advance.

Subsequently, since an insufficient input feedback is received, the user utters, for example, "double-sided" as the copying form (Step S222). The communication control unit 152 of the smart speaker 200 sends the voice data of "double-sided" to the voice recognition server device 3, and issues a text conversion request (Step S223). In the voice recognition server device 3, the text conversion unit 156 of the operating-voice conversion program converts the voice data of "double-sided" into text data (Step S224).

Then, the interpreting unit 157 of the voice recognition server device 3 interprets the uttered phrase of the user as specified in the text data (Step S225 to Step S227), and sends the intent and the parameters representing the interpretation result to the AI assistant server device 4, along with sending the device ID of the smart speaker 200 (Step S228).

In this example, the interpreting unit 157 generates the parameter "print side=both sides" as the interpretation result. With that, in conjunction with the intent and the parameters included in the previous utterance, the interpreting unit 157 sends the interpretation result in which "COPY_ EXECUTE" represents the intent and "print side=both sides" represents the parameter to the AI assistant server device 4.

In this example, since the user has only uttered "copying" and "double-sided", the number of copies to be taken remains unclear (reoccurrence of missing required parameters). Meanwhile, the explanation above is given about the case in which the operating-voice conversion program of the voice recognition server device 3 generates the intent and the parameters by integrating the interpretation result of the previous utterance and the interpretation result of the current utterance. However, that is not the only possible case. That is, alternatively, the management program of the AI assistant server device 4 can be configured to store the interpretation result of the previous utterance, and to generate the intent and the parameters by integrating the interpretation result of the previous utterance and the interpretation result of the current utterance. In that case, the interpreting unit 157 of the voice recognition server device 3 can send only the parameter "print side-both sides", which is newly obtained from the current utterance, to the management program of the AI assistant server device 4.

Meanwhile, which of the parameters are the required parameters can be stored in advance in the memory unit such as the HDD 24 of the AI assistant server device 4. In that case, based on the information about the required parameters as stored in the memory unit, the execution determining unit 164 of the AI assistant server device 4 can determine whether or not all required parameters have been set using the parameters obtained from the smart speaker 200; and, if the required parameters are not yet set, can prompt the user via the smart speaker 200 to set the required parameters.

Hence, in the AI assistant server device 4, the execution determining unit 164 of the management program generates response information (response) such as "how many copies to print?" (Step S229). Then, the notifying unit 165 of the AI assistant server device 4 sends the response information to the smart speaker 200 via the operating-voice conversion program of the voice recognition server device 3 (Steps S230 and S231). In the smart speaker 200, the feedback unit 153 performs a voice output of "how many copies to print?" via the speaker unit 28, and displays a text of "How many copies to print?" in the touch panel 27 (Step S232: insufficient input feedback).

Operation for Setting Number of Copies

Figure 34:
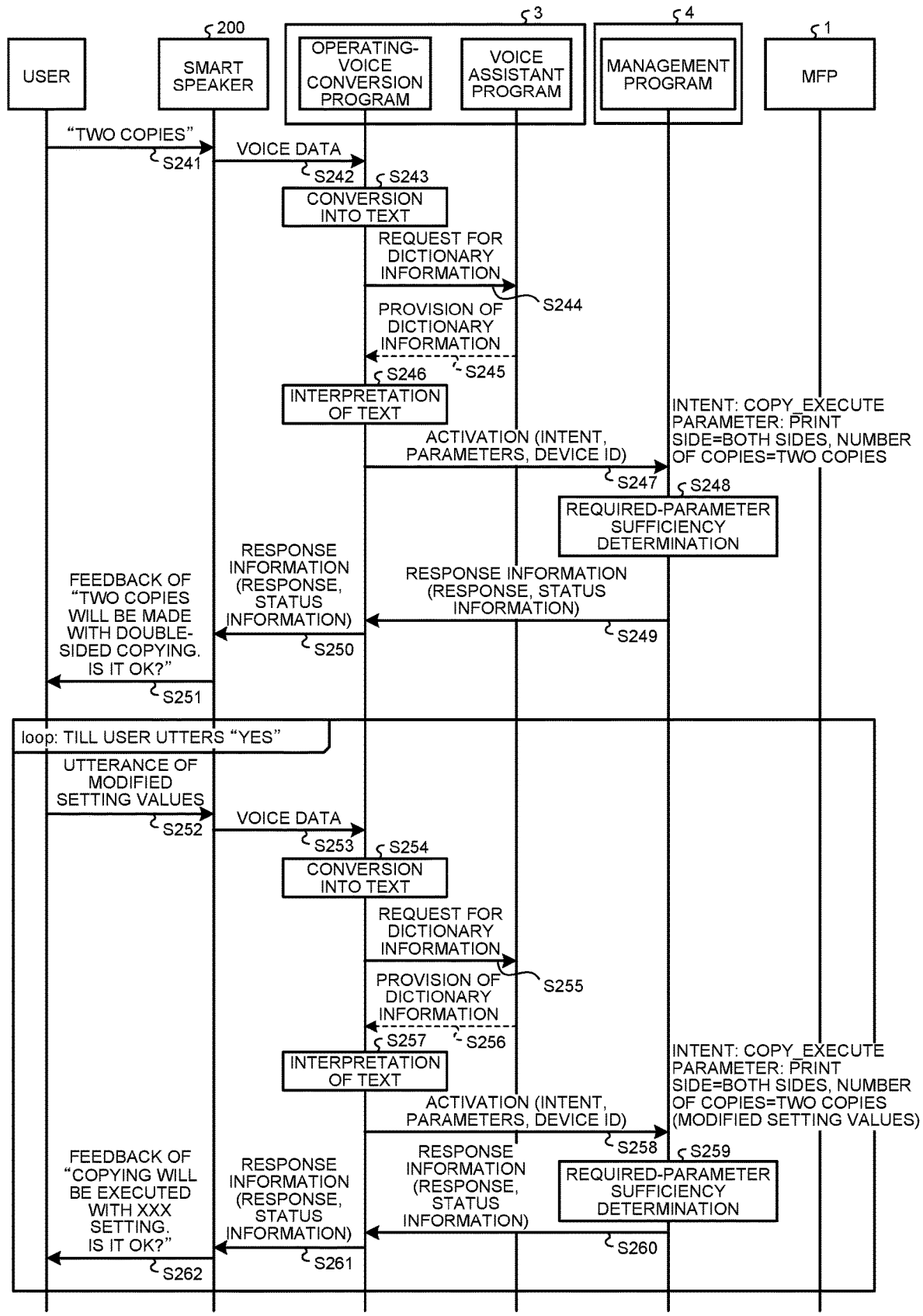
FIG. 34 is a sequence diagram for explaining an exemplary flow of operations performed to set the number of copies.

FIG. 34 is a sequence diagram for explaining the flow of operations performed to set the number of copies. At Step S232 illustrated in the sequence diagram in FIG. 33, since again an insufficient input feedback of "how many copies to print?" is given via the smart speaker 200, the user utters, for example, "two copies" (Step S241). The communication control unit 152 of the smart speaker 200 sends the voice data of "two copies" to the voice recognition server device 3, and issues a text conversion request (Step S242). In the voice recognition server device 3, the text conversion unit 156 of the operating-voice conversion program converts the voice data of "two copies" into text data (Step S243).

The interpreting unit 72 of the operating-voice conversion program interprets the uttered phrase of the user, as specified in the text data, based on the dictionary information (Step S244 to Step S246). In this example, the interpreting unit 72 generates a parameter "number of copes-two copies" as the interpretation result. Then, in conjunction with the intent and the parameters included in the previous utterance, the interpreting unit 72 sends the interpretation result in which "COPY_EXECUTE" represents the intent and "print side-both sides, number of copies-two copies" represent the parameters to the AI assistant server device 4 (Step S247).

In the AI assistant server device 4, the execution determining unit 164 receives the parameters "print side=both sides, number of copies=two copies" and, in the required-parameter sufficiency determination at Step S248, determines that the required parameter insufficiency for the copying job has been resolved. Hence, the execution determining unit 164 generates response information such as "Two copies will be made with double-sided copying. Is it OK?". Then, the response information is sent to the smart speaker 200 via the notifying snit 165 and the voice recognition server device 3 (Steps S249 and S250).

In the smart speaker 200, based on the response included in the response information, the feedback unit 153 gives an input confirmation feedback, as a voice and as a text, of "Two copies will be made with double-sided copying. Is it OK?" indicating the resolution of the required parameter insufficiency and the readiness to start copying (Step S251).

Herein, instead of outputting the text data and the voice data included in the response information, it is possible to output (as a voice or a text) the text data generated based on the text data that is stored in the memory unit of the smart speaker 200 based on the information included in the response information. In response to that input confirmation feedback, the user instructs modification of the setting values or instructs the start of copying.

Operation for Modifying Setting Values

In the case of instructing modification of the setting values, the user performs a voice input of the modified setting values to the smart speaker 200 (Step S252). For example, in the case of modifying the number of print copies from two copies to three copies, the user performs a voice input of "three copies". Moreover, in the case of modifying the print side from double-sided to single-sided, the user performs a voice input of "single-sided". Based on such voice input, the required-parameter insufficiency determination is performed in the AI assistant server device 4; and, based on the response information, an input confirmation feedback such as "Copying will be executed (with modified settings). Is it OK?" is given from the smart speaker 200 (Step S253 to Step S262).

Such operations (Step S252 to Step S262) for modifying the setting values are repeatedly performed until the user performs a voice input (or a text input, or a button input) for allowing the setting values given in the input confirmation feedback. That is, the operations for modifying the setting values are repeatedly performed until the user performs a voice input of "yes" for allowing the setting values given in the input confirmation feedback.

Operation for Instructing MFP to Execute Job

Figure 35:
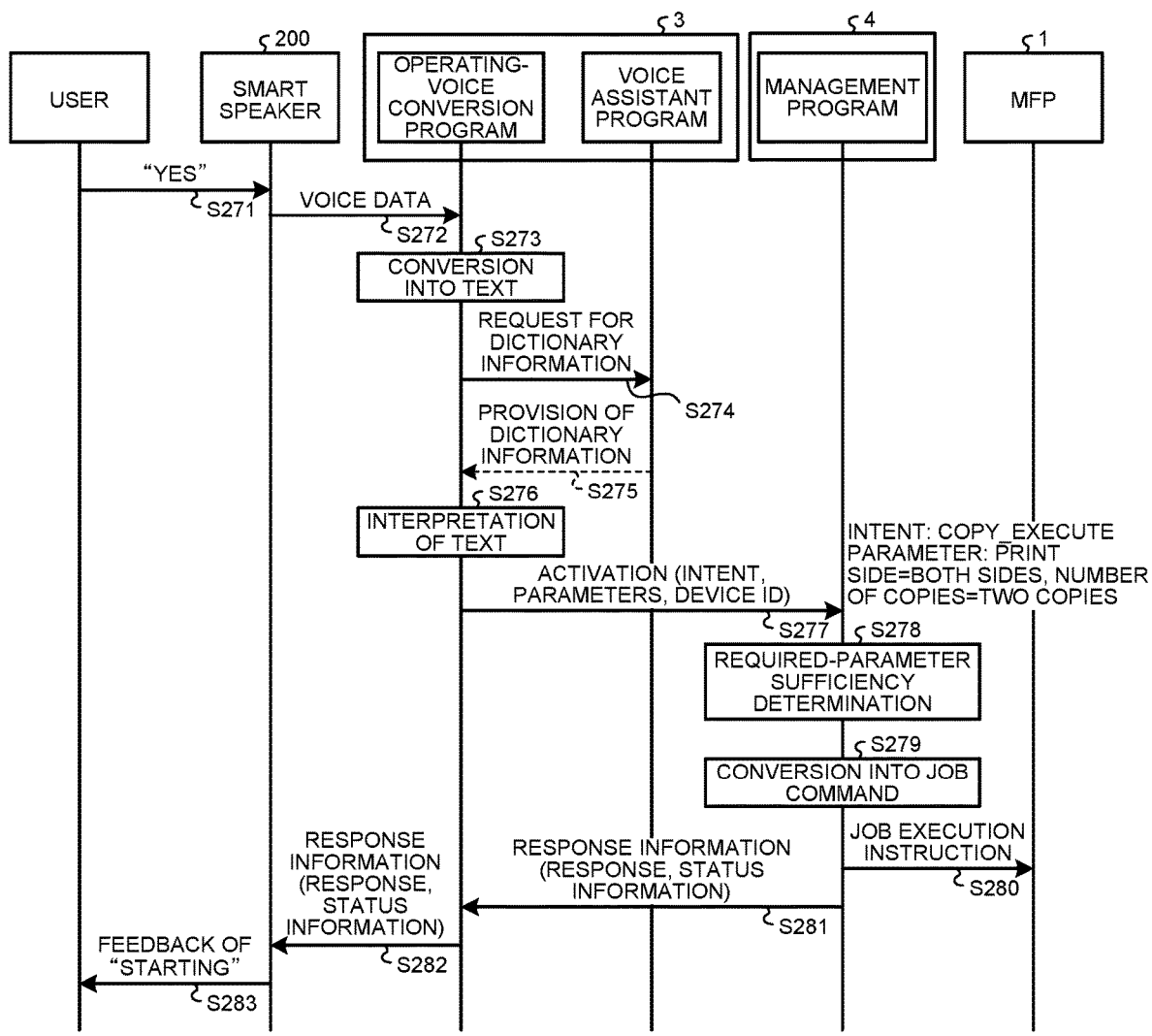
FIG. 35 is a sequence diagram for explaining an exemplary flow of operations for instructing the MFP to execute a job.

FIG. 35 is a sequence diagram for explaining the flow of operations for instructing the MFP 1 to execute a job. In response to the input confirmation feedback, when the user responds with "yes" (Step S271), the response is converted into a text by the operating-voice conversion program of the voice recognition server device 3 (Steps S272 and S273). In the voice recognition server device 3, when a copying start instruction is recognized based on the text data, the interpreting unit 157 of the operating-voice conversion program generates an interpretation result by adding the parameters "print side-both sides" and "number of copies-two copies" to the intent of "COPY_EXECUTE"; and sends the interpretation result to the management program (Step S274 to Step S277).

In the AI assistant server device 4, when the execution determining unit 164 of the management program determines that the required parameters are satisfied in the interpretation result (Step S278), the interpretation result conversion unit 161 converts the interpretation result into a job command for the MFP 1 (Step S279). Then, the execution instructing unit 162 sends the execution instruction information, which is obtained by conversion, to the MFP 1 (Step S280). As a result, the function of the MFP 1 such as copying or scanning, the number of copies such as one copy or two copies, and the print side such as single-sided or double-sided can be set using the voice input, and the operations of the MFP 1 can be controlled.

After instructing the MFP 1 to execute a job, the execution instructing unit 162 of the AI assistant server device 4 generates response information that contains information indicating that the MFP 1 has been instructed to execute the job and contains the current job execution state (the current state of the MFP 1). The notifying unit 165 of the AI assistant server device 4 sends the response information to the smart speaker 200 via the voice recognition server device 3 (Steps S281 and S282) in the smart speaker 200, when the information indicating that the MFP 1 has been instructed to execute the job is detected from the response information, the feedback unit 153 performs, for example, a voice feedback and a text feedback such as "Starting (the specified job)" (Step S283). As a result, the user becomes able to recognize that the execution of the instructed job has started in the MFP 1.

Meanwhile, in the AI assistant server device 4, when the execution determining unit 164 of the management program determines that the required parameters are satisfied in the interpretation result (Step S278), the feedback operation with respect to the smart speaker 200 may be omitted.

Example of Information Fed Back from AI Assistant Server Device

In the explanation given above, the feedback unit 153 of the smart speaker 200 outputs the text data and the voice data included in the response information. However, alternatively, based on the text data stored in the memory unit of the smart speaker 200, the feedback unit 153 can generate text data corresponding to the response information, and output a feedback (as a voice and as a text).

More particularly, as explained earlier with reference to Table 2, for example, the intent "COPY_PARAMETER_SETTING" for prompting the input of the setting values of the job or the intent "COPY_CONFIRM" for prompting the confirmation of the setting values of the job is included in the response information, and the response information is fed back from the AI assistant server device 4 to the smart speaker 200.

According to the intent, the parameters, and the response included in the response information, the feedback unit 153 determines the feedback to be given to the user. In order to decide on the contents of the feedback, the information equivalent to Table 2 can be stored in the memory unit of the smart speaker 200, and the feedback unit 153 can be configured to refer to that information.

Meanwhile, Table 2 is given for the example of copying. However, regarding printing, scanning, and faxing too; actions such as "PARAMETER_SETTING" for prompting input of the setting values of the job and "CONFIRM" for prompting confirmation of the setting values of the job can be used in an identical manner to Table 2. In the response information, at least either the intent and the parameters can be included, or the response can be included.

Meanwhile, the setting value of the print side such as double-sided or single-sided or the parameter such as the number of copies is included in the response information and is fed back to the terminal 2. Moreover, when the required parameters are missing, a message prompting the input of the missing parameters is included as a signal in the response and is fed back to the smart speaker 200.

Operations in Case of Occurrence of Error in MFP

Given below is the explanation about the operations performed when a job is executed in the MFP 1 or when an error occurs. If the MFP 1 executes a job and completes it without it any hitch, a completion message (as a voice and as a text) such as "The job is completed. Do not forget to collect the documents." is output via the smart speaker 200.

On the other hand, for example, in case an error such as insufficiency of paper sheets occurs, the AI assistant server device 4 gives a confirmation feedback such as "there is no paper. Refill the paper and continue, or cancel the job" to the smart speaker 200. In response to the confirmation feedback, when the user refills paper sheets in the MFP 1 and utters "continue" as a response; the execution instructing unit 162 of the voice recognition server device 3 instructs the MFP 1 to continue the job, and thus the job is resumed in the MFP 1.

However, in response to the confirmation feedback, if the user utters "cancel" and instructs cancellation of the job; the execution instructing unit 162 of the voice recognition server device 3 instructs the MFP 1 to cancel the job, and thus the job in the MFP 1 is cancelled following the occurrence of the error. Then, a confirmation feedback such as "The job was cancelled" is output in the form of a voice and a text via the smart speaker 200.

Figure 36:
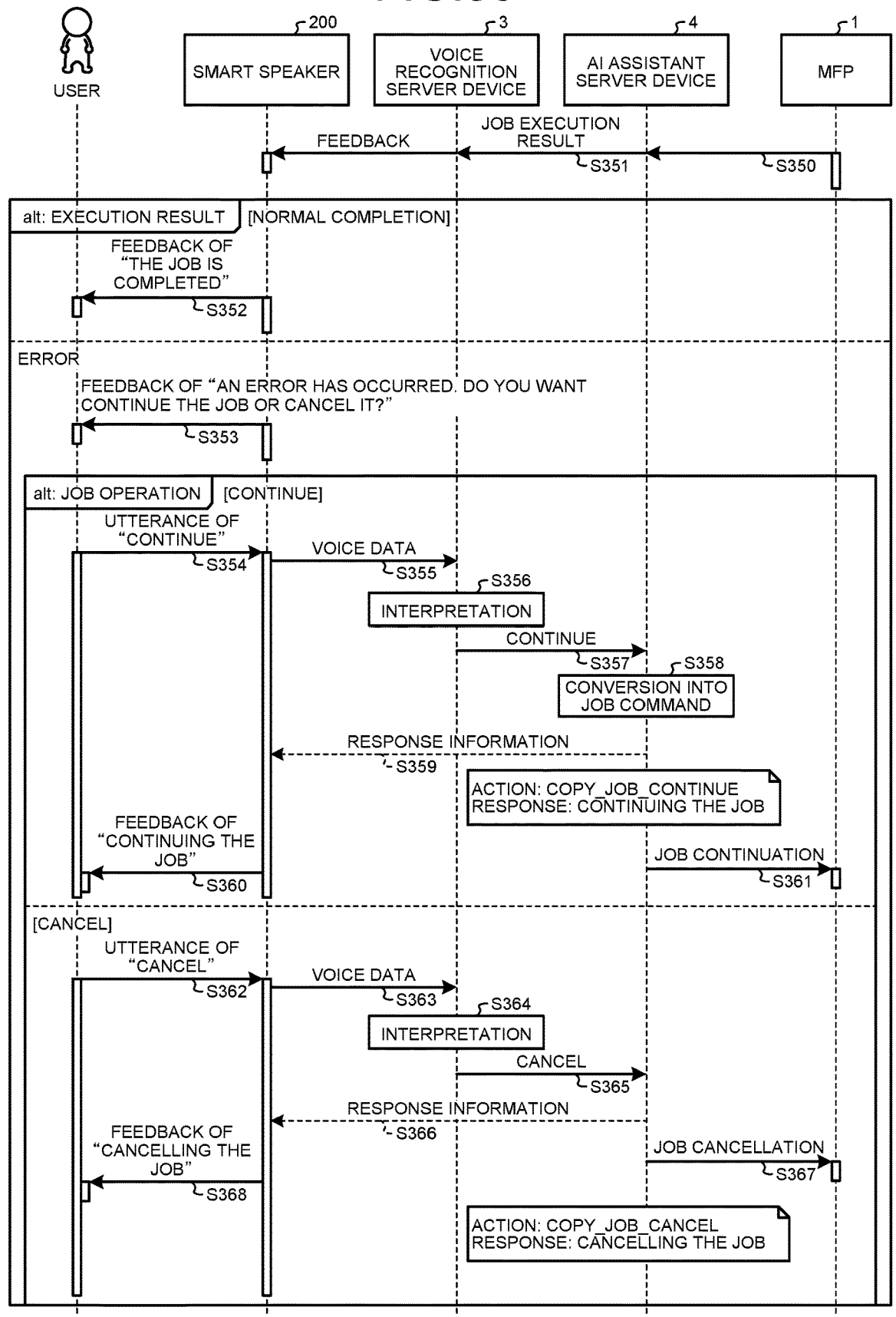
FIG. 36 is a sequence diagram for explaining an exemplary flow of interactive operations performed at the time of execution of a job and at the time of occurrence of an error.

FIG. 36 is a sequence diagram for explaining the flow of interactive operations performed at the time of execution of a ob and at the time of occurrence of an error. When the job execution result notified by the MFP 1 (Step S350) is obtained via the AI assistant server device 4 (Step S351), the smart speaker 200 either gives a feedback to the user indicating that the job was completed normally (Step S352) or gives a feedback to the user indicating that an error occurred (Step S353).

When the execution result indicating normal completion of the job is received, the feedback unit 153 of the smart speaker 200 outputs a voice message such as "the job is completed" (Step S352). On the other hand, when the execution result indicating the occurrence of an error is received, the feedback unit 153 of the smart speaker 200 outputs a voice message such as "an error has occurred. Do you want to continue the job or cancel it?" for inquiring whether or not to continue the job (Step S353).

More particularly, when the job is completed, the MFP 1 sends a completion notification to the management program of the AI assistant server device 4. When an error occurs, the MFP 1 sends error information such as the error details related to the error. According to the information obtained from the MFP 1, the management program of the AI assistant server device 4 generates response information that contains a response "the job is completed" or a response "an error has occurred. Do you want to continue the job or cancel it?"; and sends the response information to the smart speaker 200 via the voice recognition server device 3.

In FIG. 36, Step S354 to Step S361 illustrate the flow of operations of the constituent elements when the user specifies continuation. That is, in response to the inquiry of "an error has occurred. Do you want to continue the job or cancel it?"; when the user eliminates the cause for error and then responds with "continue" (Step S354), the operating-voice conversion program of the smart speaker 200 converts the voice of "continue" into a text and interprets it (Steps S355 and S356).

Then, the operating-voice conversion program of the smart speaker 200 generates an interpretation result in which "COPY_JOB_CONTINUE" represents the intent, and sends the interpretation result to the management program of the AI assistant server device 4 (Step S357). In the AI assistant server device 4, the notifying unit 165 of the management program generates response information indicating "continuing the job" (Step S358), and sends it to the smart speaker 200 via the voice recognition server device 3 (Step S359). Moreover, in the AI assistant server device 4, the execution instructing unit 162 of the management program instructs the MFP 1 to continue the job (Step S361). Furthermore, the feedback unit 153 of the smart speaker 200 gives an input confirmation feedback of "continuing the job" (Step S360).

In FIG. 36, Step S362 to Step S368 illustrate the flow of operations of the constituent elements when the user specifies cancellation or the job. That is, in response to the inquiry "an error has occurred. Do you want to continue the job or cancel it?"; if the user utters "cancel" as the response (Step S362), the voice data of "cancel" is sent to the voice recognition server device 3 (Step S363). In the voice recognition server device 3, the interpreting unit 157 of the operating-voice conversion program converts the voice data into text data, and interprets it (Step S364).

The interpreting unit 157 generates an interpretation result in which "COPY_JOB_CANCEL" represents the intent, and sends the interpretation result to the AI assistant server device (Step S365). In the AI assistant server device 4, the execution determining unit 164 of the management program generates response information of "cancelling the job". Then, the notifying unit 165 sends the response information to the smart speaker 200 (Step S366). In the smart speaker 200, the feedback unit 153 gives an input confirmation feedback of "cancelling the job" (Step S368). Moreover, in the AI assistant server device 4, the execution instructing unit 54 of the management program instructs the MFP 1 to cancel the job (Step S367).

Operations for Parameter Adjustment According to Processing Capability of MFP

Figure 37:
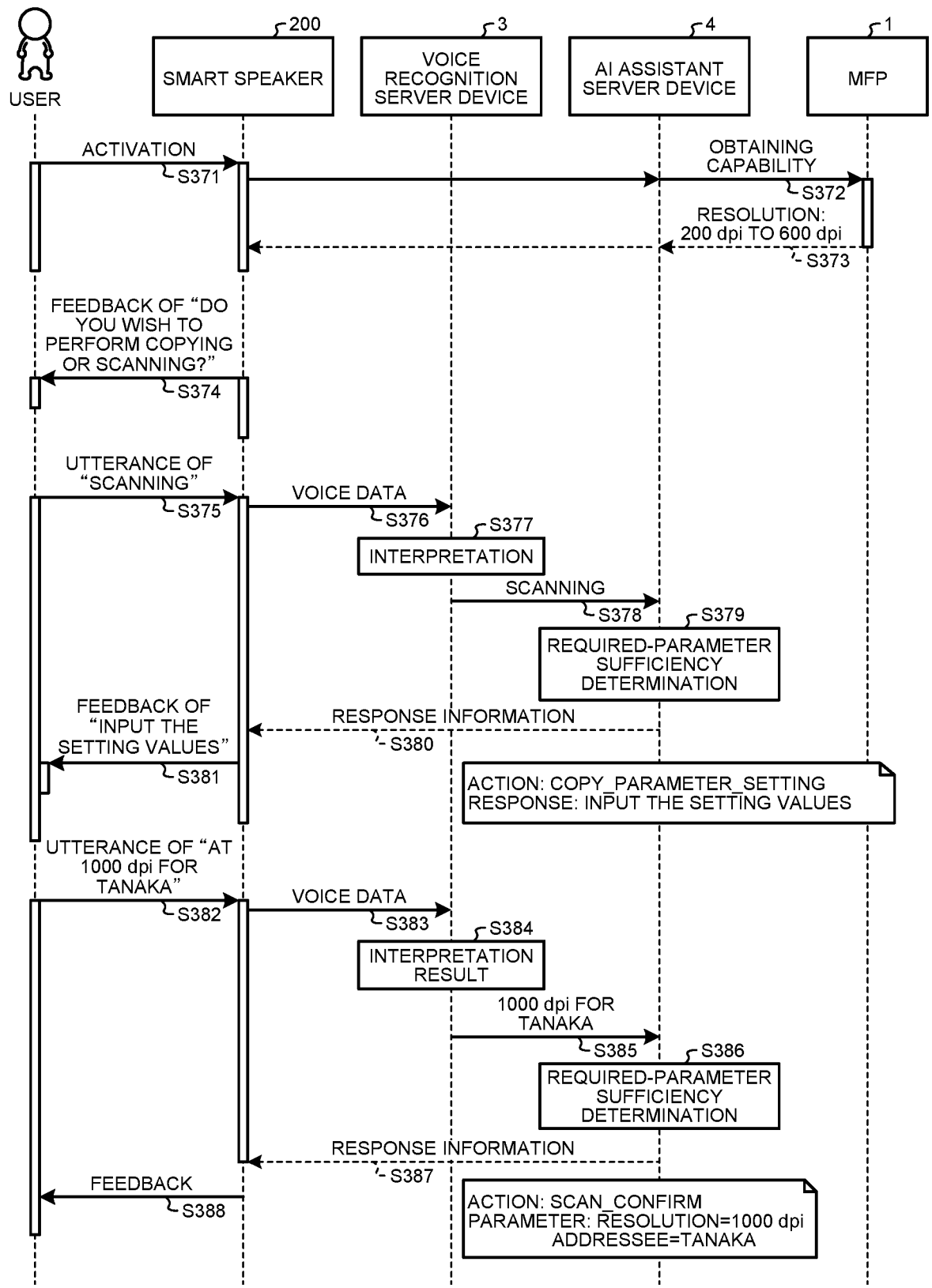
FIG. 37 is a sequence diagram for explaining an exemplary flow of operations performed till the determination of whether or not the MFP has the processing capability required for the user-specified job.
Figure 38:
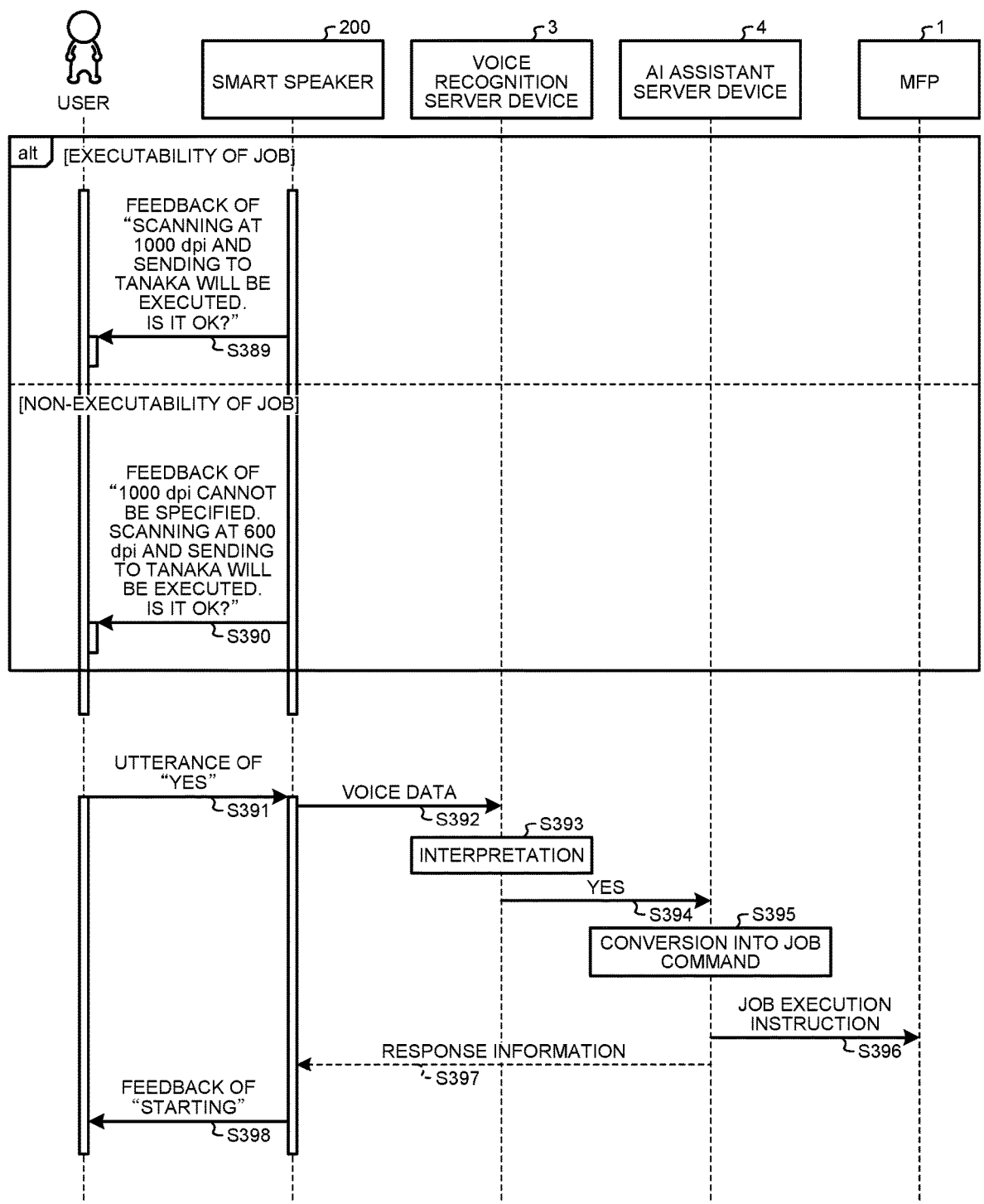
FIG. 38 is a sequence diagram for explaining an exemplary flow of operations performed when the processing capability of the MFP makes it possible to execute the job and when the processing capability of the MFP makes it difficult to execute the job.

Explained below with reference to sequence diagrams illustrated in FIGS. 37 and 38 is an example in which the execution of a job according to the processing capability of the MFP 1 is implemented using interactive operations. FIG. 37 is a sequence diagram for explaining the operations performed till the determination of whether or not the MFP 1 has the processing capability required for the user-specified job. FIG. 38 is a sequence diagram for explaining the flow of operations performed when the processing capability of the MFP 1 makes it possible to execute the job and when the processing capability of the MFP 1 makes it difficult to execute the job.

Firstly, with reference to the sequence diagram illustrated in FIG. 37, when the user instructs "activation" (Step S371), the device information obtaining unit 163 of the management program of the AI assistant server device 4 makes an inquiry to the MFP 1 about the processable resolution as an example of the information processing capability (obtaining the capability: Step S372). In response to the inquiry, the MFP 1 sends the processable resolution, such as "200 dpi to 600 dpi" to the AI assistant server device 4 (Step S373). Then, the AI assistant server device 4 sends the information about the processable resolution of the MFP 1 to the smart speaker 200. As a result, the processable resolution of the MFP 1 is recognized in the smart speaker 200. Herein, although the explanation is given about the case in which the device information obtaining unit 163 makes an inquiry and obtains the information about the information processing capability of the MFP 1; that is not the only possible case. Alternatively, the information about the information processing capability of the electronic blackboard 6, which represents an example of the second external device, can be obtained.

Meanwhile, the device information obtaining unit 163 of the AI assistant server device 4 can obtain the information about the processing capability from the MFP 1 at a predetermined timing after the establishment of a communication line with the MFP 1. Alternatively, at the time of registering the smart speaker 200 and the MFP 1 in a corresponding manner in the management table in the linking DB 202, the information about the processing capability of the MFP 1 can be obtained and registered. Still alternatively, the device information obtaining unit 163 of the AI assistant server device 4 can obtain the information about the processing capability from the MFP 1 on a periodic basis. Still alternatively, the device information obtaining unit 163 of the AI assistant server device 1 can obtain the information about the processing capability from the MFP 1 at the timing at which the voice recognition server device 3 receives an instruction from the smart speaker 200 for activating the voice assistant program or at the time at which the voice recognition server device 3 receives a job execution instruction from the smart speaker 200.

The obtained information about the processing capability can be stored in a memory unit such as the HDD 44 of the AI assistant server device 4, or can be stored in a corresponding manner to the MFP 1 in the management table in the linking DB 202. Meanwhile, alternatively, some other computer program can obtain the information about the processing capability, and the device information obtaining unit 163 can obtain the information obtained by the other computer program, and thus can obtain the information about the MFP 1 in an indirect manner. Meanwhile, the information obtained by the device information obtaining unit 163 from the MFP 1 is not limited to the information about the processing capability, and the device information obtaining unit 163 can also obtain the information about the types and the setting conditions of the jobs executable in the MFP 1, such as the types and the versions of the applications installed in the MFP, the print speed, the processable file formats, and the connection status of optional devices including a finisher.

Subsequently, after performing the operation to activate the operating-voice processing program of the smart speaker 200; when the user performs, for example, a voice input of "activation", the communication control unit 152 of the smart speaker 200 sends the voice data of "activation" to the voice recognition server device 3. As a result, the voice data of "activation" is converted into a text and is interpreted, and the interpretation result is notified to the AI assistant server device 4. In the AI assistant server device 4, the execution determining unit 164 determines whether or not the required parameters are fully available.

At that point of time, since neither the job type is specified nor the required parameters are fully available, the AI assistant server device 4 sends response information such as "do you wish to perform copying or scanning?" so as to prompt the input of the job type. In the smart speaker 200, the feedback unit 153 gives a voice feedback such as, for example, "do you wish to perform copying or scanning?" for prompting issuance of a job command (Step S374).

In response, if the user utters "scanning" (Step S375), then the operating-voice conversion program of the voice recognition server device 3 converts the utterance into a text and interprets it (Steps S376 and S377). Moreover, the interpreting unit 157 of the voice recognition server device 3 generates an interpretation result in which "SCAN_EXECUTE" represents the intent, and sends the interpretation result to the management program of the AI assistant server device 4 (Step S378).

In the AI assistant server device 4, the execution determining unit 164 performs required-parameter sufficiency determination based on the received interpretation result (Step S379). However, just by issuing a scanning instruction, the required parameters remain missing. Hence, the execution determining unit 164 generates response information indicating "input the setting values" and sends it to the smart speaker 200 (Step S380). In the smart speaker 200, based on the response information, the feedback unit 153 gives an insufficient input feedback of "input the setting values" (Step S381).

In response to the insufficient input feedback, if the user utters "at 1000 dpi for Tanaka" (Step S382), the voice recognition server device 3 converts the voice data into a text and interprets it (Steps S383 and S384). The interpreting unit 157 generates an interpretation result in which "SCAN_EXECUTE" represents the intent and "resolution=1000 dpi, addressee=Tanaka" represent the parameters, and sends the interpretation result to the management program of the AI assistant server device 4 (Step S385).

In the AI assistant server device 4, the execution determining unit 164 of the management program refers to the parameters specified in the interpretation result and refers to the information about the processing capability of the MFP 1 as already obtained by the device information obtaining unit 163, and determines whether or not the job is executable in the communication target with the specified settings (Step S386). Then, the execution determining unit 164 generates response information corresponding to the determination result, and the notifying unit 165 notifies the smart speaker 200 about the response information (Step S387). As a result, a feedback corresponding to the interpretation result is given via the smart speaker 200 (Step S388). Meanwhile, although the execution determining unit 164 determines, based on the parameters, whether or not the user-specified job is executable in the MFP 1, that is not the only possible case. Alternatively, the execution determining unit 164 can determine whether or not the user-specified job is executable in the electronic blackboard 6 representing an example of the second external device.

Specifically, with reference to the sequence diagram illustrated in FIG. 38, if the MFP 1 has the resolution of 1000 dpi as the processing capability, the execution determining unit 164 generates response information of "Scanning at 1000 dpi and sending to Tanaka will be executed. Is it OK?". Then, the notifying unit 165 sends the response information to the smart speaker 200. In the smart speaker 200, the feedback unit 153 gives an input confirmation feedback of "Scanning at 1000 dpi and sending to Tanaka will be executed. Is it OK?" (Step S389).

In response to the input confirmation feedback, if the user utters "yes" (Step S391), then the interpreting unit 157 of the voice recognition server device 3 converts the voice data into a text and interprets it (Steps S392 and S393). Then, the interpreting unit 157 sends an interpretation result, in which "SCAN_EXECUTE" represents the intent and "resolution=1000, addressee=Tanaka" represent the parameters, to the management program of the AI assistant server device 4 (Step S394).

In the AI assistant server device 4, the interpretation result conversion unit 161 of the management program converts the interpretation result into a job command (Step S395). Then, the execution instructing unit 162 of the management program sends a job command of "send images scanned at 1000 dpi to Tanaka" to the MFP 1 (Step S396). As a result, the specified job gets executed in the MFP 1. The execution determining unit 164 of the AI assistant server device 1 generates response information of "starting" that indicates the start of execution of the specified job, and the notifying unit 165 sends the response information to the smart speaker 200 (Step S397). In the smart speaker 200, the feedback unit 153 gives an input confirmation feedback of "starting" to the user.

On the other hand, if 600 dpi is the limit of the processing capability of the MFP 1, then the user-specified image processing at 1000 dpi becomes difficult to perform in the MFP 1. In the AI assistant server device 4, based on the information indicating the processing capability of the MFP 1 as already obtained by the device information obtaining unit 163, the execution determining unit 164 determines that the user-specified image processing is difficult to perform in the MFP 1. In that case, the execution determining unit 164 generates response information of "1000 dpi cannot be specified. Scanning at 600 dpi and sending to Tanaka will be executed. Is it OK?". The notifying unit 165 sends the response information to the smart speaker 200. Then, the smart speaker 200 gives a confirmation feedback of "1000 dpi cannot be specified. Scanning at 600 dpi and sending to Tanaka will be executed. Is it OK?" to the user.

More particularly, in the AI assistant server device 4, the execution determining unit 164 of selects, within the range of the processing capability of the MFP 1, the function or the value that is closest to the function or the processing capability value specified by the user. For example, if the MFP 1 has the processable resolution in the range of 200 dpi to 600 dpi, then the execution determining unit 164 selects 600 dpi on account of being closest to 1000 dpi specified by the user. Then, the capability or the value selected by the execution determining unit 164 is output as a confirmation feedback by the feedback unit 153 of the smart sneaker 200.

That is, when it is determined that the job indicated by the intent and the parameters specified in the interpretation result of a user instruction is difficult to execute, the execution determining unit 164 selects the executable setting conditions in the MTP 1 based on the processing capability of the MFP 1. Then, the execution determining unit 164 generates response information based on the selected setting conditions.

Meanwhile, from the interpreting unit 157 of the operating-voice conversion program of the voice recognition server device 3, the management program of the AI assistant server device 4 obtains the interpretation result as well as obtains the device ID enabling identification of the smart speaker 200 representing the source of the voice input (i.e., obtains the voice-input source device ID). Thus, the execution determining unit 164 can refer to the linking DB 202, identify the MFP 1 associated to the voice-input source device ID, and can determine the job executability based on the processing capability of the identified MFP 1. Moreover, if the user specifies execution of a function not provided in the MFP 1, then the execution determining unit 164 can send, to the smart speaker 200, response information indicating that the job is not executable. Meanwhile, the execution determining unit 164 can send the information related to the selected setting conditions to the operating-voice conversion program of the voice recognition server device 3.

In response to such confirmation feedback, if the user utters "yes" (Step S391), the text conversion unit 156 of the voice recognition server device 3 converts the confirmation feedback into a text for interpretation (Steps S392 and S393). Based on the text data, the interpreting unit 157 of the voice recognition server device 3 generates an interpretation result in which "SCAN_EXECUTE" represents the intent and "resolution=600, addressee=Tanaka" represent the parameters, and sends the interpretation result to the AI assistant server device 4 (Step S394).

In the AI assistant server device 4, the interpretation result conversion unit 161 of the management program converts the interpretation result into a job execution instruction (Step S395). Then, in the AI assistant server device 4, the execution instructing unit 162 of the management program sends the job execution instruction to the MTP 1 (Step S396 to Step S398). As a result, even if the user instruction is difficult to execute on account of exceeding the processing capability of the MFP 1, the contents of the instruction are automatically modified into an instruction executable with the processing capability of the MFP 1, and the user-instructed job can be executed.

The MFP 1 refers to the address book stored in the memory unit such as the HDD 13 and searches for the address information corresponding to "Tanaka". The address information represents an email address or a FAX number. If the address information corresponding to "Tanaka" is present in the address book, then the MFP 1 sends the image data scanned therein to that address.

Meanwhile, the address information can be displayed in the operating unit 16 of the MFP 1; the user can be prompted to confirm whether there is no mistake in the address; and the scanned image data can be sent to the address when the user presses the OK button. Moreover, if a plurality of addresses corresponding to "Tanaka" is present in the address book, all of the concerned address information can be displayed in the operating unit 16 of the MTP 1 so as to make the user select the desired address.

Operations for Searching Print Target and Printing

Figure 39:
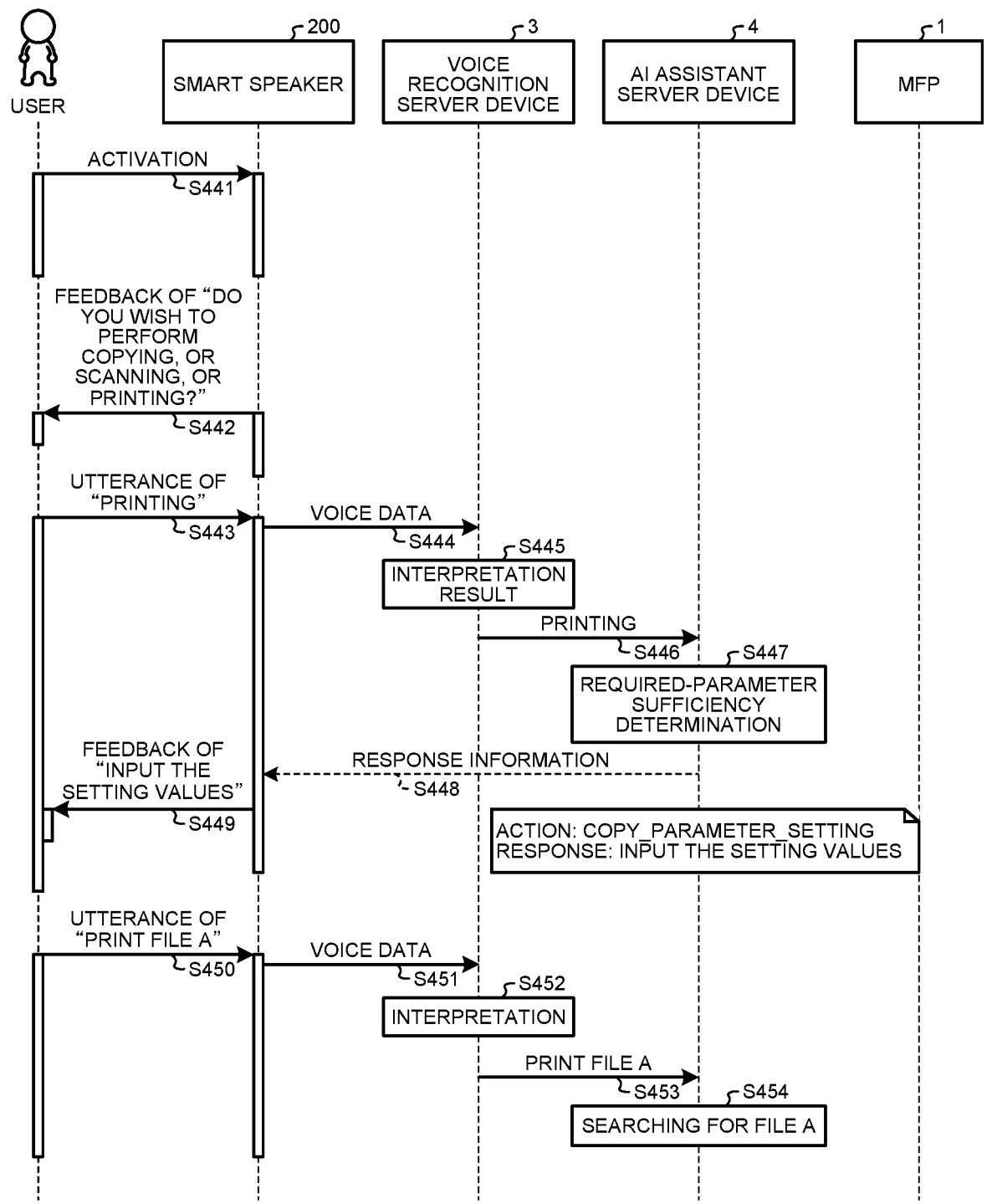
FIG. 39 is a sequence diagram for explaining an exemplary flow of operations performed till the retrieval of a user-specified file.
Figure 40:
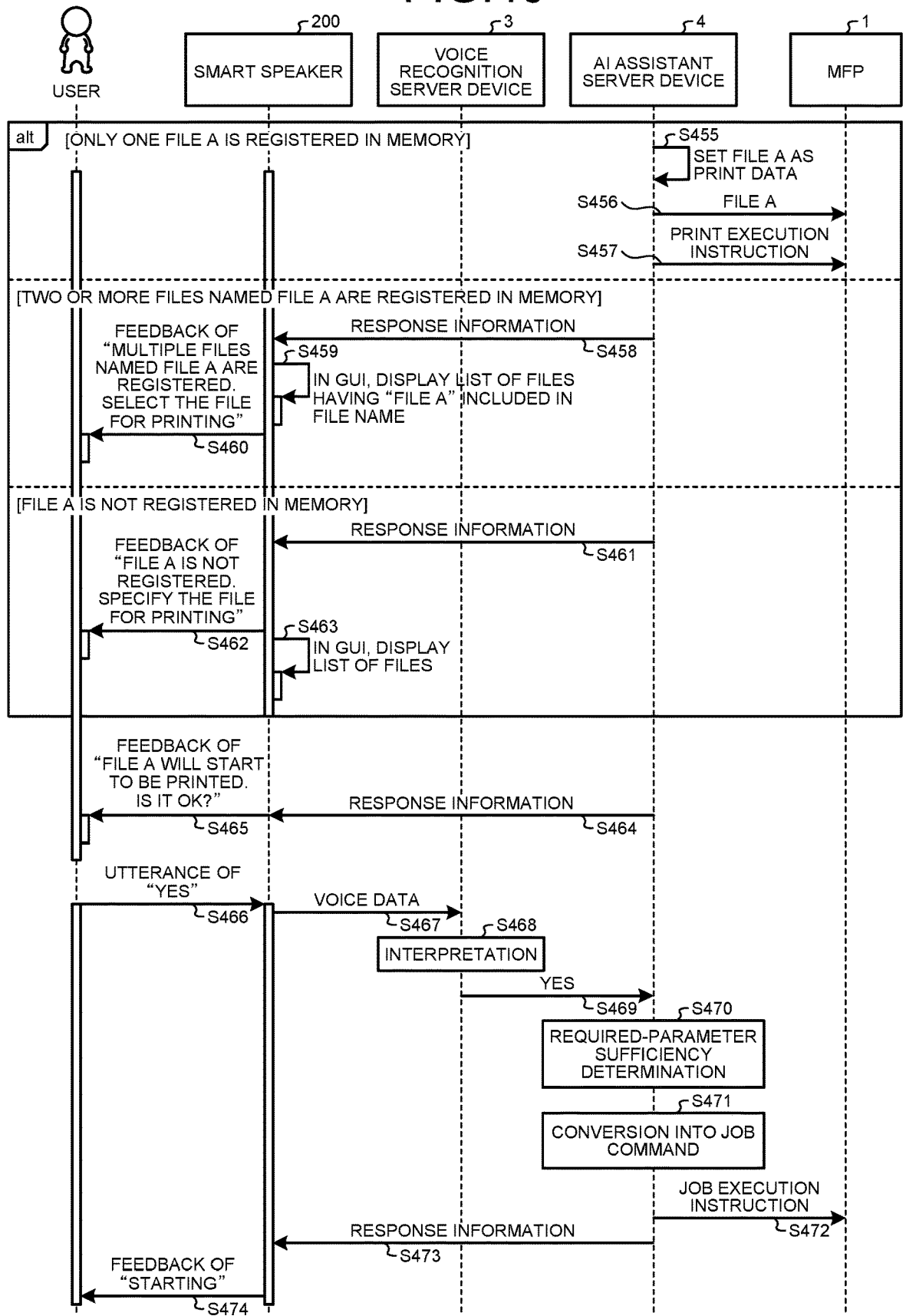
FIG. 40 is a sequence diagram for explaining an exemplary flow of operations performed till the printing of the user-specified file.

Explained below with reference to sequence diagrams illustrated in FIGS. 39 and 40 are the operations for printing a user-specified file. FIG. 39 is a sequence diagram for explaining the operations performed till the retrieval of a user-specified file. FIG. 40 is a sequence diagram for explaining the operations performed till the printing of the user-specified file.

Firstly, with reference to FIG. 39, after the operating-voice processing program of the smart speaker 200 is activated, the user instructs activation of the voice assistant program by, for example, performing a voice input. As a result, the communication control unit 152 sends voice data of "activation" to the voice recognition server device 3 (Step S441). The text conversion unit 156 of the voice recognition server device 3 converts the voice data of "activation" into text data, converts into the intent and the parameters, and sends them to the management program of the AI assistant server device 4.

In the AI assistant server device 4, the execution determining unit 164 of the management program determines whether or not the required parameters are fully available. At the point of time at which the voice "activation" is input, since the required parameter such as the job type is not available, the execution determining unit 164 forms response information for prompting a job command such as "do you wish to perform copying, or scanning, or printing?". The notifying unit 165 sends the response information to the smart speaker 200. As a result, the feedback unit 153 of the smart speaker 200 gives a voice feedback of "do you wish to perform copying, or scanning, or printing?" for prompting issuance of a job command (Step S442).

Subsequently, if the user utters "printing" (Step S443), then the text conversion unit 156 of the operating-voice conversion program of the voice recognition server device 3 converts the voice into a text, and the interpreting unit 157 interprets the text (Steps S444 and S445). In this case, the interpreting unit 157 generates an interpretation result in which "PRINT_EXECUTE" represents the intent, and sends the interpretation result to the management program of the AI assistant server device 4 (Step S446).

In the AI assistant server device 4, the execution determining unit of the management program performs required-parameter sufficiency determination based on the received interpretation result (Step S447). However, just by issuing a printing instruction, the required parameters remain missing. Hence, the execution determining unit 164 generates response information indicating "input the setting values" and sends it to the smart speaker 200 via the notifying unit 165 (Step S448). In the smart speaker 200, based on the response information, the feedback unit 153 gives an insufficient input feedback of "input the setting values" (Step S449).

In response in the insufficient input feedback, if the user utters "print file A" (Step S450), the voice data is sent to the voice recognition server device 3 (Step S451). The voice recognition server device 3 converts the voice data into a text and interprets it (Step S452); generates an interpretation result in which "Print_Execute" represents the intent and "print target-file A" represents the parameter; and sends the interpretation result to the AI assistant server device 4 (Step S453).

In the AI assistant server device 4, the searching unit 167 of the management program searches the management DB 201 for the file A based on the parameter specified in the interpretation result (Step S454).

Herein, the target destination for searching is not limited to the management DB 201, and can also be a database connected to a cloud service device such as the voice recognition server device 3 or the AI assistant server device 4 via a network. Moreover, instead of searching only for a file name that includes the character string specified in the parameter, the searching unit 167 can search for a file in which the character string specified in the parameter is included in the file data. Furthermore, the searching unit 167 can perform the search based on the file attributes such as the file creation date and the file creator.

When Only Single File A is Recorded

As a result of performing such a search, if only a single file A is recorded in the management DB 201; with reference to the sequence diagram illustrated in FIG. 40, the searching unit 167 of the AI assistant server device 4 sets that file A as print data (Step S455). Then, the execution instructing unit 162 of the AI assistant server device 4 sends the print data of the file A to the MFP 1 (Step S456), and instructs printing of the file A (Step S457). As a result, the print data of the file A gets printed in the MFP 1.

When Two Files A Are Present

In contrast, when two or more files A are retrieved from the management DB 201, that is, when a plurality of files is retrieved as a result of the search performed by the searching unit 167, the execution determining unit 164 of the AI assistant server device 4 generates response information of "multiple files A are registered. Select the file for printing.". Then, the notifying unit 165 sends the response information to the smart speaker 200 (Step S458). At that time, as the information enabling identification of each file, information such as the creation date, the creator, the thumbnail image of each file can be included in the response information.

Based on the response information, the feedback unit 153 of the smart speaker 200 displays a list of retrieved files in the touch panel 27 (Step S459). Moreover, the feedback unit 153 gives an insufficient input feedback of "multiple files named file A are registered. Select the file for printing." (Step S460).

Meanwhile, at the time of displaying a list of files, in order to make it easier to select the desired file from among the retrieved files, the creation dates and the creators of the files can be output as voice feedback or can be displayed in the touch panel 27. Moreover, thumbnail images can be displayed as the list of files, and the user can be prompted to select a file.

Furthermore, at the time of selection, the desired file A can be selected by uttering the file-related information such as the creation date and the creator of that file, or the desired file A can be selected from the list by performing a touch operation in the touch panel 27.

When File A is Not Recorded

When the user-specified file A is not recorded in the management DB 201 (i.e., when the searching unit 167 cannot retrieve the file A), the execution determining unit 164 of the AI assistant server device 4 generates response information of "the file A is not registered in the memory". Moreover, the execution determining unit 164 obtains list information of the files stored in the management DB 201 and includes it in the response information. The notifying unit 165 sends the response information to the smart speaker 200 (Step S461).

In the smart speaker 200, based on the response information, the feedback unit 153 performs a feedback of "file A is not registered. Specify the file for printing." (Step S462). Along with that, based on the file list information that is added to the response information, the feedback unit 153 displays a list of files stored in the management DB 201 (Step S463). Based on the list of files, the user can again select and specify the desired file for printing.

Operation for Printing Selected File

In the case in which only a single file A is present in the management DB 201, when the user instructs printing of the file A, the execution determining unit 164 generates response information of "The file A will start to be printed. Is it OK?" to be sent to the smart speaker 200 (Step S464). Then, in the smart speaker 200, the feedback unit 153 performs, for example, a confirmation feedback of "The file A will start to be printed. Is it OK?" (Step S465).

In response to the confirmation feedback, the user utters "yes" (Step S466), the response voice data is sent from the smart speaker 200 to the voice recognition server device 3 (Step S467). In the voice recognition server device 3, the text conversion unit 156 converts the voice data into a text, and the interpreting unit 157 interprets the text data obtained by conversion of the voice data (Step S468). Then, the interpreting unit 157 generates an interpretation result in which "PRINT_EXECUTE" represents the intent and "print target=file A, file identification information X" as the parameters, and sends the interpretation result to the management program of the AI assistant server device 4 (Step S469). Meanwhile, the file identification information X represents information that, when two are more files A are present in the management DB 201, enables identification of the file A selected by the user and contains, for example, the creation date and the creator of that file.

In the AI assistant server device 4, the execution determining unit 164 of the management program performs required-parameter sufficiency determination based on the received interpretation result (Step S470). In this case, since the required parameters are fully available, the interpretation result conversion unit 161 converts the interpretation result into a job command for the MFP 1 (Step S471). Then, the execution instructing unit 162 sends the user-selected file A to the MFP 1 and instructs printing of the file A (Step S472). As a result, the file A desired by the user gets printed in the MFP 1. When the MFP 1 is instructed to print the file A, the notifying unit of the AI assistant server device 4 sends, to the smart speaker 200, response information of "starting the printing operation" indicating that the printing has started (Step S473). In the smart speaker 200, the feedback unit 153 performs a feedback of "starting the printing operation", so that the user is notified about the start of printing (Step S474).

Meanwhile, in the explanation given above, the searching unit 167 of the AI assistant server device 4 searches for the print target and sends the retrieved file to the MFP 1. Alternatively, for example, a job command of "print target=file A" can be sent to the MFP 1, and the MFP 1 can retrieve the file A from the HDD 13 or the management DB 201 and print it. When two or more files are retrieved, a list of those files can be displayed in the display unit of the MFP 1 to enable the user to select a file.

Figure 41:
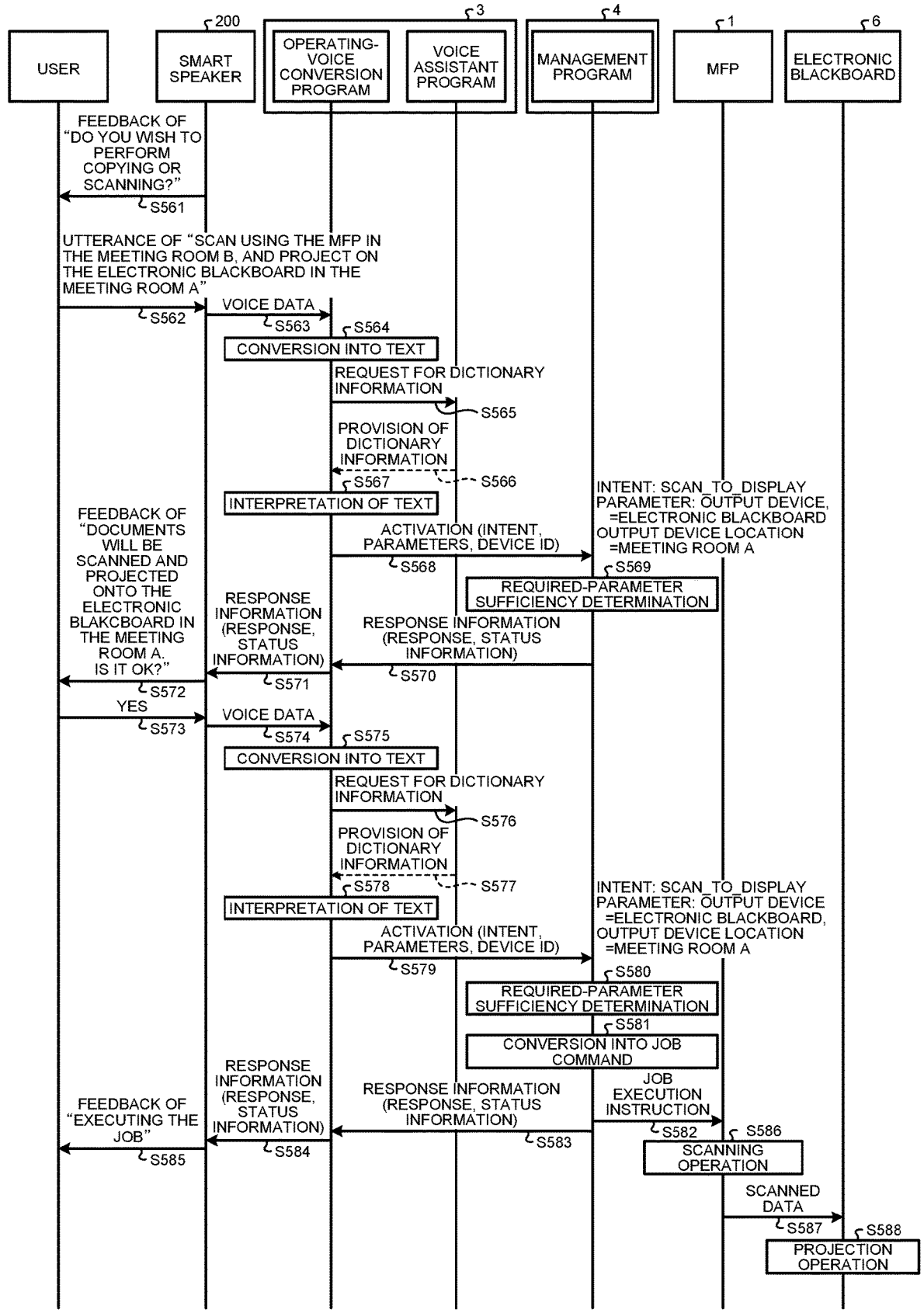
FIG. 41 is a sequence diagram for explaining an exemplary flow of operations performed to project scanned data onto the electronic blackboard in the voice operation system according to the second embodiment.

Flow of Interactive Operations for Execution of Job for Implementing Coordinated Operations Between MFP and Electronic Blackboard FIG. 41 is a sequence diagram for explaining an exemplary flow of operations performed to project scanned data onto an electronic blackboard in the voice operation system according to the second embodiment.

In an identical manner to FIG. 32, firstly, when the operating-voice processing program of the smart speaker 200 is activated, the user performs, for example, a voice input to instruct activation of the voice assistant program. In the smart speaker 200, the communication control unit 152 sends the voice data of "activation" to the voice recognition server device 3. Then, the operations are performed according to the flow illustrated in FIG. 32, and the feedback unit 153 of the smart speaker 200 gives a voice feedback of "do you wish to perform copying or scanning?" for prompting issuance of a job command (Step S561).

Subsequently, if the user utters "scan using the MFP in the meeting room B, and project the scanned data on the electronic blackboard in the meeting room A" (Step S562), then the communication control unit 152 of the smart speaker 200 sends voice data of "scan using the MFP in the meeting room B, and project the scanned data on the electronic blackboard in the meeting room A" to the voice recognition server device 3 (Step S563). In the voice recognition server device 3, the text conversion unit 156 of the operating-voice conversion program converts the voice data of "scan using the MFP in the meeting room B, and project the scanned data on the electronic blackboard in the meeting room A" into text data (Step S564).

As explained earlier with reference to FIGS. 12 and 13, the interpreting unit 157 of the voice recognition server device 3 interprets the uttered phrase of the user as specified in the text data (Step S565 to Step S567); and sends the interpretation result, which includes the intent and the parameters, and the device ID of the smart speaker 200 to the AI assistant server device 4. Herein, the interpreting unit 157 generates the intent indicating "SCAN_TO_DISPLAY" as the interpretation result, and sends it to the management program (Step S568).

In the AI assistant server device 4, the execution determining unit 164 receives the parameters "input device-MFP", "input device location-meeting room B", "output device=electronic blackboard", and "output device location-meeting room A". Then, in the required-parameter sufficiency determination at Step S569, the execution determining unit 164 determines that the required parameters for the job of scanning and sending the scanned data are fully available. Hence, the execution determining unit 164 generates response information of "Documents will be scanned and projected onto the electronic blackboard in the meeting room A. Is it OK?". Then, the response information is sent to the smart speaker 200 via the notifying unit 165 and the voice recognition server device 3 (Steps S570 and S571).

In the smart speaker 200, based on the response included in the response information, the feedback unit 153 gives an input confirmation feedback, as a voice and as a text, of "Documents will be scanned and projected onto the electronic blackboard in the meeting room A. Is it OK?" indicating sufficiency of the required parameters and indicating the readiness to start the operation of scanning and sending the scanned data (Step S572).

In response to the input confirmation feedback, when the user performs a voice input of "yes" (Step S573), the voice input is converted into a text by the operating-voice conversion program of the voice recognition server device 3 (Steps S574 and S575). In the voice recognition server device 3, when an instruction to perform the operation of scanning and sending the scanned data is recognized based on the text data, the interpreting unit 157 of the operating-voice conversion program generates an interpretation result in which the parameters "input device=MFP", "input device location-meeting room B", "output device=electronic blackboard", and "output device location=meeting room A" are added to the intent of "SCAN_TO_DISPLAY"; and sends the interpretation result to the management program (Step S576 to Step S579).

In the AI assistant server device 4, when the execution determining unit 164 of the management program determines that the interpretation result is satisfying the required parameters (Step S580), the interpretation result conversion unit 161 converts the interpretation result into a job command for the MTP 1 (Step S581). At that time, the identifying unit 168 identifies that the MFP 1 installed in the "meeting room B" represents the input device for performing scanning, and identifies that the electronic blackboard 6 installed in the "meeting room A" represents the destination for the scanned documents (scanned data). More particularly, the identifying unit 168 refers to the device management table given earlier in Table 3 and stored in the linking DB 202; identifies the input device for performing scanning according to the parameters "input device" and the "input device location" specified in the interpretation result; and identifies the second external device for sending the scanned data according to the parameters "output device" and the "output device location". In this example, the identifying unit 168 identifies the device that has "MFP" as the device type and that is installed in the meeting room B, that is, identifies the MTP 1 as the input device; and identifies the device that has "electronic blackboard" as the device type and that is installed in the meeting room A, that is, identifies the electronic blackboard 6 as the output device. As a result, the identifying unit 168 identifies the device type (MFP), the functions, and the address information of the input device; and identifies the device type (electronic blackboard), the functions, and the address information of the output device. In the AI assistant server 4, the interpretation result conversion unit 161 generates an interpretation result by adding the parameters "input device address information=zzz.zzz.z.z" and "output device address information=xxx.xxx.x.x" to the action "SCAN_TO_DISPLAY".

The device management table held in the linking DB 202 can be stored in a corresponding manner to each smart speaker 200. For example, in the linking DB 202, the device management table can be stored for each device ID, and the identifying unit can decide on the device management table that, from among a plurality of device management tables, is linked to the device ID obtained by the obtaining unit 160. Alternatively, the device management table can be managed in a corresponding manner to user identification information such as the user account. Moreover, the user can store the device management table in advance in the linking DB 202. For example, the user can access the AI assistant server 4 from a client PC, and input the information about the device management table.

Herein, the target for sending a job command, that is, the MFP 1 representing the input device can be identified in advance by the AI assistant server 4. Thus, when the AI assistant server 4 is accessed from the MFP 1 or a client PC, the device ID and the single MFP 1 can be linked in advance and registered in the linking DB 202. In that case, since the input device need not be identified by the identifying unit 168, it can be configured to be able to identify at least the output device.

Then, the execution instructing unit 162 sends a job command, which includes the execution instruction information obtained by conversion, that is, the processing information corresponding to the action and includes the address information of the output device, to the MFP 1 that is identified from the address information of the input device (Step S582). Herein, the processing information represents information for requesting the MFP 1 to perform scanning and send the scanning result to the second external device; and the address information of the output device represents the address information of the electronic blackboard 6 identified by the identifying unit 59. Meanwhile, as described later, instead of using the identifying unit 168 to identify the electronic blackboard. 6, the identifying unit 172 of the MFP 1 can be used in the identification. In that case, the execution instructing unit 162 can convert the parameters "output device-electronic blackboard" and "output device location-meeting room. A" into a job command, and can send the job command to the MFP 1.

Meanwhile, when a plurality of devices satisfies the conditions, the concerned devices can be selectably displayed in the operating unit 16 of the MFP 1, and the device selected by the user can be decided as the device to which the scanned data is to be sent. In that case, the execution instructing unit 161 sends, to the MFP 1, a job command that includes the processing information corresponding to the interpretation result and a plurality of sets of identified address information.

Moreover, the execution determining unit 164 generates response information of "executing the job". The response information is sent to the smart speaker 200 via the notifying unit 165 and the voice recognition server device 3 (Steps S583 and S584).

In the smart speaker 200, based on the response included in the response information, the feedback unit 153 outputs an input confirmation feedback, as a voice and as a text, of "Executing the job" indicating sufficiency of the required parameters and indicating the start of the operation of scanning and sending the scanned data (Step S585).

When the MFP 1 receives a job command (execution instruction information) from the AI assistant server device 4, it executes the job based on the processing information specified in the job command and decides on the destination for the processing result of the job based on the address information specified in the job command. Herein, after scanning the documents according to the job command (Step S586), the RMP 1 sends the scanned documents (scanned data) and a projection instruction for projecting the scanned data (an example of an operation command) to the electronic blackboard 6 representing the second external device. When the address information corresponding to the electronic blackboard 6 is specified in the job command, the MFP 1 performs the sending operation based on that address information. However, when the address information is not specified in the job command, the identifying unit 112 of the MEP 1 identifies, based on the parameters specified in the job command, that the electronic blackboard 6 installed in the "meeting room A" represents the destination for the scanned documents (scanned data). In this way, according to the parameters "output device" and "output device location", the identifying unit 112 of the MFP 1 can identify the second external device to which the scanned data is to be sent. In the abovementioned case, the identifying unit 112 identifies the device that is communicable with the MFP 1, that has "electronic blackboard" as the device type, and that is installed in the meeting room A, that is, identifies the electronic blackboard 6. More particularly, the identifying unit 112 of the MFP 1 refers to the device management table stored in the HDD 13 and, based on the parameters "output device" and "output device location" specified in the job command received from the AI assistant server device 4, identifies the electronic blackboard 6 representing the second external device. That is, the identifying unit 112 identifies the device type (electronic blackboard), the functions, and the address information of the second external device.

Meanwhile, when a plurality of devices satisfies the conditions indicated by the parameters "output device" and "output device location", the MPF 1 can selectably display the concerned devices in the operating unit 16, and the device selected by the user can be decided as the device to which the scanned data is to be sent. Moreover, the MFP 1 can get to know the corresponding communicable devices in advance. The MFP 1 can monitor the network, and can obtain in advance the device information containing the types and the installation locations of the corresponding communicable devices. Alternatively, the MFP 1 can obtain the device information from the user. For example, the user can input the device information from the operating unit 16 of the MFP 1 or from a client PC.

Using the address information specified in the job command or using the address information corresponding to the device identified by the identifying unit 172, the MFP 1 sends the scanned documents (scanned data) and a projection instruction for projecting the scanned data (an example of an operation command) to the electronic blackboard 6 representing the second external device (Step S587). Meanwhile, in addition to sending the scanned data, the MFP 1 can also send a job command to instruct projection of the scanned data onto the display 94.

Upon receiving the scanned data and the projection instruction from the MFP 1, the electronic blackboard 6 projects the scanned data onto the display 91 (Step S588). As a result, the coordinated operations of scanning the documents using the MFP 1 and projecting the scanned data using the electronic blackboard 6 can be controlled by performing voice input operations. Meanwhile, although the explanation above is given about the case in which the action. "SCAN_TO_DISPLAY" is specified in the interpretation result obtained by the interpreting unit 72, the same explanation is applicable in the case of other actions too.

Interaction for Execution of Job for Implementing Coordinated Operations Between MFP and Device In the example illustrated in FIG. 41, the explanation is given about the case in which the user utters about the parameters "input device", "input device location", "output device", and "output device location". However, either one of the parameters "input device" and "input device location" as well as either one of the parameters "output device" and "output device location" need not be always uttered. With reference to the example illustrated in FIG. 42, the explanation is given about the operations when only the parameters "input device location" and "output device location" are uttered.

Figure 42:
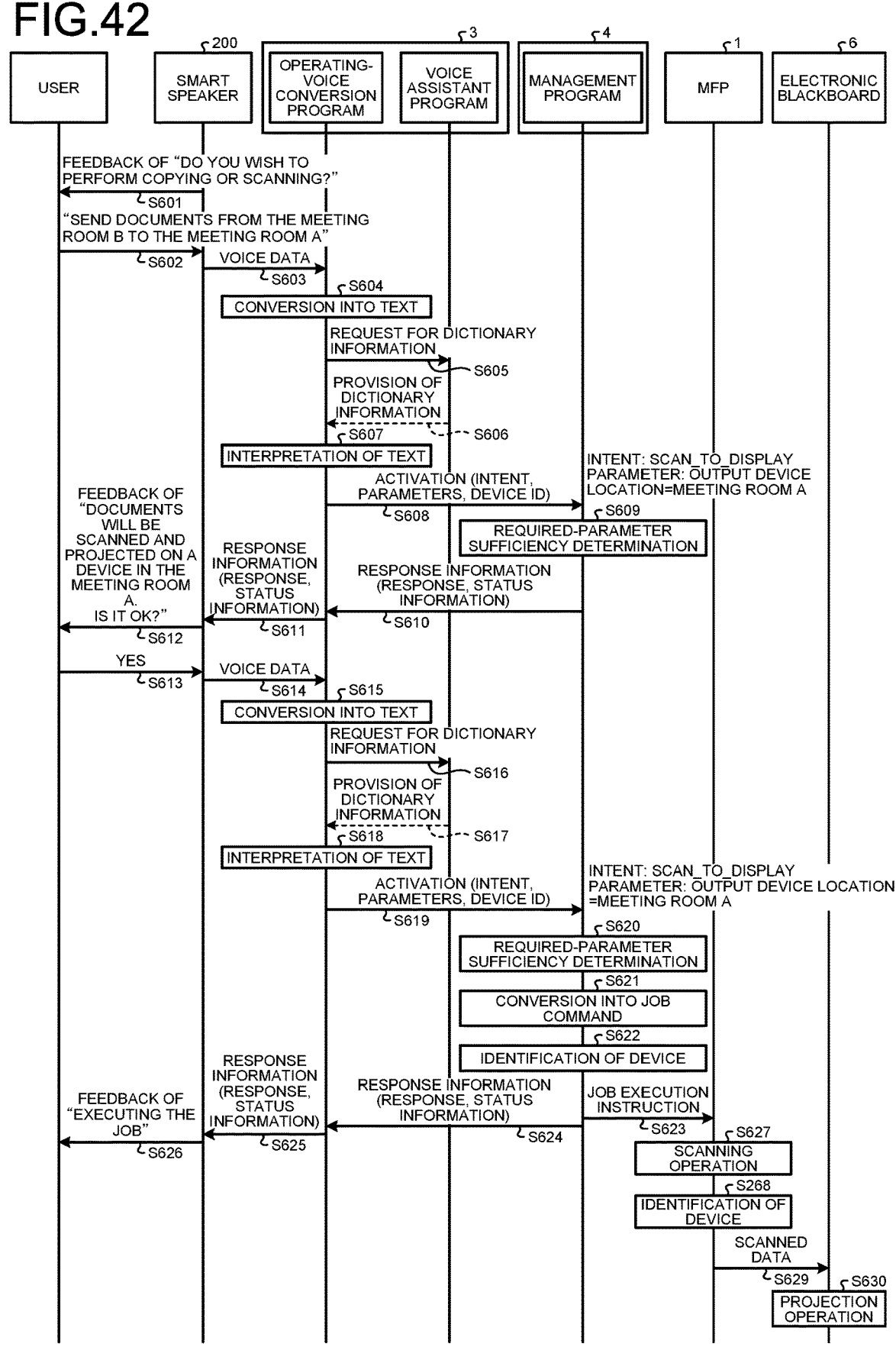
FIG. 42 is a sequence diagram for explaining an exemplary flow of operations performed to project scanned data onto a device in the voice operation system according to the second embodiment.

FIG. 42 illustrates an example of the interaction in which, in response to the input confirmation feedback of, for example, "do you wish to perform copying or scanning?", the user utters "send documents from the meeting room B to the meeting room A"; and the job is executed. In the example illustrated in FIG. 42, the output device location is assumed to represent the required parameter.

In an identical manner to FIG. 32, firstly, when the operating-voice processing program of the smart speaker 200 is activated, the user performs, for example, a voice input to instruct activation of the voice assistant program. In response, the communication control unit 152 of the smart speaker 200 sends the voice data of "activation" to the voice recognition server device 3. Then, the operations are performed according to the flow illustrated in FIG. 32, and the feedback unit 153 of the smart speaker 200 gives a voice feedback of "do you wish to perform copying or scanning?" for prompting issuance of a job command (Step S601).

Subsequently, if the user utters "send documents from the meeting room B to the meeting room A" (Step S602), then the communication control unit 152 of the smart speaker 200 sends voice data of "send documents from the meeting room B to the meeting room A" to the voice recognition server device 3 (Step S603). In the voice recognition server device 3, the text conversion unit 156 of the operating-voice conversion program converts the voice data of "send documents from the meeting room B to the meeting room A" into text data (Step S604).

As explained earlier with reference to FIGS. 12 and 13, the interpreting unit 157 of the voice recognition server device 3 interprets the uttered phrase of the user as specified in the text data (Step S605 to Step S607); and sends the interpretation result, which includes the intent and the parameters, and the device ID of the smart speaker 200 to the AI assistant server device 4. Herein, the interpreting unit 157 generates the intent indicating "SCAN_TO_DISPLAY" as the interpretation result, and sends it to the management program (Step S608).

In the AI assistant server device 4, the execution determining unit 164 receives the parameters "input device location-meeting room B" and "output device location-meeting room A". Then, in the required-parameter sufficiency determination at Step S609, the execution determining unit 164 determines that the required parameters for the job of scanning and sending the scanned data are fully available. Hence, the execution determining unit 164 generates response information of "Documents will be scanned and projected on a device in the meeting room A. Is it OK?". Then, the response information is sent to the smart speaker 200 via the notifying unit 165 and the voice recognition server device 3 (Steps S610 and S611).

In the smart speaker 200, based on the response included in the response information, the feedback unit 153 gives an input confirmation feedback, as a voice and as a text, of "Documents will be scanned and projected on a device in the meeting room A. Is it OK?" indicating sufficiency of the required parameters and indicating the readiness to start the operation of scanning and sending the scanned data (Step S612).

In response to the input confirmation feedback, when the user performs a voice input of "yes" (Step SS5613), the voice input is converted into a text by the operating-voice conversion program of the voice recognition server device 3 (Steps S614 and S615). In the voice recognition server device 3, when an instruction to perform the operation of scanning and sending the scanned data is recognized based on the text data, the interpreting unit 157 of the operating-voice conversion program generates an interpretation result in which the parameters "input device location=meeting room B" and "output device location=meeting room A" are added to the intent of "SCAN_TO_DISPLAY"; and sends the interpretation result to the management program (Step S616 to Step S619).

In the AI assistant server device 4, when the execution determining unit 164 of the management program determines that the interpretation result is satisfying the required parameters (Step S620), the interpretation result conversion unit 161 converts the interpretation result into a job command for the MFP 1 (Step S621). At that time, the identifying unit 168 identifies that the MFP 1 installed in the "meeting room B" represents the input device for performing scanning, and identifies that the electronic blackboard 6 installed in the "meeting room A" represents the destination for the scanned documents (scanned data) (Step S622). More particularly, the identifying unit 74 refers to the device management table given earlier in Table 3 and stored in the linking DB 202; identifies that the device corresponding to the parameter "input device location-meeting room B" specified in the job command has the device type of "MFP"; and identifies that the device corresponding to the parameter "output device location-meeting room A" specified in the job command has the device type of "electronic blackboard". That is, from among the devices linked to the device IDs, the identifying unit 168 identifies the MFP 1 as the device that is installed in the meeting room B and that is compatible to the job command. Moreover, from among the devices linked to the device IDs, the identifying unit 168 identifies the electronic blackboard 6 as the device that is installed in the meeting room A and that is compatible to the job command. In this case, since the job command is "send the scanned result to the device", based on the information about the device functions, the identifying unit 168 identifies the MFP 1 as the device having the scanning function and identifies the electronic blackboard 6 as the device having the display function. In this way, the identifying unit 168 of the AI assistant server 4 can identify the input device, in which scanning is to be performed, according to the "input device location"; and can identify the output device, to which the scanned data is to be sent, according to the "output device location". That is, the identifying unit 168 identifies the device type (MFP) the functions, and the address information of the first external device; and identifies the device type (electronic blackboard), the functions, and the address information of the second external device. Then, in the AI assistant server 4, the interpretation result conversion unit 161 converts the interpretation result, which is generated by adding the parameters "input device address information=zzz.zzz.z.z" and "output device address information=xxx.xxx.x.x" to the action "SCAN_TO_DISPLAY", into a job command.

Meanwhile, the device management table held in the linking DB 202 can be stored in a corresponding manner to each smart speaker 200. For example, in the linking DB 202, the device management table can be stored for each device ID, and the identifying unit can decide on the device management table that, from among a plurality of device management tables, is linked to the device ID obtained by the obtaining unit 160. Alternatively, the device management table can be managed in a corresponding manner to user identification information such as the user account. Moreover, the user can store the device management table in advance in the linking DB 202. For example, the user can access the AI assistant server 4 from a client PC, and input the information about the device management table.

Herein, the target for sending a job command, that is, the MFP 1 representing the input device can be identified in advance by the AI assistant server 4. Thus, when the AI assistant server 4 is accessed from the MFP 1 or a client PC, the device ID and the single MEP 1 can be linked in advance and registered in the linking DB 202. In that case, since the input device need not be identified by the identifying unit 168, it can be configured to be able to identify at least the output device.

Then, the execution instructing unit 162 sends a job command, which includes the execution instruction information obtained by conversion, that is, the processing information corresponding to the action and includes the address information of the output device, to the MFP 1 that is identified from the address information of the input device (Step S623). Herein, the processing information represents information for requesting the MFP 1 to perform scanning and send the scanning result to the second external device; and the address information of the output device represents the address information of the electronic blackboard 6 identified by the identifying unit 59. Meanwhile, as described later, instead of using the identifying unit 168 to identify the electronic blackboard 6, the identifying unit 172 of the MFP 1 can be used in the identification. In that case, the execution instructing unit 162 can convert the parameter "output device location=meeting room A" into a job command, and can send the job command to the MFP 1.

Meanwhile, when a plurality of devices satisfies the conditions, the concerned devices can be selectably displayed in the operating unit 16 of the MFP 1, and the device selected by the user can be decided as the device to which the scanned data is to be sent. In that case, the execution instructing unit 161 sends, to the MFP 1, a job command that includes the processing information corresponding to the interpretation result and a plurality of sets of identified information.

Moreover, the execution determining unit 164 generates response information of "executing the job". The response information is sent to the smart speaker 200 via the notifying unit 165 and the voice recognition server device 3 (Steps S624 and S625).

In the smart speaker 200, based on the response included in the response information, the feedback unit 153 outputs an input confirmation feedback, as a voice and as a text, of "Executing the job" indicating that sufficiency in the required parameters and indicating the start of the operation of scanning and sending the scanned data (Step S626).

When the MFP 1 receives a job command (execution instruction information) from the AI assistant server device 4, it executes the job based on the processing information specified in the job command and decides on the destination for the processing result of the job based on the address information specified in the job command. Herein, after scanning the documents according to the job command (Step S627), the MFP 1 sends the scanned documents (scanned data) and a projection instruction for projecting the scanned data (an example of an operation command) to the electronic blackboard 6 representing the second external device. When the address information corresponding to the electronic blackboard 6 is specified in the job command, the MFP 1 performs the sending operation based on that address information. However, when the address information is not specified in the job command, the identifying unit 112 of the MFP 1 identifies, based on the parameters specified in the job command, that the electronic blackboard 6 installed in the "meeting room A" represents the destination for the scanned documents (scanned data) (Step S628). More particularly, the identifying unit 112 refers to the device management table given earlier in Table 3 and stored in the HDD 13, and identifies that the device corresponding to the parameter "output device location=meeting room A" specified in the job command has the device type of "electronic blackboard". That is, the identifying unit 112 identifies the electronic blackboard 6 as the device that is communicable with the MFP 1, that is installed in the meeting room A, and that is capable of executing the job command. In the case explained above, since the job command is "send the scanning result to the device"; based on the information about the functions of the devices, the identifying unit 112 identifies the electronic blackboard 6 as the device having the display function. In this way, the identifying unit 112 of the MMP 1 can identify the second external device, to which the scanned data is to be sent, according to the "output device location". That is, the identifying unit 112 identifies the device type (electronic blackboard), the functions, and the address information of the second external device.

Using the address information corresponding to the identified device, the MFP 1 sends the scanned documents (scanned data) and a projection instruction for projecting the scanned data (an example of an operation command) to the electronic blackboard 6 representing the second external device (Step S628). Moreover, in addition to sending the scanned data, the MFP 1 can also send a job command to instruct projection of the scanned data onto the display 94.

Upon receiving the scanned data and the projection instruction from the MFP 1, the electronic blackboard 6 projects the scanned data onto the display 94 (Step S629). As a result, the coordinated operations of scanning the documents using the MFP 1 and projecting the scanned data using the electronic blackboard 6 can be controlled by performing voice input operations.

In the explanation given above, the voice recognition server device 3 identifies the "output device" or the "output device location". However, that is not the only possible case. That is, in the voice recognition server device 3, even if the utterance of the user can be converted into a text, there are times when it is not to possible to determine that the text "electronic blackboard" corresponds to the output device and that the text "meeting room A" corresponds to the output device location. In that case, the voice recognition server device 3 sends the text data "meeting room A" and the text data "electronic blackboard" along with a job command to the MFP 1. The MFP 1 can refer to the device management table given earlier in Table 3; search for a device that has the "meeting room A" specified in the "device type" or the "location" and search for a device that has the "electronic device" specified in the "device type" or the "location"; and identify that device as the second external device.

Meanwhile, in response to the insufficiency in the required parameters, instead of simply performing an insufficient input feedback, the parameters at the time of previous job execution can be recorded and an inquiry can be made about whether the values of the recorded parameters can be used in a supplementary manner. In that case, it is sufficient for the user to respond only once at minimum, and only the parameters that need correction can be modified. Hence, the job can be executed with a smaller number of actions.

Effect of Second Embodiment

As is clear from the explanation given above, in the voice operation system according to the second embodiment, the operating-voice processing program representing a platform application program is installed in the smart speaker 200, so that the application performs communication with a cloud service device when the user utters something at the microphone unit 29 of the smart speaker 200, the cloud service device analyzes the contents of the utterance of the user and operates the MFP 1 to perform the user-instructed operation (voice input operations). Moreover, the contents of the utterance of the user for operating the MFP 1 enable controlling not only the operations of the MFP 1 but also the operations of the electronic blackboard 6 representing the second external device.

As a result, by instructing complex operations using the voice, the need to perform operations using the GUI of the touch panel 27 can be eliminated. Hence, for a user who is familiar with the operations, the input operations can be performed in a more speedy and simple manner. On the other hand, even for an elderly person or a user not familiar with the operations, the interactive operation support enables speedy and simple execution of the user-desired operations such as complex network settings, sophisticated job settings, and implementation of new applications. Moreover, it is possible to perform utterance-based voice input operations in which the operations of not only the MFP 1, which represents an example of the first external device, but also the electronic blackboard 6, which represents an example of the second external device, are controlled in a coordinated manner. Hence, a plurality of devices can be easily made to perform coordinated operations.

Furthermore, since the user intentions are analyzed based on the text of the contents of the utterance of the user, the processing details based on the utterance of the user can be determined by the AI assistant server device 4.

Lastly, although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, in the first embodiment, the voice recognition server device 3 generates text data corresponding to the utterance of the user, and the AI assistant server device 4 interprets the user-intended actions based on the text data. However, alternatively, the mobile terminal 2 can be configured to have the voice recognition function and the interpretation function, so that the mobile terminal 2 can interpret the user-intended actions from the utterance of the user. That enables eliminating the need to use the voice recognition server device 3 and the AI assistant server device 4, thereby resulting in the simplification of the system configuration.

According to an aspect of the present invention, a plurality of devices can be enabled to operate in coordination according to operation by voice.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system connected to a first external device via a network, comprising circuitry configured to perform:
    obtaining voice information for operating the first external device;
    recognizing the voice information obtained at the obtaining;
    interpreting, from a recognition result obtained at the recognizing,
        processing information indicating processing to be performed in the first external device,
        first address information identifying the first external device, and
        second address information identifying a second external device to which the first external device is to send a result of the processing; and
    sending instruction information including the processing information and the second address information, to the first external device identified by the first address information.

2. The information processing system according to claim 1, wherein
    the circuity is further configured to perform identifying the second external device based on the instruction information, and
    the first external device is configured to perform operation according to the instruction information and send, to the second external device identified at the identifying, an operation command for the second external device based on the instruction information.

3. The information processing system according to claim 2, further comprising a memory configured to store association information associating at least information related to an external device and address information of the external device, wherein
    the circuitry is configured to, at the identifying, perform, based on the instruction information, referring to the association information and identifying address information of the second external device, and
    the first external device is configured to send the operation command to the second external device according to the address information identified at the identifying.

4. The information processing system according to claim 2, wherein
    the first external device includes circuitry configured to perform:
        reading a document and generating image data according to the instruction information; and
        sending the image data and the operation command to the second external device, and
    the second external device is configured to project the image data according to the received operation command.

5. The information processing system according to claim 1, wherein
    the circuitry is configured to perform
        converting the voice information into text information at the recognizing, and
        at the interpreting, interpreting the instruction information based on the text information as the recognition result.

6. The information processing system according to claim 1, the circuitry is further configured to perform:

obtaining information processing capability of at least either the first external device or the second external device;

determining whether information processing indicated by the interpretation result obtained at the interpreting is executable with the information processing capability obtained at the obtaining; and in response to, at the determining, determining non-executability, output to prompt correction of the information processing indicated by the interpretation result, to make the information processing executable with the information processing capability obtained at the obtaining.

7. The information processing system according to claim 6, further comprising a smart speaker including:

a microphone configured to receive input of the voice information to be obtained at the obtaining; and a speaker configured to perform voice output of information output at the output.

8. An information processing system including a first external device, a second external device, and as information processing device, the information processing system comprising circuitry configured to perform:

obtaining voice information for operating the first external device;

recognizing the voice information obtained at the obtaining;

interpreting, from a recognition result obtained at the recognizing, instruction information for instructing operation of the first external device and the second external device; and sending the instruction information to the first external device.

9. The information processing system according to claim 8, wherein the circuity is further configured to perform identifying the second external device based on the instruction information, and the first external device is configured to perform operation according to the instruction information and send, to the second external device identified at the identifying, an operation command for the second external device based on the instruction information.

10. The information processing system according to claim 9, further comprising a memory configured to store association information associating at least information related to an external device and address information of the external device, wherein the circuitry is configured to, at the identifying, perform, based on the instruction information, referring to the association information and identifying address information of the second external device, and the first external device is configured to send the operation command to the second external device according to the address information identified at the identifying.

11. The information processing system according to claim 9, wherein the first external device includes circuitry configured to perform:

reading a document and generating image data according to the instruction information; and sending the image data and the operation command to the second external device, and the second external device is configured to project the image data according to the received operation command.

12. The information processing system according to claim 8, wherein the circuitry is configured to perform converting the voice information into text information at the recognizing, and at the interpreting, interpreting the instruction information based on the text information as the recognition result.

13. The information processing system according to claim 8, the circuitry is further configured to perform:

obtaining information processing capability of at least either the first external device or the second external device;

determining whether information processing indicated by the interpretation result obtained at the interpreting is executable with the information processing capability obtained at the obtaining; and in response to, at the determining, determining non-executability, output to prompt correction of the information processing indicated by the interpretation result, to make the information processing executable with the information processing capability obtained at the obtaining.

14. The information processing system according to claim 13, further comprising a smart speaker including:

a microphone configured to receive input of the voice information to be obtained at the obtaining; and a speaker configured to perform voice output of information output at the output.

15. An information processing method implemented in an information processing system connected to a first external device via a network, the information processing method comprising:

obtaining voice information for operating the first external device;

recognizing the obtained voice information;

interpreting, from a recognition result obtained at the recognizing, processing information indicating processing to be performed in the first external device, first address information identifying the first external device, and second address information identifying a second external device to which the first external device is to send a result of the processing; and sending instruction information including the processing information and the second address information, to the first external device identified by the first address information.

* * * * *